United States Patent
Kleider et al.

(10) Patent No.: US 8,331,420 B2
(45) Date of Patent: Dec. 11, 2012

(54) METHODS AND APPARATUS FOR MULTIPLE-ANTENNA COMMUNICATION OF WIRELESS SIGNALS WITH EMBEDDED PILOT SIGNALS

(75) Inventors: John E. Kleider, Decatur, GA (US); Benjamin Russell Hamilton, Auburn, AL (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 370 days.

(21) Appl. No.: 12/649,672

(22) Filed: Dec. 30, 2009

(65) Prior Publication Data
US 2011/0149929 A1 Jun. 23, 2011

Related U.S. Application Data

(63) Continuation-in-part of application No. 12/102,677, filed on Apr. 14, 2008, now Pat. No. 8,098,713.

(51) Int. Cl.
*H04B 1/00* (2006.01)

(52) U.S. Cl. ........ 375/145; 375/146; 375/149; 375/364; 370/500; 370/510

(58) Field of Classification Search .......... 375/145, 375/146, 149, 354, 364, 365, 366; 370/500, 370/510, 513, 514
See application file for complete search history.

(56) References Cited

U.S. PATENT DOCUMENTS

| | | | |
|---|---|---|---|
| 5,867,478 A | 2/1999 | Baum et al. | |
| 6,314,146 B1 | 11/2001 | Tellado et al. | |
| 6,369,758 B1 | 4/2002 | Zhang | |
| 6,411,610 B1 | 6/2002 | Li et al. | |
| 6,473,467 B1 | 10/2002 | Wallace et al. | |
| 6,487,252 B1 | 11/2002 | Kleider et al. | |
| 6,549,561 B2 | 4/2003 | Crawford | |
| 6,549,583 B2 | 4/2003 | Crawford | |
| 6,567,374 B1 | 5/2003 | Böhnke et al. | |
| 6,628,735 B1 | 9/2003 | Belotserkovsky et al. | |
| 6,633,616 B2 | 10/2003 | Crawford | |
| 6,700,866 B1 | 3/2004 | Heinonen et al. | |
| 6,757,299 B1 | 6/2004 | Verma | |
| 6,853,632 B1 | 2/2005 | Verma et al. | |
| 6,928,062 B2 | 8/2005 | Krishnan et al. | |
| 6,985,535 B2 | 1/2006 | Park et al. | |

(Continued)

OTHER PUBLICATIONS

U.S. Office Action for U.S. Appl. No. 12/051,535 mailed Mar. 15, 2011.

(Continued)

*Primary Examiner* — Dac Ha
(74) *Attorney, Agent, or Firm* — Ingrassia Fisher & Lorenz, P.C.

(57) ABSTRACT

Embodiments of methods and apparatus for wirelessly communicating signals include one or more transmitters configured to generate a plurality of wireless signal for transmission. Each of the wireless signals includes a plurality of pilot signals represented in a plurality of unevenly spaced, in-band subcarriers. Pilot signals of each wireless signal are positioned at subcarriers that are orthogonal in frequency with subcarriers at which pilot signals of all other wireless signals are positioned. According to an embodiment, subcarrier indices each the plurality of pilot signals are determined using a third order or higher order polynomial parameterization of pilot subcarriers in conjunction with a convex optimization algorithm to produce pilot signals having near-optimal channel estimate mean square error (MSE) performance. The wireless signals are simultaneously radiated over a wireless communication channel using a plurality of co-located or distributed antennas.

32 Claims, 15 Drawing Sheets

U.S. PATENT DOCUMENTS

| | | | |
|---|---|---|---|
| 7,027,464 | B1 | 4/2006 | Nakahara et al. |
| 7,042,857 | B2 | 5/2006 | Krishnan et al. |
| 7,164,649 | B2 | 1/2007 | Walton et al. |
| 7,190,734 | B2 | 3/2007 | Giannakis et al. |
| 7,206,606 | B2 | 4/2007 | Kobayashi et al. |
| 7,233,625 | B2 | 6/2007 | Ma et al. |
| 7,269,430 | B2 | 9/2007 | Moorti et al. |
| 7,289,588 | B2 | 10/2007 | Suh et al. |
| 7,317,750 | B2 | 1/2008 | Shattil |
| 7,324,605 | B2 | 1/2008 | Maltsev et al. |
| 7,359,311 | B1 | 4/2008 | Paranjpe et al. |
| 7,403,570 | B2 | 7/2008 | Ma et al. |
| 7,406,261 | B2 | 7/2008 | Shattil |
| 7,421,046 | B2 | 9/2008 | Wallace et al. |
| 7,471,728 | B2 | 12/2008 | Brutel et al. |
| 7,590,171 | B2 | 9/2009 | Chang et al. |
| 7,656,975 | B2 | 2/2010 | Tandon et al. |
| 7,688,907 | B2 | 3/2010 | Dang |
| 7,764,593 | B2 | 7/2010 | Kim et al. |
| 7,856,048 | B1 | 12/2010 | Smaini et al. |
| 7,881,181 | B2 | 2/2011 | Dapper et al. |
| 8,098,713 | B2 | 1/2012 | Baxley et al. |
| 2004/0086055 | A1* | 5/2004 | Li .................... 375/260 |
| 2004/0196921 | A1 | 10/2004 | Matsumoto et al. |
| 2005/0043052 | A1 | 2/2005 | Whinnett et al. |
| 2005/0105505 | A1 | 5/2005 | Fishler et al. |
| 2005/0135503 | A1 | 6/2005 | Talwar et al. |
| 2005/0157814 | A1 | 7/2005 | Cova et al. |
| 2006/0018250 | A1 | 1/2006 | Gu et al. |
| 2006/0239233 | A1 | 10/2006 | Hanada et al. |
| 2006/0250936 | A1 | 11/2006 | Chen et al. |
| 2006/0291431 | A1 | 12/2006 | Pajukoski et al. |
| 2006/0291577 | A1* | 12/2006 | Boariu .................... 375/260 |
| 2007/0089015 | A1 | 4/2007 | Saul |
| 2007/0098100 | A1 | 5/2007 | Charbit et al. |
| 2007/0211835 | A1 | 9/2007 | Inagawa et al. |
| 2007/0253472 | A1 | 11/2007 | Jang |
| 2008/0075195 | A1 | 3/2008 | Pajukoski et al. |
| 2008/0089437 | A1 | 4/2008 | Frederiksen et al. |
| 2008/0095263 | A1 | 4/2008 | Xu et al. |
| 2008/0117995 | A1 | 5/2008 | Anderson et al. |
| 2009/0003308 | A1 | 1/2009 | Baxley et al. |
| 2009/0011722 | A1 | 1/2009 | Kleider et al. |
| 2009/0021303 | A1 | 1/2009 | Vinayak et al. |
| 2009/0052561 | A1 | 2/2009 | Baxley et al. |
| 2009/0207936 | A1 | 8/2009 | Behzad |
| 2009/0316826 | A1 | 12/2009 | Koren et al. |
| 2010/0002784 | A1 | 1/2010 | Hlinka et al. |
| 2010/0029310 | A1 | 2/2010 | Li et al. |
| 2010/0035554 | A1 | 2/2010 | Ba et al. |
| 2010/0091702 | A1 | 4/2010 | Luo et al. |
| 2010/0118990 | A1 | 5/2010 | Lee et al. |
| 2010/0195609 | A1 | 8/2010 | Li et al. |
| 2010/0272197 | A1 | 10/2010 | Har et al. |
| 2012/0140838 | A1 | 6/2012 | Kadous et al. |

OTHER PUBLICATIONS

U.S. Office Action for U.S. Appl. No. 12/102,677 mailed Feb. 2, 2011.

U.S. Office Action issued Jun. 24, 2011 in U.S. Appl. No. 12/038,983.

Final Office Action issued Jul. 15, 2011 in U.S. Appl. No. 12/102,677.

Final Office Action cited in U.S. Appl. No. 12/051,535 on Aug. 25, 2011.

Notice of Allowance issued Oct. 27, 2011 in U.S. Appl. No. 12/038,983.

J. K. Cavers, "An Analysis of Pilot Symbol Assisted Modulation for Rayleigh Fading Channels," IEEE Transactions on Vehicular Technology, vol. 40, No. 4, pp. 686-693, Dec. 1991.

"IEEE Standard Local and Metropolitan Area Network," IEEE Std. 802.16a, Jan. 2003.

R. Negi et al., "Pilot Tone Selection for Channel Estimation in a Mobile OFDM System," IEEE Transactions on Consumer Electronics, vol. 44, pp. 1122-1128, Aug. 1998.

M. Morelli et al., "A Comparison of Pilot-Aided Channel Estimation Methods for OFDM Systems," IEEE Trans. on Signaling Processing, vol. 49, No. 12, pp. 3065-3073, 2001.

J. E. Kleider et al., "Preamble and Embedded Synchronization for RF Carrier Frequency-Hopped OFDM," IEEE Journal on Selected Areas in Communications, vol. 23, No. 5, pp. 920-931, May 2005.

J. Tellado, "Peak to Average Power Reduction for Multicarrier Modulation," Dissertation submitted to the Dept. of Electrical Engineering, Sep. 1999.

R. W. Bauml et al., "Reducing the Peak-to-Average Power Ratio of Multicarrier Modulation by Selected Mapping," Electronics Letters, vol. 32, pp. 2056-2057, Oct. 1996.

S. O'Hara, B. Chen et al., "A Bandwidth Efficient Peak Power Reduction Scheme for Multicarrier Modulation Using Selected Mapping," Proc. Conference on Information Sciences and Systems, Mar. 2003.

R. J. Baxley et al., "Magnitude-Scaled Selected Mapping: A Crest Factor Reduction Scheme for OFDM Without Side-Information Transmission," Proc. IEEE Intl. Conference on Acoustics, Speech, and Signal Processing, Apr. 2007.

A. D. S. Jayalath et al., "SLM and PTS Peak-Power Reduction of OFDM Signals Without Side Information," IEEE Transactions on Wireless Communications, vol. 4, pp. 2006-2013, Sep. 2005.

R. J. Baxley et al., "MAP Metric for Blind Phase Sequence Detection in Selected Mapping," IEEE Transactions on Broadcasting, vol. 51, pp. 565-570, Dec. 2005.

N. Chen et al., "Peak-to-Average Power Ratio Reduction in OFDM with Blind Selected Pilot Tone Modulation," IEEE Transactions on Wireless Communications, vol. 5, pp. 2210-2216, Aug. 2006.

F. Tufvesson et al., "Time and Frequency Synchronization for OFDM Using PN-Sequence Preambles," Proc. IEEE Vehicular Technology Conference, (Amsterdam, Netherlands), pp. 2203-2207, Sep. 1999.

N. Chen et al., "Superimposed Training for OFDM: A Peak-to-Average Power Ratio Analysis," IEEE Transactions on Signal Processing, vol. 54, pp. 2277-2287, Jun. 2006.

R. J. Baxley et al., "Embedded Synchronization/Pilot Sequence Creation Using POCS," Proc. IEEE International Conference on Acoustics, Speech and Signal Processing, 2006., pp. 321-324, May 2006.

R. J. Baxley et al., "Pilot Design for IEEE 802.16 OFDM and OFDMA," in Proc. IEEE International Conference on Acoustics, Speech and Signal Processing, Apr. 2007.

Z. Wang et al., "Wireless Multicarrier Communications," IEEE Signal Processing Magazine, vol. 17, pp. 29-48, May 2000.

X. Cai et al., "Error Probability Minimizing Pilots for OFDM with m-PSK Modulation Over Rayleigh-Fading Channels," IEEE Transactions on Vehicular Technology, vol. 53, pp. 146-155, Jan. 2004.

E. Larsson et al., "Preamble Design for Multiple-Antenna OFDM-Based WLANs with Null Subcarriers," IEEE Signal Processing Letters, vol. 8, pp. 285-288, Nov. 2001.

M. Dong et al., "Optimal Pilot Placement for Channel Tracking in OFDM," Proc. Military Communications Conference 2002, pp. 602-606, Nov. 2002.

M. Dong et al., "Optimal Design and Placement of Pilot Symbols for Channel Estimation," IEEE Transactions on Signal Processing, vol. 50, No. 12, pp. 3055-3069, Dec. 2002.

L. Tong et al., "Pilot-Assisted Wireless Transmissions: General Model, Design Criteria, and Signal Processing," IEEE Signal Processing Magazine, vol. 21, pp. 12-25, Nov. 2004.

X. Cai et al., "Adaptive PSAM Accounting for Channel Estimation and Prediction Errors," IEEE Transactions on Wireless Communications, vol. 4, pp. 246-256, Feb. 2005.

J. Diaz et al., "Impact of Imperfect Channel State Information Upon the Outage Capacity of Rayleigh Fading Channels," Proc. IEEE Global Telecommunications Conference, 2004, pp. 887-892, Dec. 2004.

R. You et al., "Diversity Combining with Imperfect Channel Estimation," IEEE Transactions on Communications, vol. 53, pp. 1655-1662, Oct. 2005.

T. Weber et al., "Imperfect Channel-State Information in MIMO Transmission," IEEE Transactions on Communications, vol. 54, pp. 543-552, Mar. 2006.

S. Kay, Fundamentals of Statistical Signal Processing, vol. 1: Estimation Theory. Englewood Cliffs, NJ: Prentice-Hall, pp. 521-523, Jan. 1993.

S. Chennakeshu et al., "Error Rates for Rayleigh Fading Multichannel Reception of MPSK Signals," IEEE Transactions on Communications, vol. 43, pp. 338-346, Feb., Mar., Apr. 1995.

J. Proakis, Digital Communications, New York, NY: McGraw-Hill, p. 817, Jan. 2001.

S. Boyd et al.E, Convex Optimization. Cambridge University Press, Jan. 2004.

"Lagrange Multipliers," http://en.wikipedia.org/wiki/Lagrange_multipliers, retrieved on Jan. 11, 2007.

J. Tellado et al., "PAR Reduction in Multicarrier Transmission Systems," Feb. 1998.

K. Anderson, et al. "Two Dimensional Diversity Enhancement for Tactical Wireless Networks Using Multi-Carrier Cooperative Networking," submitted to MILCOM 2006.

J. Kleider, et al. " MISO Joint Synchronization-Pilot Design for OFDM Systems," in Proc. ICASSP, pp. 3033-3036. Mar.-Apr. 2008.

J.E. Kleider, X. Ma, and C. Steenhoek, "OFDM Subcarrier interference cancellation for non-linear PA Distortion," to appear in Proc. of MILCOM, Oct. 2009, Boston, MA.

Alamouti, S. "A simple transmit diversity technique for wireless communications," IEEE JSAC, vol. 16, No. 8, Oct. 1998, pp. 1451-1458.

Anderson, K., et al. "Two dimensional diversity enhancement for tactical wireless networks using multi-carrier cooperative networking," in proceedings of SDR Forum Technical Conference 2006.

Baxley, R.J., et al. "A method for joint peak-to-average power radio reduction and synchronization in OFDM," accepted MILCOM, Orlando, FL, Oct. 2007.

Baxley, R.J., et al. "Pilot design for OFDM with null edge subcarriers," IEEE Trans. Wireless Commuincations, vol. 8, No. 1, pp. 396-405, Jan. 2009.

Cao, Z., et al. "Frequency synchronization fro generalized OFDMA uplink," in Proc. IEEE Globecomm, 2004.

Choi, J., et al. "Carrier frequency offset compensation for uplink of OFDM-FDAM systems," IEEE Trans. Commun., 2005.

Cui, T., et al. "Joint frequency offset and channel estimation for OFDM," in Proc. Globecom, vol. 1, pp. 15-19, Dec. 2006.

Dai, H. "Distributed versus co-located MIMO systems with correlated fading and shadowing," in Proc. of ICASSP, vol. IV, May 2006, pp. 561-564.

Fechtel, S. "OFDM carrier and sampling frequency syncronization and its performance on stationary and mobile channels," IEEE Trans Cons. Elect., vol. 46, No. 3, Aug. 2000.

Gault, S., et al. "Joint sampling clock offset and channel estimation for OFDM Signals: Cramer-Rao bound and algorithms," IEEE Trans. Signal Proc., vol. 54, No. 5, pp. 1875-1885, May 2006.

Ghogho, M., et al. "Semi-blind frequency offset synchronization for OFDM," in Proc. ICASSP, vol. 3, pp. 2333-2336, May 2002.

Giannakis, G., et al. Space-Time Coding for Broadband Wireless Communications, John Wiley and Sons, Hoboken, NJ, 2007. www.researchandmarkets.com/reports/449857.

Goldsmith, A., et al. "Capacity limits of MIMO channels," IEEE, JSAC, vol. 21, No. 5, Jun. 2003, pp. 684-702.

Huang, D., et al. "An Interference cancellation scheme for carrier frequency offsets correction in OFDMA systems," IEEE Trans. Commun., 2005.

Jayalath, A.D.S., et al. Blind SLM receiver for PAR-reduced OFDM, PRoc. IEEE Vehicular Technology Conference, pp. 219-222, Sep. 2002.

Kleider, J., et al. "Timing synchronization in distributed mobile MISO rayleigh fading channels," in Proc. MILCOM, pp. 1-7, Oct. 2007.

Kleider, J., et al. "MISO joint synchronization-pilot design for OFDM systems," in Proc. ICASSP, pp. 3033-3036, Mar.-Apr. 2008.

Le, H.N., et al. "Joint channel estimation and synchronization for MIMO-OFDM in the presence of carrier and sampling frequency offsets," IEEE Trans. on Vehicular Technology, vol. 58, No. 6, Jul. 2009.

Li, X. "SpaceOtime coded multi-transmission among distributed transmitters without perfect synchronization," IEEE Signal Processing Letters, vol. 11, No. 12, Dec. 2004, 948-951.

Lu, B., et al. "Iterative receivers for space-time block-coded OFDM systems in dispersive fading channels," IEEE Trans. on Commun., vol. 53, No. 1, pp. 162-172, Jan. 2005.

Ma, X., et al. "Joint frequency offset and channel estimation for OFDM," in Proc. Globecom, vol. 1, pp. 15-19, Dec. 2006.

Ma, X., et al. "Hopping pilots for estimation of frequency offset and multiantenna channels in MIMO-OFDM," IEEE Trans. on Commun., vol. 1, No. 2, pp. 213-225, Apr. 2002.

Ma, Q., et al. "Differential space-time-frequency coded OFDM with maximum multipath diversity," IEEE Trans. Wireless Commun., vol. 4, No. 5, pp. 2232-2243, Sep. 2005.

Ohno, S. "Preamble and pilot symbol design for channel estimation in FDM," in Proc. ICASSP, vol. 3, pp. 281-284, Apr. 2007.

Pun, M.O., et al. "Iterative detection and frequcny synchronization for OFDMA uplink transmissions," in IEEE Trans. Wireless Commun., Feb. 2007.

Schmidl, T.M., et al. "Robust frequency and timing synchronization for ODFM," IEEE Trans on Commun., vol. 45, No. 12, pp. 1613-1621, Dec. 1997.

Tonello, A. "Multiuser detection and turbo multiuser decoding for asynchronous multitone multiple access," in Proc. IEEE Veh. Techn. Conf., 2002.

van Zelst, A., et al. "Implementation of a MIMO-OFDM-based wireless LAN system," IEEE Trans. Signal PRoc., vol. 52, No. 2, pp. 483-494, Feb. 2004.

U.S. Appl. No. 12/567,509, filed Sep. 25, 2009.

U.S. Appl. No. 12/567,505, filed Sep. 25, 2009.

USPTO Non-Final Office Action mailed May 3, 2012; U.S. Appl. No. 13/359,205, filed Jan. 26, 2012.

USPTO "Non-Final Office Action" mailed May 25, 2012; U.S. Appl. No. 12/567,505, filed Sep. 25, 2009.

Notice of Allowance issued Mar. 21, 2012 in U.S. Appl. No. 12/051,535.

USPTO "Non-Final Office Action" mailed May 3, 2012; U.S. Appl. No. 13/359,205, filed Jan. 26, 2012.

USPTO "Non-Final Office Action" mailed Jun. 22, 2012; U.S. Appl. No. 12/567,509, filed Sep. 25, 2009.

USPTO "Notice of Allowance" mailed Jul. 3, 2012; U.S. Appl. No. 13/359,205 filed Jan. 26, 2012.

USPTO "Notice of Allowance" mailed Aug. 21, 2012; U.S. Appl. No. 12/567,505 filed Sep. 25, 2009.

USPTO "Final Office Action" mailed Aug. 28, 2012; U.S. Appl. No. 12/567,509 filed Sep. 25, 2009.

USPTO "Notice of Allowance" mailed Oct. 11, 2012; U.S. Appl. No. 12/725,985 filed Mar. 17, 2010.

USPTO "Notice of Allowance" mailed Sep. 21, 2012; U.S. Appl. No. 12/051,535 filed Mar. 19, 2008.

* cited by examiner

METHODS AND APPARATUS FOR MULTIPLE-ANTENNA COMMUNICATION OF WIRELESS SIGNALS WITH EMBEDDED PILOT SIGNALS

CROSS-REFERENCE TO RELATED APPLICATION

This application is a continuation-in-part of U.S. application Ser. No. 12/102,677, filed Apr. 14, 2008, and U.S. application Ser. No. 12/102,677 is hereby incorporated by reference in its entirety.

GOVERNMENT LICENSE RIGHTS

The U.S. Government may have certain rights to some or all of the inventive subject matter of the present application as provided for by the terms of contract No. DAAD19-01-2-0011 awarded by Army Research Laboratory.

TECHNICAL FIELD

The inventive subject matter generally relates to methods and apparatus for wirelessly communicating signals, and more particularly to methods and apparatus for generating and wirelessly communicating signals that include pilot signals with variable pilot signal parameters.

BACKGROUND

Orthogonal frequency division multiplexing (OFDM) is a modulation method used in high-speed wireless networks. However, waveforms generated using traditional OFDM techniques exhibit noise-like properties, and thus OFDM waveforms tend to suffer from relatively large peak-to-average ratios (PARs), which in turn may lead to significant distortion noise and low power efficiency in peak-limited channels. In addition, under relatively harsh channel conditions, transmitted OFDM signals tend to incur significant timing offsets and carrier frequency offsets. Because traditional OFDM techniques tend not to be robust under harsh channel conditions, significant timing offsets may result in inter-block interference, and significant carrier frequency offsets may result in inter-carrier interference. Both of these forms of interference are detrimental to the bit error rates and/or symbol error rates of received signals.

In order to estimate the channel and to address timing and carrier frequency offsets, some traditional OFDM devices transmit a preamble in conjunction with and preceding an information-bearing OFDM sequence. The receiver may perform a conjugate correlation of the received preamble and an expected preamble to determine estimates for the timing and carrier frequency offsets. In addition, when the preamble also includes channel training information, the preamble may be used to perform channel estimation. Although transmission of a preamble is relatively simple to implement, a tradeoff to implementing this technique is that a significant amount of bandwidth is used solely for preamble transmission, and thus for synchronization, acquisition, and, when channel training information is available, also for channel estimation.

In addition, the channel estimate naturally has some error, when compared with actual channel conditions. Traditional OFDM transmission methods may experience an increase in channel estimation errors on the receiver side, which may result from non-linear amplification, by a power amplifier device on the transmitter side, of transmit information sequences having higher than desired PARs. Such non-linear transmission may cause significant out-of-band interference (i.e., interference outside the signal bandwidth, such as in the adjacent channels and/or other user channels), and also may induce undesired in-band interference, which adds distortion to the transmitted information bits and also to the channel training information. Furthermore, improper synthesis of the channel training information may lead to further channel estimation errors at the receiver. Thus, non-linear amplification of high peak-to-average power ratio signals and improper channel training information design may, in the receiver, result in unacceptably high channel estimation errors and excessively high bit error rates.

In some OFDM systems, pilot symbol assisted modulation (PSAM) techniques are used to estimate multipath channels and remove their effects from a received OFDM symbol. Using PSAM, a data component of a transmit signal is modulated onto a plurality of data-bearing subcarriers within an available frequency band, and pilot signals (referred to simply as "pilots" herein) are modulated onto a plurality of non-overlapping pilot subcarriers, where each subcarrier may be indicated by a subcarrier index. Traditional pilot signal designs include evenly-spaced, constant-power pilots, meaning that the number of data-bearing subcarriers between sets of adjacent pilot subcarriers is equal, and the power contained in each pilot is substantially equal. Evenly-spaced, constant-power pilots have assisted in achieving adequate system performance in many OFDM systems.

However, in some systems, guard bands consisting of a plurality of null edge subcarriers are designated at the lower and upper edges of the frequency band (i.e., the power contained in the null edge subcarriers is essentially zero). Although this has the beneficial effect of limiting the amount of spectral regrowth that may encroach on neighboring channels, the width of the guard band, in some systems, interferes with the ability to provide evenly-spaced pilots across neighboring channel boundaries (e.g., discontinuities in the even spacing occur across the guard bands). Accordingly, non-optimal results have been observed in such systems. More particularly, even though implementation of PSAM techniques may improve channel estimation performance and symbol error rate (SER) performance, performance improvements may be less significant in systems that include a guard band when compared with systems that do not.

Another limitation of the traditional pilot signal designs (i.e., designs that include evenly-spaced, constant-power pilots) is that such designs are not extensible to multiple transmit antenna systems, such as multiple-input multiple-output (MIMO) and multiple-input single-output (MISO) systems. In such systems, multiple co-located or distributed antennas are used simultaneously to transmit wireless signals that include the same data or different data that occurs within a same data stream. The desirability of such systems is growing, because the transmission by multiple antennas has been shown to improve diversity performance, thus reducing the receiver demodulation bit error rate. In addition, data throughput and link range may be increased without increasing bandwidth or transmit power.

As mentioned above, inclusion of the guard band may be desirable in order to limit the amount of spectral regrowth that may encroach on neighboring channels. Accordingly, for systems in which null edge subcarriers and pilot subcarriers are allocated within a signal's frequency spectrum (e.g., systems in which a guard band is used in conjunction with PSAM techniques), what are needed are methods and apparatus for generating and communicating signals with improved channel estimation and/or SER performance over traditional techniques. What are further needed are methods and apparatus for generating and communicating such signals in systems that implement multiple transmit antennas (e.g., MIMO, MISO, and other systems). Other features and characteristics of the inventive subject matter will become apparent from the subsequent detailed description and the appended claims, taken in conjunction with the accompanying drawings and this background.

BRIEF DESCRIPTION OF THE DRAWINGS

The inventive subject matter will hereinafter be described in conjunction with the following drawing figures, wherein like numerals denote like elements.

DETAILED DESCRIPTION

Figure 1:
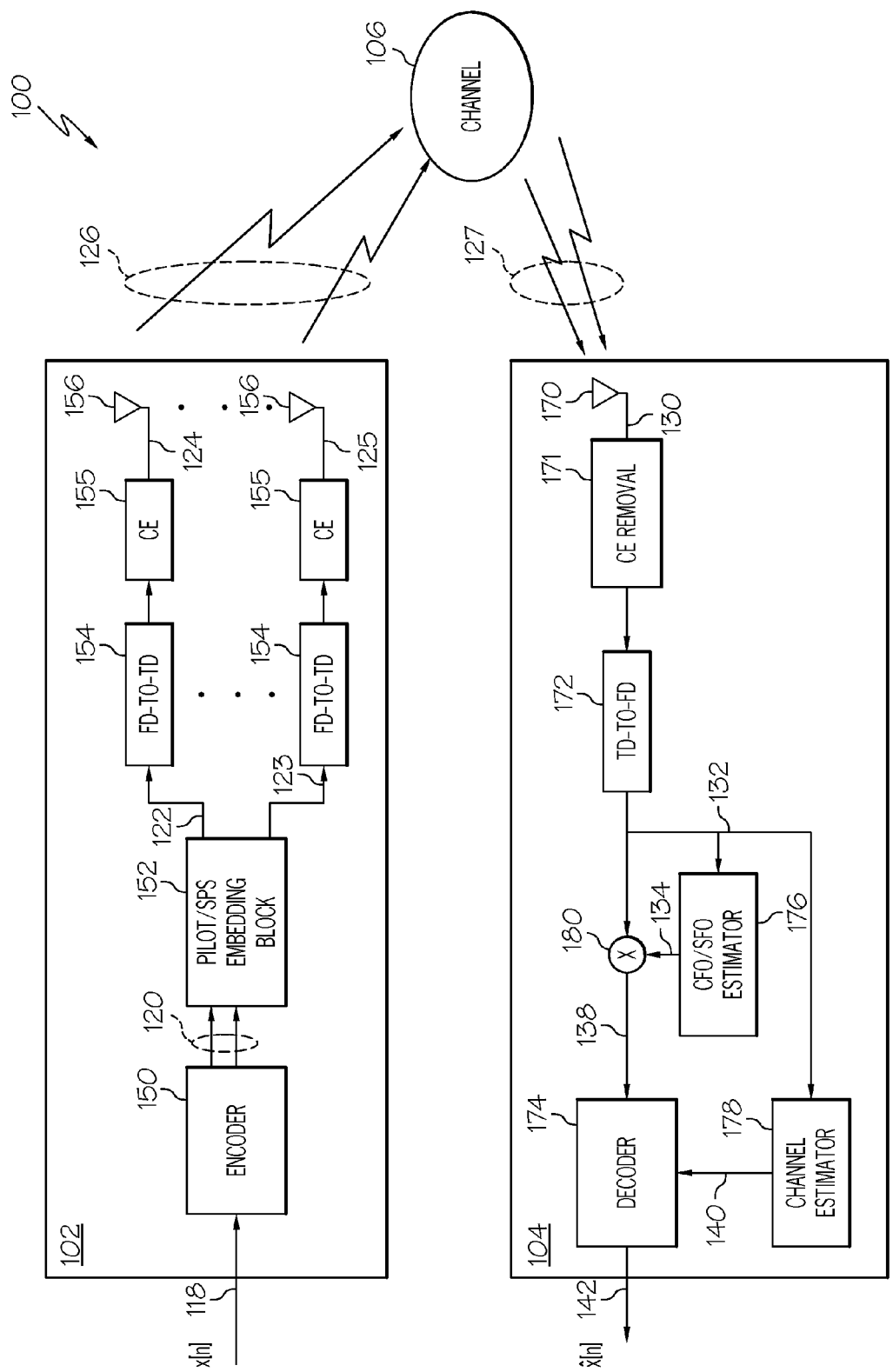
FIG. 1 is a simplified block diagram of a multiple-in single-out (MISO) communication system, in accordance with an example embodiment.

The following detailed description of the inventive subject matter is merely exemplary in nature and is not intended to limit the inventive subject matter or the application and uses of the inventive subject matter. Furthermore, there is no intention to be bound by any theory presented in the following detailed description.

Embodiments include methods and apparatus for generating and wirelessly communicating signals in multiple transmit antenna systems in which null edge subcarriers (e.g., guard bands) and pilot symbol assisted modulation (P SAM) are implemented. According to an embodiment, each simultaneously transmitted signal includes a plurality of pilot signals, which have variable pilot signal parameters and which do not interfere with the pilot signals of other ones of the simultaneously transmitted signals. The term "variable pilot signal parameters," as used herein, means that one or more of the plurality of pilot signals being transmitted has one or more different pilot signal parameters when compared with the pilot signal parameters for one or more other pilot signals being transmitted. In an embodiment, pilot signal parameters include parameters within a group that includes pilot power and pilot spacing with respect to adjacent pilots. In various embodiments, variable pilot signal parameters are determined using a cubic (e.g., $3^{rd}$ order) or higher (e.g., 4th, 5th or higher order) polynomial parameterization of the pilot subcarriers in conjunction with a convex optimization algorithm to produce pilot designs that may have near-optimal channel estimate mean square error (MSE) performance.

According to an embodiment, wireless signals are transmitted that have unequal power pilots, which are positioned at pilot subcarriers that are unevenly-spaced. As used herein, the term "unevenly-spaced" means that the number of non-pilot subcarriers between at least one pair of adjacent pilot signals is substantially different from the number of non-pilot subcarriers between at least one other pair of adjacent pilot signals in the plurality of pilot signals, where the term "substantially different" in this context means at least ±1 different from. In contrast, the term "evenly-spaced" means that the number of non-pilot subcarriers between each pair of adjacent pilot signals is the same, in the in-band region, for each pair of adjacent pilot signals in the plurality of pilot signals, where the "in-band" (or "passband") region means the portion of a channel between the null edge subcarriers (e.g., the data-bearing portion of the channel or the non null-edge subcarrier region). As used herein, the term "data" may refer to a symbol (or other data representation) associated with a preamble or actual user data, and the term "data-bearing," as it refers to a subcarrier or otherwise means that the subcarrier is designated to carry information associated with a symbol (e.g., a preamble symbol or a user data symbol), pilot information, and/or synchronization information. As used herein, the term "unequal power" means that the power contained within one or more of the pilot signals in the plurality of pilot signals is substantially different from the power contained within one or more other pilot signals in the plurality of pilot signals, wherein the term "substantially different" means having a value that is at least 5% greater than or less than another value. In contrast, the term "substantially equal" means that each pilot signal of the plurality of pilot signals contains substantially the same power, wherein the term "substantially the same" means having values that fall within a range of 0% to 5%.

A signal communicated according to another embodiment includes a plurality of pilot signals that are positioned at unevenly-spaced pilot subcarriers, although the pilot signals may have substantially equal power. A signal communicated according to yet another embodiment includes a plurality of unequal power pilot signals, although the pilot signals may be positioned at evenly-spaced pilot subcarriers.

The following notations apply to the below description. Upper case and lower case bold faced letters represent matrices and column vectors, respectively; $X^T$ and $X^H$ stand for the transpose and the Hermitian transpose of X, respectively; $E[\bullet]$ is the expectation operator; $\|x\|_n$ is the $l^n$ norm of x; $|x|$ is a vector that is the element-wise magnitude of x; $A^+ = (A^H A)^{-1} A^H$ is the pseudoinverse of matrix A; $|A|$ is the cardinality of set A; $((\cdot))_N$ is the modulo N operation; int $(\cdot)$ rounds the argument to the nearest integer; $D_x$ is a diagonal matrix with vector x on the diagonal; and the N×N discrete Fourier transform (DFT) matrix is denoted by $[Q]_{k,n}=N^{-1/2}\exp(-j2\pi(n-1)(k-1)/N)$.

Embodiments include methods for determining variable pilot signal parameters for a multiple transmit antenna system, and for generating and communicating signals that include pilots conforming to those parameters. These embodiments may have one or more significant advantages over traditional techniques. For example, embodiments may have improved channel estimation and/or SER performance over traditional techniques. In addition, embodiments may jointly provide for robust synchronization, low peak-to-average ratios (PARs), and accurate channel estimation, among other things. Signals generated according to various embodiments may have synchronization properties (e.g., compensation for timing offsets and frequency offsets) that are comparable to and potentially better than for signals generated using traditional techniques. In addition, low PARs may be achieved because embodiments may enable a transmitter's power amplifier to be operated more efficiently. In addition to the above advantages, embodiments may result in increased link ranges, because signals may be transmitted using lower power, and correspondingly may be less susceptible to detection. Conversely, embodiments may result in higher link margins, as it may be possible to transmit higher-power signals using a given power amplifier, when compared to traditional techniques that utilize non-constant envelope transmissions. In addition, for battery-powered apparatus, improved battery life may be achieved, because the power amplifier may be operated at a higher efficiency than using traditional techniques.

Embodiments may be utilized in various types of systems. For example, embodiments may be utilized in a variety of multi-carrier communication systems, single-carrier communication systems, spread spectrum communication systems, and/or wireline communication systems in which PSAM is employed. Although embodiments discussed in detail below may pertain to a multi-carrier communication system, or more particularly to an orthogonal frequency division multiplexing (OFDM) system or an orthogonal frequency division multiple access (OFDMA) system, it is to be understood that other embodiments may apply to other types of systems, as well. For example, but not by way of limitation, the various embodiments may apply to any single-carrier and/or spread-spectrum communication system that employs training information sent from a transmitter for purposes of channel estimation and/or synchronization of timing and frequency offsets at the receiver. Embodiments may be implemented in various types of communication systems that perform channel estimation/training/identification and/or synchronization by using periodically or aperiodically transmitted synchronization/pilot sequence (SPS) symbols inserted during any desired portion of data (information) transmission/reception. According to various embodiments, SPS symbols may be inserted (in time) as frequently as desired in any single carrier or spread spectrum signal. Embodiments include embedded synchronization methods and apparatus that are employed in a selected mapping (SLM) system, and accordingly such embodiments may be referred to herein as SPS-SLM. Embodiments of SLM systems will be described in more detail later. It is to be understood that other embodiments may apply to systems in which selected mapping techniques are not employed.

FIG. 1 is a simplified block diagram of a MISO communication system 100 that includes transmit and receive devices 102, 104 that communicate over a wireless communication channel 106, in accordance with an example embodiment. Multi-carrier communication system 100 may be, for example but not by way of limitation, a currently existing or future multi-carrier based, ultra-wideband system, an OFDM system, an OFDMA system, a multi-carrier code division multiple access (MC-CDMA) system, a wideband code division multiple access (W-CDMA) system, a wireless local area network (WLAN), a digital video broadcast (DVB) system, a digital audio broadcast (DAB) system, a broadband radio access network (BRAN), a WiMAX (Worldwide Interoperability for Microwave Access) system, a multi-user or single-user multiple-input multiple-output (MIMO) system, a multi-user or single-user multiple-input single-output (MISO) system, a system in which other wideband wireless transmission techniques are used and in which frequency-selective fading may be present, and/or a number of other types of multi-carrier communication systems. System 100 may implement communications between devices 102, 104 based on proprietary, existing, and/or emerging standards or protocols, such as, for example but not by way of limitation, an IEEE (Institute of Electrical and Electronics Engineers) 802.16 standard (WiMAX, MIMO-WiMAX), an IEEE 802.11a, e, g, and/or n standard (WLAN, MIMO-WLAN), an ETSI (European Telecommunications Standards Institute) BRAN HiperLAN 2 standard, a DVB standard, a DVB-T (DVB Terrestrial) standard, a DAB standard, a WLAN standard, WNW (Wideband Networking Waveform) standard, a MIMO-OFDM standard, a MIMO-OFDMA standard, and/or other standards or proprietary protocols.

Each of devices 102, 104 may be, for example but not by way of limitation, a device selected from a group of devices comprising a cellular telephone, a radio, a one-way or two-way pager, a personal data assistant, a computer (e.g., a laptop or desktop computer), a base station, and/or an unmanned autonomous vehicle. For purposes of simplicity, transmit device 102 is depicted as a transmit-only device, and receive device 104 is depicted as a receive-only device. It is to be understood that transmit device 102 also may include a receiver, and/or receive device 104 also may include a transmitter. In such embodiments, system 100 may provide for two-way communications between devices 102, 104.

According to an embodiment, transmit device 102 includes an encoder 150, pilot/SPS embedding block 152, a plurality of frequency domain to time domain (FD-to-TD) transformers 154, a plurality of cyclic extension (CE) blocks 155, and a plurality of antennas 156. Although two FD-to-TD transformers 154, two CE blocks 155, and two antennas 156 are illustrated, other embodiments may include more than two FD-to-TD transformers 154, CE blocks 155, and/or antennas 156. Either way, with multiple antennas 156, device 102 is configured to function as a transmitter of a multiple transmit antenna system (e.g., a MIMO or MISO system).

Encoder 150 receives a baseband, time-domain transmit signal in the form of a stream of symbols 118, x[n], where the symbols 118 have been modulated, for example, using an M-QAM (Quadrature Amplitude Modulation) modulation process, although other modulation techniques may be used as well. According to an embodiment, symbols 118 are structured so that a preamble, $x_p[n]$, precedes information symbols, $x_d[n]$, and thus $x=[x_p x_d]^T$. As will be described in more detail later, the preamble is configured to enable course/fine synchronization and channel estimation at receive device 104, according to an embodiment. Encoder 150 performs an encoding process to produce encoded symbols 120. According to an embodiment, encoder 150 encodes the data symbols, $x_d[n]$, using space-frequency block-codes (SFBC), which may be transmitted in one OFDM block duration. For example, when transmit device 102 includes two antennas 156, the SFBC encoding of two symbols, $s_0$ and $s_1$, may be performed across two OFDM subcarriers, $f_i$ and $f_{i+k}$ using the Alamouti code, as denoted in Table 1 by:

TABLE 1

|       | antenna 1 | antenna 2 |
|-------|-----------|-----------|
| $f_i$     | $s_0$         | $s_1$         |
| $f_{i+k}$ | $-s_1^*$      | $-s_0^*$      | where $(\bullet)^*$ is the complex conjugate operator. This process is continued until all $|K_{si}|$ of the N OFDM subcarriers are assigned, where $K_{si}$ denotes the data subcarrier indices and $|K_{si}|$ is the cardinality of $K_{si}$. Because the fine carrier frequency offset (CFO), sampling frequency offset (SFO), and channel may be estimated using the preamble part, $x_p$, and if the channel is approximately constant over a packet burst, then $|K_{si}|=N-|K_n|$, where $K_n$ denotes the null (unused) subcarrier indices and $|K_n|$ is the number of null subcarriers. In other embodiments, encoding processes other than SFBC may be used. The preamble symbols, $x_p[n]$, are not encoded using SFBC, in an embodiment.

The composite transmitted preamble signal from the plurality of antennas 156 may be denoted as:

$$x_p = \sum_{i=1}^{A} x_p^i, \qquad \text{(Equation 1)}$$

where $x_p^i$ is the preamble symbol for the ith antenna, and A is the number of transmit antennas. Similarly, the composite transmitted data signal from the plurality of antennas 156 may be denoted as:

$$x_d = \sum_{i=1}^{A} x_d^i, \qquad \text{(Equation 2)}$$

where $x_d^i$ is the data symbol for the ith antenna.

As will be discussed in more detail later, different pluralities of pilot signals having variable pilot signal parameters are embedded within the preamble and/or data symbols 120 by pilot/SPS embedding block 152, resulting in the generation of PSAM symbols 122, 123, according to an embodiment. It should be noted that, although the term "PSAM symbol" is used herein, the PSAM symbols 122, 123 generated in accordance with an embodiment are different from conventionally-generated PSAM symbols, as will be explained in more detail below. Therefore, the term "PSAM symbol" is not meant to be interpreted as corresponding to a conventionally-generated PSAM symbol.

According to a further embodiment, a synchronization signal also is embedded within each preamble and data symbol 120 by pilot/SPS embedding block 152, and the pilot signals and the synchronization signal together may be referred to as a synchronization/pilot sequence (SPS) or a joint synchronization/pilot sequence (JSPS). As will be discussed in more detail in conjunction with FIG. 3, transmit device 102 may generate multiple candidate signals, each with different pilot signals, and may select one of the candidate signals for transmission, according to an embodiment. When $\tilde{x}$ is the same as x, but with the cyclic extension removed, then prior to the cyclic extension, the baseband signal for antenna i is:

$$\tilde{x}^i[n] = \frac{1}{\sqrt{N}} \sum_{k=0}^{N-1} X_k e^{j2\pi nk/N}, \qquad \text{(Equation 3)}$$

where n represents the nth element of vector x, $n \in \{0, 1, \ldots, N-1\}$, $\{X_k\}_{k \in K_{si}}$, $\{X_k\}_{k \in K_{spi}}$, and $\{X_k\}_{k \in K_n}$ are the non-zero SFBC encoded symbols during the data part, the non-zero part of the pilot signal or the SPS during the preamble part, and a zero vector for the null subcarriers at indices $K_n$ for both the data and preamble parts.

Each of FD-to-TD transformers 154 performs a time domain to frequency domain conversion (e.g., utilizing an inverse fast Fourier transform) of a PSAM symbol 122, 123. Each of CE blocks 155 receives the time domain version of a PSAM symbol 122, 123 (e.g., a symbol of N samples) produced by an FD-to-TD transformer 154, and performs a cyclic extension process to the signal. The cyclic extension process includes copying a number of the last samples of each symbol to the front part of the symbol (e.g., a number of the last samples are pre-pended to the front part of the symbol). Performing the cyclic extension process may mitigate effects that would otherwise result from multipath delay spread (e.g., inter-symbol interference). The resulting cyclically-extended, time domain signals are upconverted (e.g., by an upconverter, not illustrated) and amplified (e.g., by an amplifier, not illustrated) in order to produce a radio frequency (RF) signal 124, 125. The RF signals 124, 125 simultaneously are radiated onto the wireless channel 106 by antennas 156 in the form of a plurality of wireless signals 126.

Receive device 104 includes an antenna 170, a CE removal block 171, a time domain to frequency domain (TD-to-FD) transformer 172, a decoder 174, a carrier frequency offset (CFO)/sampling frequency offset (SFO) estimator 176, and a channel estimator 178, according to an embodiment. Although only one antenna 170, CE removal block 171, and TD-to-FD transformer 172 are illustrated, other embodiments may include two or more antennas 170, CE removal blocks 171, and/or TD-to-FD transformers 172. With a single antenna 170, as shown, receive device 104 may be configured to function as a receiver of a MISO system. In an embodiment in which receive device 104 includes multiple antennas, receive device 104 may be configured to function as a receiver of a MIMO system.

Either way, an antenna 170 of receive device 104 may produce a channel-affected signal 130, y[n], from wireless signals 127 received from the wireless channel 106. The channel-affected signal 130 is downconverted (e.g., by a downconverter, not illustrated), the cyclic extension is removed by CE removal block 171, and the resulting time domain signal is converted to the frequency domain by TD-to-FD transformer 172 (e.g., utilizing a fast Fourier transform), resulting in a baseband, frequency domain version of the received signal 132. CFO/SFO estimator 176 determines fine CFO and SFO estimates 134 using the preamble pilot signal (e.g., the pilot part of an SPS), and the frequency of the received signal 132 is adjusted based on the fine CFO and SFO estimates 134 via frequency adjustment element 180, to produce an offset adjusted, received signal 138. Channel estimator 178 also uses the preamble pilot signal to determine estimated channel perturbations in the form of a channel estimate 140 (e.g., an estimate of the channel frequency response). According to an embodiment, the transmitted pilot signals within each wireless signal 126 are orthogonal, and accordingly the CFO/SFO estimator 176 and the channel estimator 178 may perform completely decoupled processes, which may be of relatively low complexity. Decoder 174 uses the channel estimate 140 during the process of decoding the offset adjusted, received signal 138, and generates output data symbols 142, x̂[n], representing estimates of the input data symbols 118. The functionality of the transmit and receive devices 102, 104 are described only briefly in conjunction with the description of FIG. 1. More detailed descriptions of the details of various transmitter and receiver embodiments are described later, in conjunction with FIGS. 3-13.

As alluded to above, a wireless signal transmitted over a channel (e.g., channel 106) may be adversely affected by the channel, and a receiver that receives a channel-affected version of the transmitted signal may attempt to determine and correct for estimated channel perturbations reflected within the channel-affected signal. In fact, the channel perturbations generated by channel 106 may not be the same for signals transmitted by different antennas 156 of transmit device 102. A number of factors may induce differences in the multiple transmitted signals. For example, the characteristics of each antenna 156 (and its associated power amplifier) may be different, and signals transmitted by the multiple antennas 156 may be at different frequencies. In order to better convey how a receiver may determine and correct for estimated channel perturbations, in accordance with various embodiments, a simplified channel model will now be described.

Figure 2:
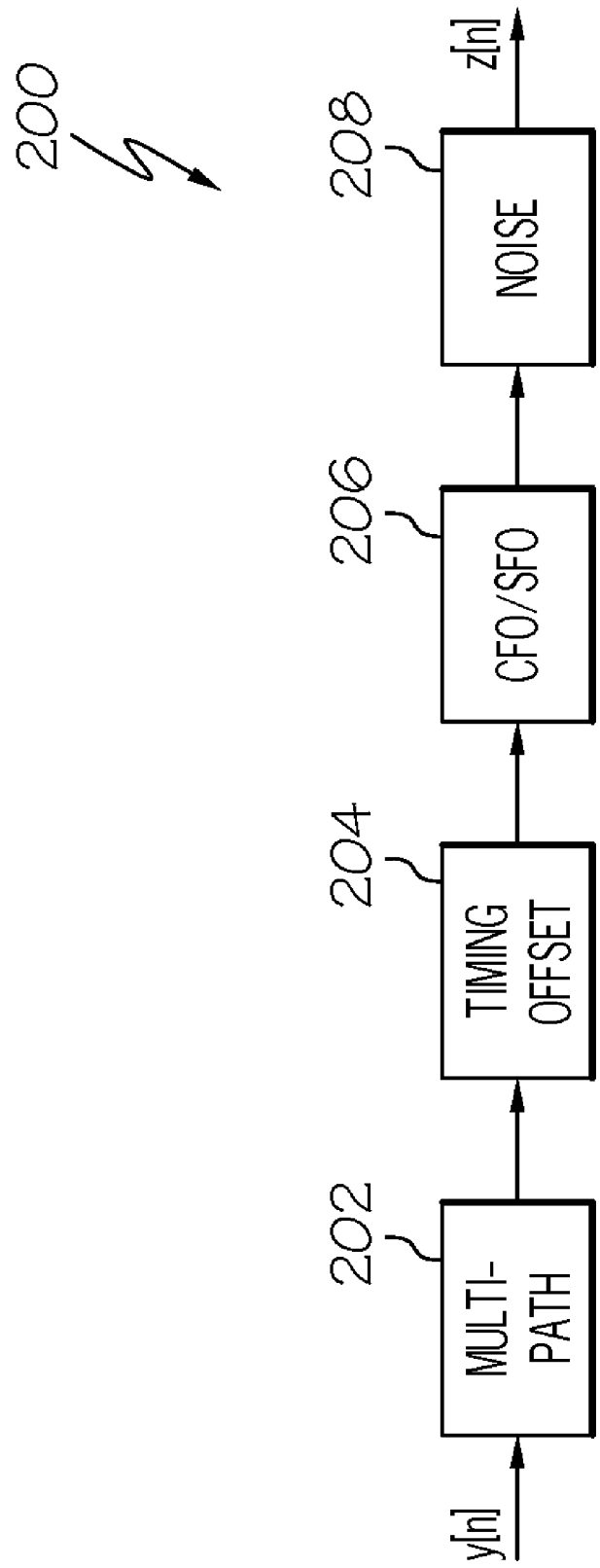
FIG. 2 is a simplified block diagram of a channel model, in accordance with an example embodiment.

FIG. 2 is a simplified block diagram of a channel model 200, in accordance with an example embodiment. In particular, channel model 200 illustrates various channel characteristics that may affect (e.g., perturb) a signal transmitted over the channel, and more particularly an unsynchronized mobile channel that operates upon signals generated by a peak power-constrained system. These characteristics include, for example, a multi-path fading component 202 (which, in the frequency domain, manifests itself as frequency selective fading), a timing offset (TO) component 204, a CFO/SFO component 206, and an additive noise component 208. Although not strictly part of the channel model, the input-to-output characteristic of each transmitter's power amplifier (e.g., power amplifiers 316, 317, FIG. 3 or 416, 417, FIG. 4), which may or may not be assumed to be time-invariant, also may affect the characteristics of a transmitted wireless signal. A signal, z[n], to which the channel model 200 and the power amplifier input-to-output characteristic has been applied may be represented, for example, by the equation:

$$y[n]=(f_{PA}(y[n-n_0])*h[\tau])e^{-j2\pi\epsilon/N}+\eta[n],$$ (Equation 4)

where $f_{PA}(\cdot)$ represents the power amplifier input-to-output characteristic for a transmitting antenna, which may be assumed to be time-invariant (although the input-to-output characteristic may be time-variant, in other embodiments), $h[\tau]$ represents multi-path fading component 202, $y[n-n_0]$ represents a transmitted signal, $y[n]$, subjected to a TO component 204, $e^{-j2\pi\epsilon/N}$ represents a CFO component 206, $\eta[n]$ represents an additive noise component 208, and * is the convolution operator.

Figure 3:
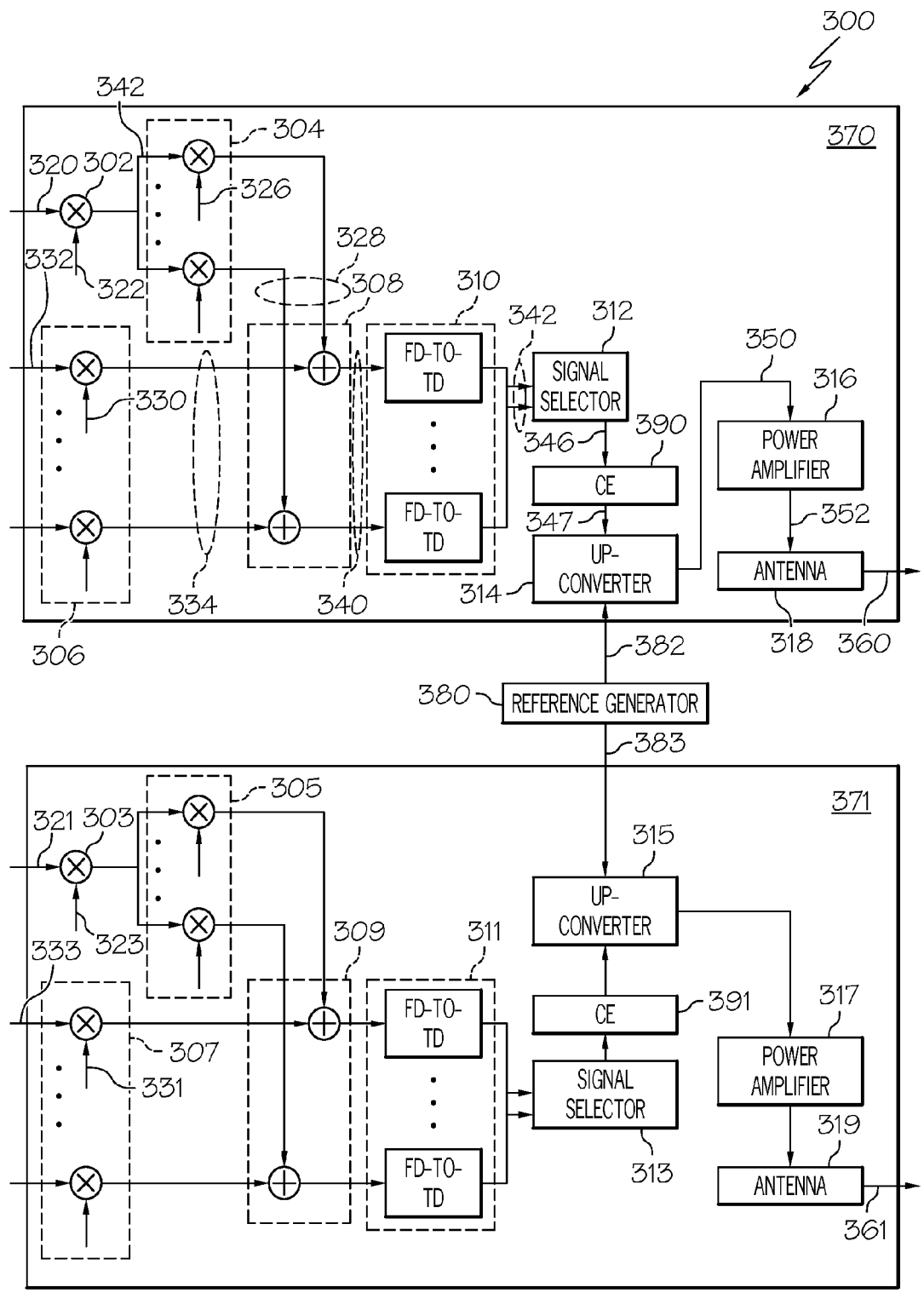
FIG. 3 is a simplified block diagram of a portion of a transmit system having two co-located antennas, in accordance with an example embodiment.

More detailed descriptions of various embodiments of transmit devices and systems (e.g., transmit device 102, FIG. 1) and receive devices and systems (e.g., receive device 104, FIG. 1) and methods of their operation will now be described. In particular, FIG. 3 is a simplified block diagram of a portion of a transmit system 300 having two "co-located" antennas 318, 319, in accordance with an example embodiment. As used herein, the term "co-located," as it applies to a plurality of antennas, means that the signals transmitted by the antennas are up-converted using a same or synchronized RF frequency reference (e.g., reference signals 382, 383 generated by reference generator 380, FIG. 3). Co-located antennas may have a relatively small spatial distance between each other (e.g., they may be housed within a same housing of a device), although they may be spatially separated from each other, as well. Although transmit system 300 includes two co-located antennas 318, 319, a transmit system may include more than two co-located antennas, in other embodiments.

Transmit system 300 may correspond to a portion of a transmit device (e.g., transmit device 102, FIG. 1) that provides a pilot or SPS embedding functionality (e.g., pilot/SPS embedding block 152, FIG. 1), conversion of a PSAM signal to a form that is suitable for RF transmission (e.g., FD-to-TD transformers 154, FIG. 1 and other components), and radiation of the RF signal over a wireless channel (e.g., antennas 156, FIG. 1), among other things. Instantiations of the pilot/SPS embedding functionality and the RF signal conversion functionality may be provided in conjunction with each transmit antenna (e.g., antennas 318, 319), according to an embodiment, and such an embodiment is shown in FIG. 3. More particularly, transmit system 300 is shown to include a first RF signal generator 370 associated with a first antenna 318, and a second RF signal generator 371 associated with a second antenna 319. Although FIG. 3 represents an embodiment in which the pilot/SPS embedding function and the RF signal generation function are performed, for each antenna 318, 319, by distinct hardware, firmware, and/or software, it is to be understood that the various functions may be performed for multiple antennas by the same or different hardware, firmware, and/or software, according to various embodiments.

According to an embodiment, a pilot or SPS embedding functionality is provided, for each antenna 318, 319, by a data/scaling factor combiner 302, 303, a plurality of phase shifters 304, 305, a plurality of pilot or SPS/scaling factor combiners 306, 307, and a plurality of data/SPS combiners 308, 309, which are operatively coupled together as illustrated in FIG. 3, in an embodiment. An RF signal conversion functionality is provided, for each antenna 318, 319, by a plurality of frequency domain-to-time domain (FD-to-TD) transformers 310, 311, a signal selector 312, 313, a cyclic extension (CE) block 390, 391, an up-converter 314, 315, and a power amplifier 316, 317, which are operatively coupled together as illustrated in FIG. 3, in an embodiment. For purposes of conciseness, the above-listed functional components will be described in detail only for the first RF signal generator 370, as the analogous functional components in the second RF signal generator 371 operate substantially similarly to those of the first RF signal generator 370. Differences in the processing performed by the first and second RF signal generators 370, 371 will be pointed out, below.

In the first RF signal generator 370, data/scaling factor combiner 302 includes computational apparatus adapted to receive a sequence of input data symbols 320, $X_k$, each of which represents a data-bearing part of a signal to be transmitted. For example, each input data symbol 320 may be an SFBC-encoded symbol (e.g., as produced by encoder 150, FIG. 1). In parallel with receipt of symbols 320 by data/scaling factor combiner 302, the data/scaling factor combiner 303 in the second RF signal generator 371 may receive another sequence of input data symbols 321. For example, the first sequence of input data symbols 320 may include symbol s0, and the second sequence of input data symbols 321 may include symbol s1, as discussed previously in conjunction with the discussion of SFBC encoding.

According to an embodiment, data/scaling factor combiner 302 can be chosen to be operational only during data durations of the transmitter signal(s). During preamble durations of the defined transmit signals, the data/scaling factor combiner 302 may be disabled or the data/scaling factor may be set to zero, which represents a condition in which only preamble/header information is transmitted. Furthermore, the synchronization part of the SPS/scaling factor may be chosen to be zero during the data durations of the transmission, according to an embodiment, although this is not necessarily so. In this case, only optimized pilot signals would be transmitted with the data information during the data durations of the transmit signal(s). Alternatively, the system may refrain from transmitting both the synchronization and pilot signals during some or all of the data durations of a transmitter signal. In still other embodiments, the SPS/scaling factor can be chosen to operate in a duty cycle mode, where the SPS/scaling factor is turned on (e.g., set to a nonzero value) and off (e.g., set to zero) at certain desired intervals. Such an implementation may enable an optimum operating scenario to be achieved based on channel properties.

When data/scaling factor combiner 302 is enabled, data/scaling factor combiner 302 is adapted to apply a first scaling factor 322 to an input data symbol 320 in order to produce a scaled input data symbol 324. In an embodiment, the first scaling factor 322 has a value of $\sqrt{1-\rho}$, where $\rho$ is an embedding factor having a value between 0 and 1. The embedding factor represents a ratio of SPS power to signal power, which may be represented as $$\rho = \frac{\sum_k |S[k]|^2}{\sum_k |Y[k]|^2}.$$

In a particular embodiment, the embedding factor has a value in a range of about 0.25 to about 0.35. In another embodiment, the embedding factor has a value in a range of about 0.2 to about 0.4. In still other embodiments, the embedding factor may have higher or lower values than the above-given ranges. The scaled input data symbol 342 may be represented as $\sqrt{1-\rho}X_k$. According to an embodiment, data/scaling factor combiner 303 of the second RF signal generator 371 is adapted to apply, to each input data symbol 321, the same scaling factor that is applied by data/scaling factor combiner 302, although data/scaling factor combiner 303 may apply a different scaling factor, in another embodiment.

Each of the plurality of phase shifters 304 includes computational apparatus adapted to apply a different phase shift 326, $e^{j\Phi_k^{(d)}}$, to the scaled input data symbol 324, in order to produce a plurality of phase shifted input data signals 328, $\sqrt{1-\rho}X_k^{(d)}e^{j\Phi_k^{(d)}}$, where D is a value referred to herein as a candidate number quantity, d is an index referred to herein as a relational index, and d$\in\{1, 2, \ldots, D\}$. The candidate number quantity, D, may be selected as any integer number from 1 to 16, in an embodiment, although the candidate number quantity may be a larger number, in other embodiments. In a particular embodiment, the candidate number quantity is selected as an integer number between 3 and 10. In an embodiment, the number of phase shifters 304 and the number of phase shifted input data signals 328 produced equals the candidate number quantity D, although the number of phase shifters 304 and/or the number of phase shifted input data signals 328 may be unequal to D, in other embodiments. The different phase shifts 326 may be represented within entries of a table of phase shift values, in an embodiment, and the relational index, d, may be used as an index into the phase shift value table, among other things. Accordingly, the phase shift value table may have D entries, in an embodiment, although the phase shift value table may have more or fewer entries in other embodiments. According to an embodiment, the plurality of phase shifters 305 of the second RF signal generator 371 is adapted to apply, to each scaled input data symbol 343, the same phase shifts that are applied by phase shifters 305, although plurality of phase shifters 305 may apply different phase shifts, in another embodiment.

First RF signal generator 370 also is adapted to obtain a plurality of SPS 332, $S_k^{(d)}$, each of which represents a unique synchronization/pilot sequence. In an embodiment, the plurality of SPS 332 may be obtained from a table of SPS, which is accessible to or stored in transmit system 300, and which includes one or more sets of pre-generated SPS, each of which may be referenced by a unique index (referred to below as an SLM index). Each SPS 332 in the transmitter's SPS table is represented in the frequency domain, in an embodiment. In an embodiment, each SPS includes synchronization information and pilot signals, and those pilot signals may have variable pilot signal parameters (e.g., variable pilot spacing, pilot subcarriers, and/or pilot power). In an alternate embodiment, the synchronization information and pilots may be separately represented. According to an embodiment, the pilot subcarriers associated with the pilots for the first RF signal generator 370 are different from the pilot subcarriers for the pilots for the second RF signal generator 371 for any given OFDM block duration. In a system in which more than two RF signal generators are implemented (e.g., a system with three or more antennas), the pilot subcarriers associated with the pilots for a particular RF signal generator are different from the pilot subcarriers associated with the pilots for each of the other RF signal generators for any given OFDM block duration. Embodiments of methods for determining pilot signal parameters will be described in more detail later in conjunction with FIG. 10.

SPS/scaling factor combiners 306 include computational apparatus adapted to apply second scaling factors 330 to the plurality of SPS 332 in order to produce a plurality of scaled SPS 334, $\sqrt{\rho}S_k^{(d)}$, where d is the relational index. Similar to its functionality with respect to the phase shift value table, the relational index, d, also may be used as an index into the SPS table. When used in this context, the relational index alternatively may be referred to as an SLM index. As with the phase shift value table, the SPS table also may have D entries, although the SPS table may have more or fewer entries in other embodiments. In addition, in an embodiment, the number of SPS/scaling factor combiners 306 and the number of scaled SPS 334 produced equals the candidate number quantity D, although the number of SPS/scaling factor combiners 306 and/or the number of scaled SPS 334 may be unequal to D, in other embodiments. In the above-described embodiment, each different phase shift value 326 may be related to a unique SPS 332 via the relational index, d. In alternate embodiments, a particular phase shift value 326 may be related to multiple unique SPS 332, or a particular unique SPS 332 may be related to multiple phase shift values 326 (e.g., by including duplicate values in the phase shift value table or the SPS table, for example).

In an embodiment, the second scaling factor 330 has a value of $\sqrt{\rho}$, where $\rho$ is the same embedding factor as the embedding factor incorporated in the first scaling factor 322. Because the first and second scaling factors 322, 330 have an inverse relationship, the value of the embedding factor, $\rho$, dictates how much relative signal power is allocated to a data-bearing component, $X_k^{(d)}$, of a transmitted signal as opposed to an SPS component, $S_k^{(d)}$ of the transmitted signal. According to an embodiment, SPS/scaling factor combiners 307 of the second RF signal generator 371 are adapted to apply, to the plurality of SPS 333, the same scaling factors that are applied by SPS/scaling factor combiners 306, although SPS/scaling factor combiners 307 may apply different scaling factors, in another embodiment.

Phase shifters 304 provide the plurality of phase shifted input data signals 328 to data/SPS combiners 308, and SPS/scaling factor combiners 306 provide the plurality of scaled SPS 334 to data/SPS combiners 308. Each of data/SPS combiners 308 includes computational apparatus adapted to combine one of the plurality of phase shifted input data signals 328 with one of the scaled SPS 334 in order to produce a plurality of combined signals 340, where the plurality of combined signals 340 may be represented in the frequency domain by the equation:

$$Y_k^{(d)} = \sqrt{\rho} S_k^{(d)} + \sqrt{1-\rho} X_k^{(d)} e^{j\Phi_k^{(d)}}. \quad \text{(Equation 5)}$$

In an embodiment, the number of data/SPS combiners 308 and the number of combined signals 340 produced equals the candidate number quantity D, although the number of data/SPS combiners 308 and/or the number of combined signals 340 may be unequal to D, in other embodiments.

According to an embodiment, the first RF signal generator 370 is adapted to determine PARs for candidate signals derived from at least some of the combined signals 340, and to identify a selected candidate signal (i.e., signal 346) based on the PARs (e.g., the selected candidate signal may be a candidate signal that exhibits the lowest PAR). Determination of the PAR for the candidate signals is performed in the time domain, according to an embodiment. Accordingly, data/SPS combiners 308 provide the plurality of combined signals 340 to FD-to-TD transformers 310. FD-to-TD transformers 310 include computational apparatus adapted to perform frequency domain-to-time domain transformations on each of the combined signals 340, in order to produce a plurality of candidate signals 342, $y^{(d)}[n]$. In an embodiment, the number of FD-to-TD transformers 310 and the number of candidate signals 342 produced equals the candidate number quantity D, although the number of FD-to-TD transformers 310 and/or the number of candidate signals 342 may be unequal to D, in other embodiments. The frequency domain-to-time domain transformation may include performing an inverse Fourier transform (IFT) or, more particularly, an inverse discrete Fourier transform (IDFT), in various embodiments, although other types of frequency domain-to-time domain transformations may be performed in other embodiments. Accordingly, in an embodiment, the plurality of candidate signals 342 may be represented as $y^{(d)}[n]=\text{IDFT}\{Y_k^{(d)}\}$ or alternatively by the following:

$$y^{(d)}[n] = \frac{1}{\sqrt{N}} \sum_{k=0}^{N-1} Y_k^{(d)} e^{j2\pi kn/N} \quad \text{(Equation 6)}$$
$$= x^{(d)}[n]\sqrt{(1-\rho)} + s^{(d)}[n]\sqrt{(\rho)}$$

where $x^{(d)}[n]=\text{IDFT}\{X_k e^{j\Phi_k^{(d)}}\}$, $s^{(d)}[n]=\text{IDFT}\{S_k^{(d)}\}$, and $n \in \{0, 1, \ldots, N-1\}$. In an embodiment, an efficient algorithm for computing an IDFT may be implemented, such as an inverse fast Fourier transform (IFFT), for example. FD-to-TD transformers 310 may correspond, for example, to one of FD-to-TD transformers 154, FIG. 1, although only one FD-to-TD transformer 154 is illustrated for each antenna 156, in FIG. 1.

The above description indicates that, in an embodiment, the first RF signal generator 370 includes a number of phase shifters 304, a number of SPS/scaling factor combiners 330, a number of data/SPS combiners 308, and a number of FD-to-TD transformers 310 that is equal to the candidate number quantity, D, and that these transmitter elements are adapted to generate a same number, D, of phase shifted input data signals 328, scaled SPS 334, combined signals 340, and candidate signals 342, respectively. In other embodiments, each RF signal generator may include more or fewer than the candidate number quantity, D, of phase shifters, SPS/scaling factor combiners, data/SPS combiners, and/or FD-to-TD transformers, and/or some or all of these transmitter elements may be adapted to generate more or fewer than the candidate number quantity, D, of phase shifted input data signals, scaled SPS, combined signals, and/or candidate signals, respectively. Although the number of phase shifters 304, SPS/scaling factor combiners 330, data/SPS combiners 308, and/or FD-to-TD transformers 310 may be the same, in an embodiment, the numbers of these transmitter components 304, 330, 308, 310 and/or signals 328, 334, 340, 342 may be different, in other embodiments. For example, but not by way of limitation, data/SPS combiners 308 may combine a same phase shifted input data signal 328 with multiple scaled SPS 334, or data/SPS combiners 308 may combine a same scaled SPS 334 with multiple phase shifted input data signals 328, in various embodiments. In other embodiments, some signals may be disregarded when, for example, they fail to meet certain criteria and/or threshold levels, which ultimately may result in fewer than the candidate number quantity, D, of candidate signals 342 being provided to signal selector 312. Accordingly, embodiments of the inventive subject matter are not limited to there being a same number, D, of transmitter components 304, 330, 308, 310 and/or signals 328, 334, 340, 342.

FD-to-TD transformers 310 provide the plurality of candidate signals 342 to signal selector 312. In an embodiment, signal selector 312 includes computational apparatus adapted to determine peak-to-average ratios (PARs) for some or all of the candidate signals 342, and based on the PARs, to identify a selected signal 346 from the candidate signals 342. As used herein, the term peak-to-average ratio (PAR) means a measurement of a waveform that equals the peak amplitude of the waveform divided by the root mean squared (RMS) or time averaged value of the waveform. Although PAR reduction is discussed extensively herein, embodiments also apply to peak-to-average power ratio (PAPR) reduction, and use of the term PAR herein is intended to include at least PAR and PAPR. PAR is a metric that facilitates an assessment of the dynamic range of a signal, and a signal with a low PAR may be preferable, because it may allow the power amplifier 316 to operate at higher power efficiencies without substantial signal distortion. In an embodiment, the PAR for each of the candidate signals 342 may be calculated according to the following equation:

$$PAR\{y^{(d)}[n]\} = \frac{\max_n |y^{(d)}[n]|^2}{E[|y^{(d)}[n]|^2]}. \quad \text{(Equation 7)}$$

In an embodiment, signal selector 312 also performs a selected mapping (SLM) process, which is a PAR reduction tool that may reduce the PAR of OFDM symbols by multiple decibels (dBs). In a particular embodiment, signal selector 312 is adapted to identify the selected signal 346 as the candidate signal 342 with the lowest PAR. A selected mapping (SLM) index, d̃, of the candidate signal 342 with the lowest PAR may be determined, in an embodiment, according to the following equation:

$$\tilde{d} = \min_{d} PAR\{y^d[n]\}. \quad \text{(Equation 8)}$$

In accordance with an embodiment, PAR reduction is achieved by using D candidate signals 342, and selecting the candidate signal 342 with the lowest PAR. In another embodiment, additional PAR reduction may be achieved based on the design of the SPS 330, as will be described in more detail later. More particularly, when IDFT$\{S_k^{(d)}\}=s^{(d)}[n]$ has low PAR, the combined sequence of $y^{(d)}[n]=x^{(d)}[n]\sqrt{(1-\rho)}+s^{(d)}[n]\sqrt{(\rho)}$ may, on average, have a lower PAR than $x^{(d)}[n]$. The extent of PAR reduction is related to the magnitude of the embedding factor, ρ. When the embedding factor is increased, for example, PAR reductions also are increased. In an embodiment, the SPS 330 are designed to have a relatively low PAR (e.g., PAR<0.5 dB). In a particular embodiment, the SPS 330 are designed with arbitrary power spectral densities (PSD) using a convex optimization algorithm, as will be described in more detail later.

In order for the receiver (e.g., receiver 104, FIG. 1) to recover the input data symbol 320, $X_k$, (e.g., to determine an estimate, $\hat{X}_k$, of the input data symbol) the receiver should have knowledge of or estimate the SLM index, d̃. In an embodiment, the receiver has knowledge of possible values for $S_k^{(d)}$ and $\phi_k^{(d)}$ in the form of one or more tables that are accessible to (e.g., stored at) the receiver (e.g., receiver 104), where those tables correspond to the SPS table and the phase shift value table accessible to the transmit system 300. Accordingly, when the receiver has knowledge of SLM index, d̃, it may recover the input data symbol 320, $X_k$. Embodiments of methods and apparatus for a receiver to obtain knowledge of the SLM index, d̃ (e.g., to recover the SLM index, d̃, or to determine an estimate, $\hat{\tilde{d}}$, of the SLM index) will be discussed in more detail below, in conjunction with FIG. 12. Basically, embodiments achieve blind phase sequence detection without time and/or frequency synchronization, and/or a priori knowledge of the channel.

According to an embodiment, CE block 390 adds a cyclic extension to the selected signal 346 to produce a cyclically extended signal 347. In other embodiments, addition of a cyclic extension may be performed elsewhere (e.g., after each FD-to-TD converter 310 and before signal selector 312). Up-converter 314 receives the selected and cyclically extended signal 347, and is adapted to perform a frequency up-conversion and digital-to-analog conversion process on the signal 347, in order to convert the selected signal from a baseband or intermediate frequency (IF) to the radio frequency (RF) band. According to an embodiment, up-converter 314 receives and utilizes an RF frequency reference signal 382 from reference generator 380 during the up-conversion process. According to an embodiment, up-converter 315 of second RF signal generator 371 also receives an RF frequency reference signal 383 from reference generator 380. The RF frequency reference signals 382, 383 are derived from a same oscillator or reference generator, or from different reference generators that are synchronized with each other, in various embodiments. Accordingly, antennas 318, 319 may be considered to be co-located antennas, even though they are spatially separated (e.g., by an relatively small or large distance).

Referring again to the first RF signal generator 370, the analog up-converted signal 350 is amplified by power amplifier 316 to produce an amplified signal 352. The amplified signal 352 is converted to an analog RF signal 360 and transmitted over the channel (e.g., channel 106, FIG. 1) by antenna 318. Simultaneously, the similarly generated analog RF signal 361 (generated by second RF signal generator 371) is transmitted over the channel by antenna 319. Unlike some traditional techniques, the analog RF signals 360, 361 may be transmitted without a preamble, and the embedded synchronization/pilot sequence information provides a way for a receiver robustly to synchronize with a channel-affected version of the transmitted signal, as will be described in detail in conjunction with FIG. 11.

Figure 4:
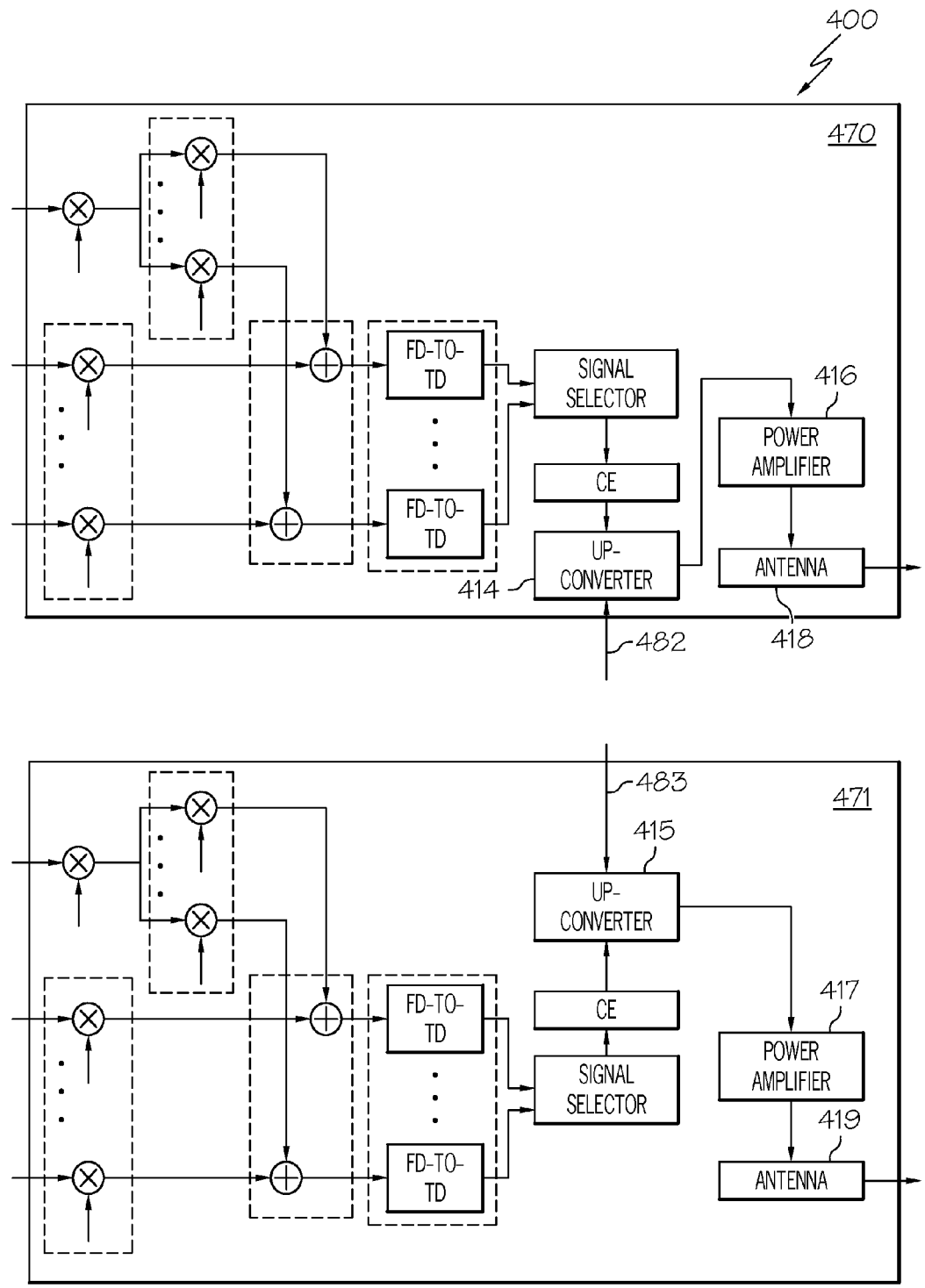
FIG. 4 is a simplified block diagram of a transmit system having multiple distributed antennas, in accordance with an example embodiment.

As mentioned previously, embodiments also may be implemented in systems that include distributed transmit antennas (e.g., antennas 418, 419, FIG. 4), as well as in systems that include co-located antennas (e.g., system 300, FIG. 3). FIG. 4 is a simplified block diagram of a transmit system 400 having multiple distributed antennas 418, 419, in accordance with an example embodiment. The various components of system 400 are substantially similar to analogous components of system 300 (FIG. 3), except that up-converters 414, 415 of system 400 receive RF frequency reference signals 482, 483 that are independently derived (e.g., they are not derived from the same oscillator or reference generator, or from different, synchronized reference generators). In addition, the spatial separation between distributed antennas 418, 419 may be significantly larger than the spatial separation between co-located antennas 318, 319 (FIG. 3), although that is not necessarily the case. For example, distributed antennas 418, 419 may be spatially separated by distances in a range from several millimeters to many kilometers.

Systems (e.g., system 400) that include distributed antennas (e.g., antennas 418, 419) have certain advantages over systems (e.g., system 300, FIG. 3) that include co-located antennas (e.g., antennas 318, 319, FIG. 3), under some circumstances. For example, a system with distributed antennas may be less vulnerable to experiencing a complete system outage if a device associated with one of the distributed antennas is damaged. In addition, spatially distributed antennas may be less vulnerable to capacity issues in channels that exhibit correlated fading and shadowing. Because they may have significantly larger spatial separation than co-located antennas, spatially distributed antennas also may provide increased communications range (e.g., two or more of the spatially separated antennas may be arrayed to increase the geographical area over which the system may communicate). However, as will be described in more detail, below, proper synchronization of the distributed antennas is important to ensure that potential multiple-transmit antenna capacity gains may be realized. In addition, it is desirable to maximize bandwidth efficiency in a system that includes multiple distributed antennas. Embodiments include transmission of OFDM waveforms using multiple distributed antennas (e.g., antennas 418, 419).

Figure 5:
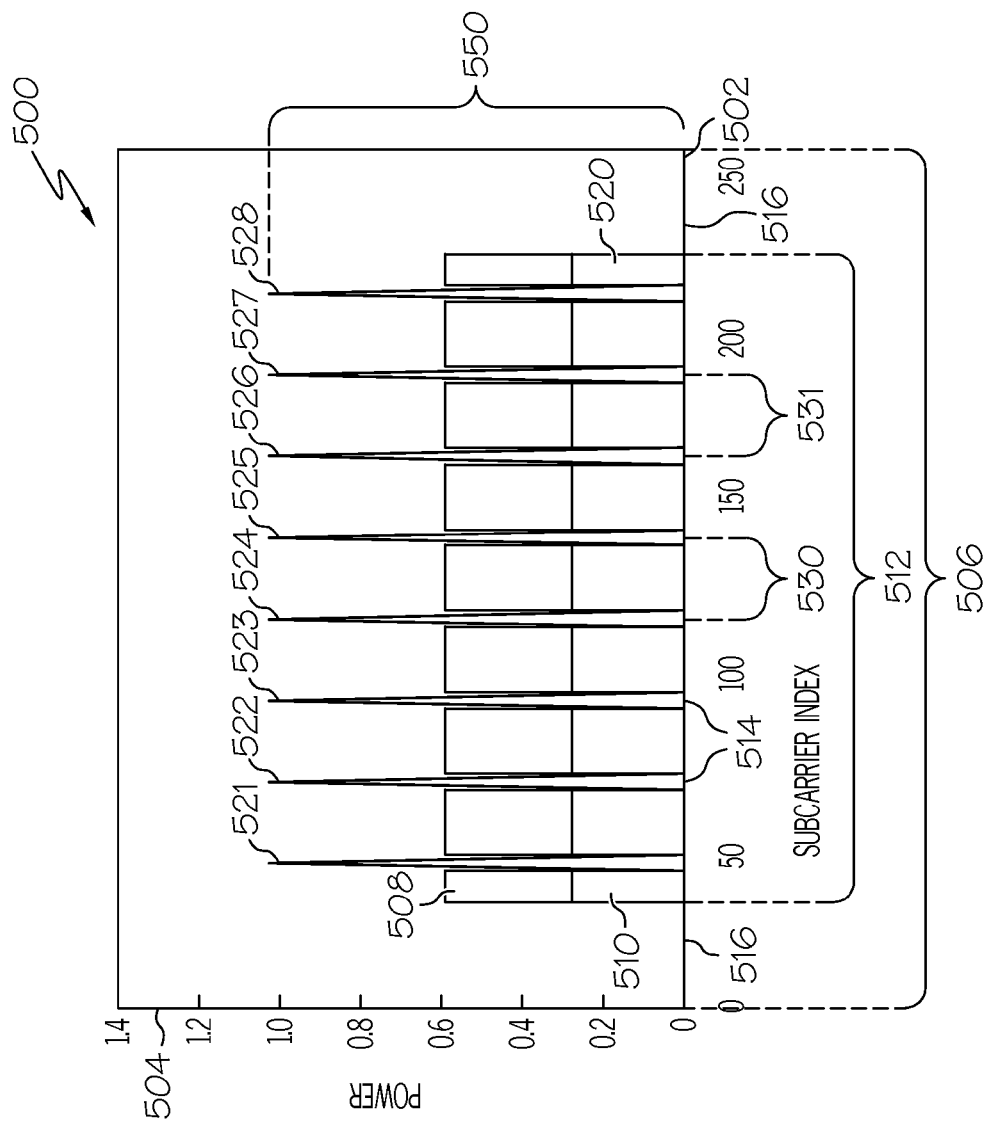
FIG. 5 is an example of a frequency-domain representation of a single transmit signal with evenly-spaced, equal-power pilot signals.
Figure 8A:
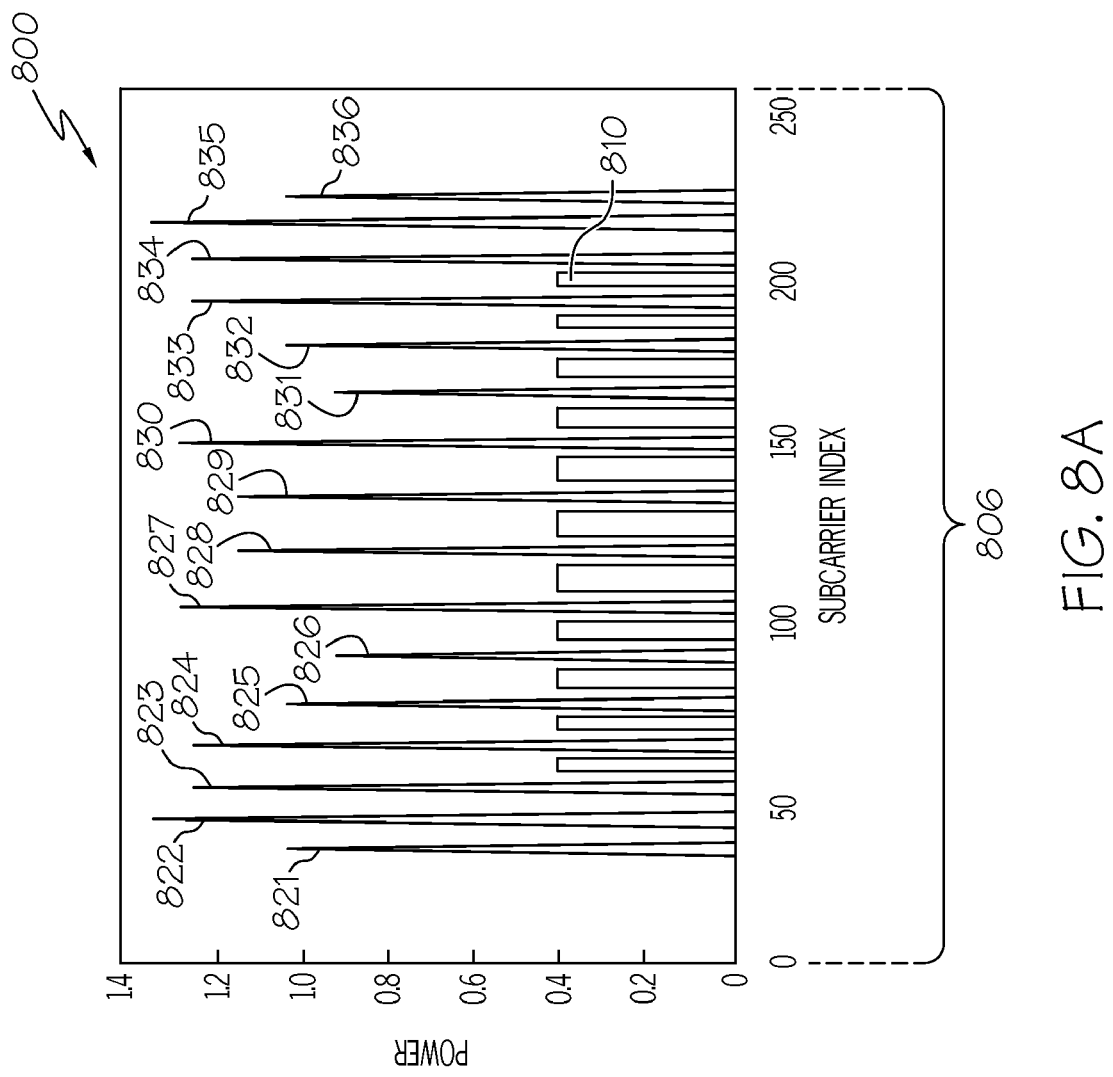
FIGS. 8A and 8B are examples of frequency-domain representations of wireless signals transmitted by two distributed antennas of a multiple antenna transmit system, where each of the signals includes unevenly-spaced, unequal power pilots, in accordance with an example embodiment.
Figure 8B:
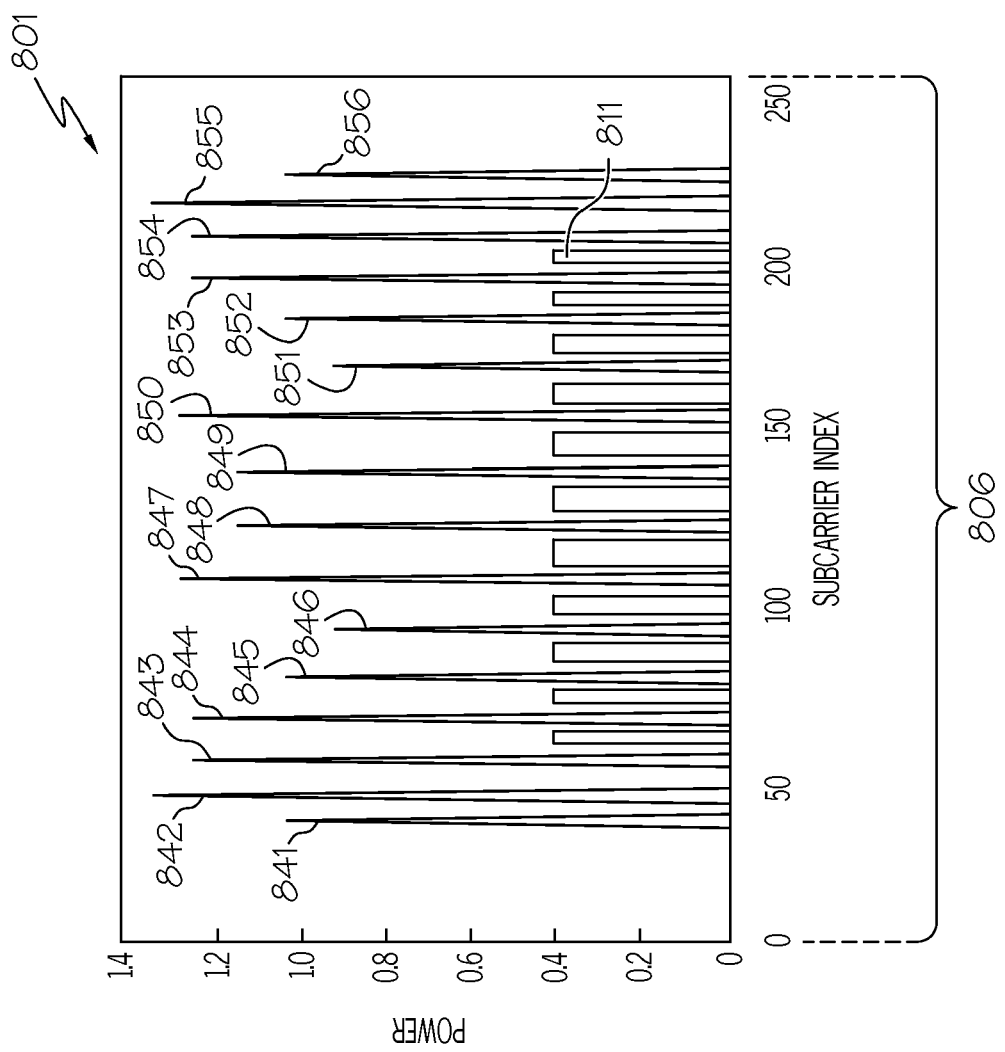
Figure 9:
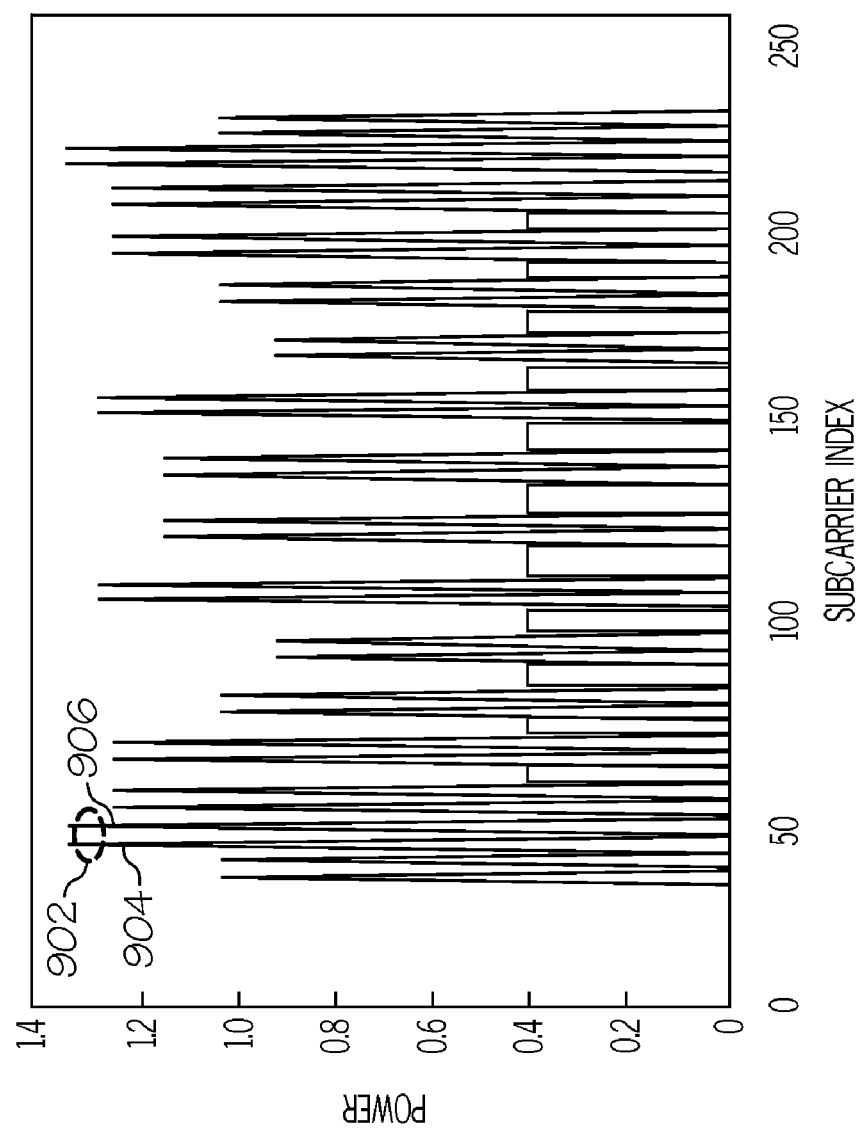
FIG. 9 is an example of a combined frequency-domain representation of the signals of FIGS. 8A and 8B, in accordance with an example embodiment.

To better illustrate the various embodiments, FIGS. 5-9 illustrate examples of transmit signals for traditional systems (FIG. 5), systems that include co-located antennas (e.g., system 300, FIG. 3) (FIGS. 6 and 7), and systems that include distributed antennas (e.g., system 400, FIG. 4) (FIGS. 8 and 9). More particularly, FIG. 5 is an example of a frequency-domain representation of a single transmit signal 500, $Y_k$, with evenly-spaced, equal-power pilot signals. Axis 502 represents frequency (with example subcarrier indices indicated), and axis 504 represents signal power (e.g., in dB). Signal 500 may represent a signal that is generated by a PSAM OFDM system with null edge subcarriers, for example. Within frequency band 506, the transmit signal 500 includes a data component 508, $X_k$, and an SPS component 510, $S_k$, which are modulated onto a plurality, N, of subcarriers. The subcarriers occupied by the various components of the transmit signal 500, may be decomposed into several non-overlapping parts or disjoint sets, which span all N baseband subcarrier indices: 1) data-bearing subcarriers 512, which may be denoted by a set of indices $K_d$; pilot subcarriers (e.g., subcarriers 514), which may be denoted by a set of indices $K_p$; and null edge subcarriers 516, which may be denoted by the set of indices $K_n$.

In an embodiment, $X_{k \notin K_d} = 0$, so that the data component 508 of the transmit signal 500 only contains energy in data-bearing subcarriers 512. In other words, null edge subcarriers 516 may be constrained to zero, in an embodiment. Pilot signals 521, 522, 523, 524, 525, 526, 527, 528 may be defined as part of an SPS, although they may be separately defined, as well. The signal segmentations may be summarized as Table 2, below:

TABLE 2

|       | $k \in K_d$ | $k \in K_p$ | $k \in K_n$ |
|-------|-------------|-------------|-------------|
| $X_k$ | $\neq 0$    | $= 0$       | $= 0$       |
| $S_k$ | $\neq 0$    | $\neq 0$    | $= 0$       |
| $Y_k$ | $\neq 0$    | $\neq 0$    | $= 0$       |

SPS component 510 includes synchronization sequence information 520 conveyed within synchronization subcarriers (e.g., data-bearing subcarriers 512), and a plurality of pilot signals 521-528 conveyed within pilot subcarriers 514, in an embodiment. Because at least some of the synchronization subcarriers occupied by the SPS component 510 are the same as the data-bearing subcarriers 512 occupied by the data component 508, the synchronization sequence information 520 (and thus the SPS component 510) may be considered to be "embedded" within the data component 508.

As illustrated in FIG. 5, pilot signals 521-528 are evenly-spaced and have equal power. As defined earlier, this means that, within frequency band 506, the number of non-pilot subcarriers (e.g., data-bearing subcarriers 512) between each pair of adjacent pilot signals 521-528 is the same for each pair of adjacent pilot signals in the plurality of pilot signals 521-528. For example, the number of non-pilot subcarriers 530 between adjacent pilot signals 524, 525 is the same as the number of non-pilot subcarriers 531 between adjacent pilot signals 526, 527. The same holds true for each other pair of adjacent pilot signals in the plurality of pilot signals 521-528.

In addition, the power 550 contained within each pilot signal 521-528 is substantially equal for each of the plurality of pilot signals 521-528. The amount of power 550 in pilot signals 521-528 may be quantified according to the equation:

$$\beta = \frac{\sum_{k \in K_p} |S[k]|^2}{\sum_{k \in K_p \cup K_d} |S[k]|^2}, \quad \text{(Equation 9)}$$

which represents the ratio of pilot power to the total SPS power.

Pilot signals 521, 528 are located toward either end of the data bearing subcarriers 512, and accordingly are located near the guard bands defined by the null edge subcarriers 516. Because of the discontinuity introduced by the guard bands, pilot signals 521, 528 are not evenly-spaced with respect to any pilot signal (not illustrated) within a neighboring channel (also not illustrated). As discussed previously, these discontinuities interfere with the ability to provide evenly-spaced pilots across adjacent channels, which may result in decreased channel estimation and/or SER performance when compared with traditional systems in which guard bands are not implemented, and thus evenly-spaced pilots may be implemented across adjacent channels. However, as also discussed previously, guard bands may be desirable in order to limit the amount of spectral regrowth that may encroach on neighboring channels.

In contrast to the signal 500 illustrated in FIG. 5, signals generated and communicated according to various embodiments include a plurality of pilot signals that have unequal power and/or are unevenly-spaced. In addition, the various embodiments contemplate the transmission of pilot signals for multiple wireless signals transmitted by multiple antennas of a multiple transmit antenna system (e.g., a system with co-located or distributed antennas). As will be clarified with reference to FIGS. 6 and 8, the spacing between pilot signals within different wireless signals transmitted using co-located antennas may be different from the spacing between pilot signals within different wireless signals transmitted using distributed antennas.

Figure 6A:
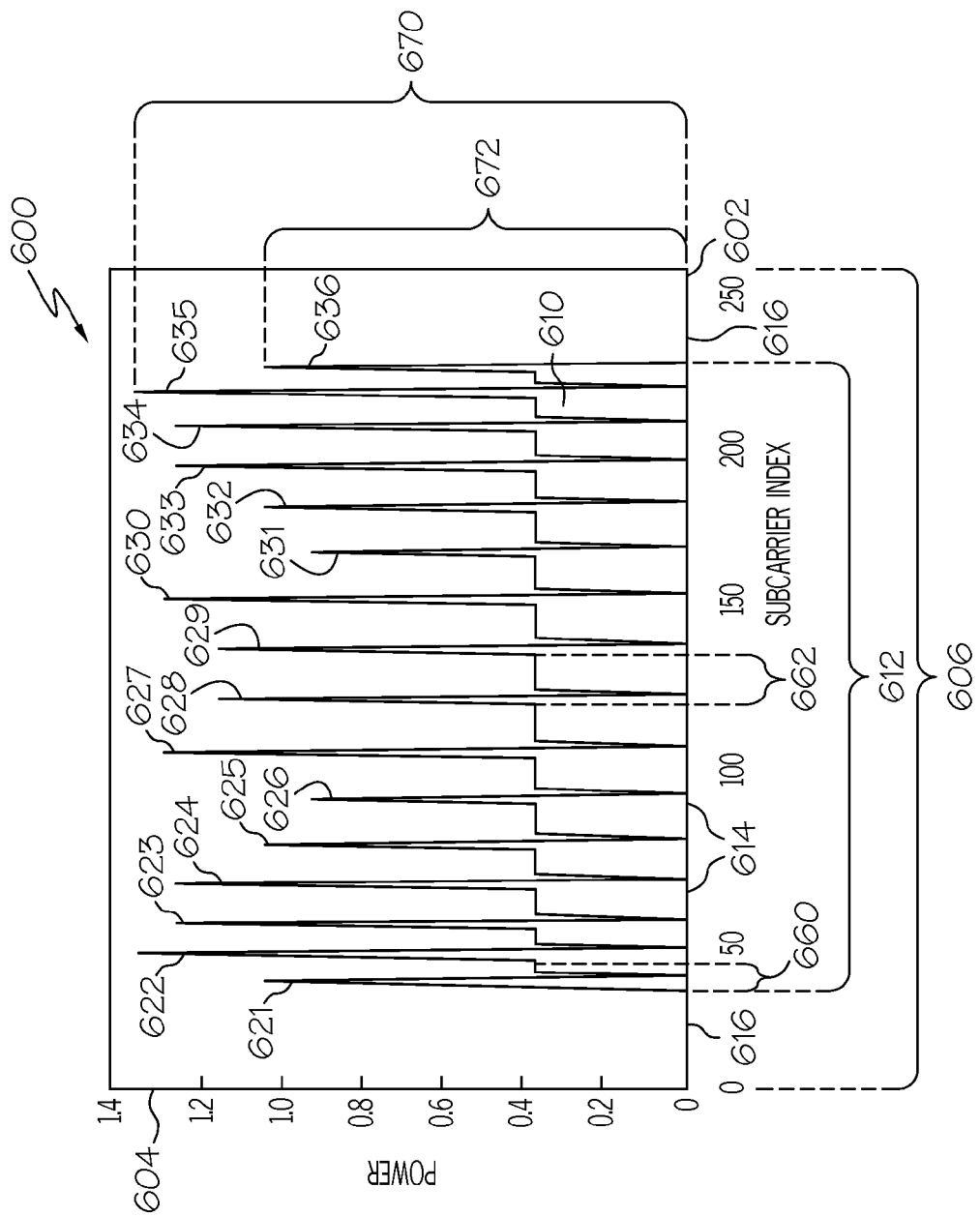
FIGS. 6A and 6B are examples of frequency-domain representations of wireless signals transmitted by two co-located antennas of a multiple antenna transmit system, where each of the signals includes unevenly-spaced, unequal power pilots, in accordance with an example embodiment.
Figure 6B:
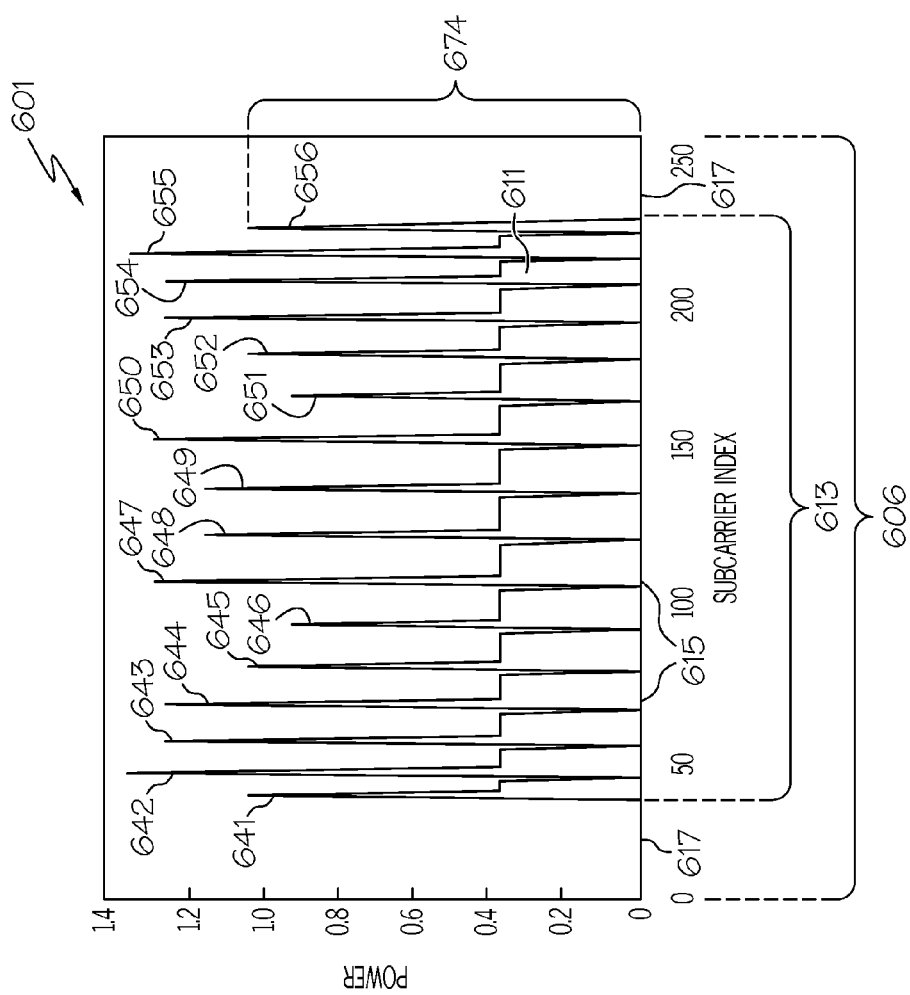

FIGS. 6A and 6B (collectively referred to as FIG. 6) are examples of frequency-domain representations of wireless signals 600, 601 transmitted by two co-located antennas of a multiple antenna transmit system, where each of the signals 600, 601 include unevenly-spaced, unequal power pilots, in accordance with an example embodiment. As will be explained in more detail below, transmit signals 600, 601 are structured for transmission by co-located antennas (e.g., antennas 318, 319, FIG. 3), in accordance with an example embodiment. In FIG. 6, axis 602 represents frequency (with example subcarrier indices indicated), and axis 604 represents signal power (e.g., in dB). Signals 600, 601 may represent signals that are generated by a PSAM OFDM system with null edge subcarriers, for example. Within frequency band 606, the transmit signals 600, 601 each may include a data component $X_k$ (not illustrated, and which may represent a preamble symbol or a user data symbol), pilot signals 621, 622, 623, 624, 625, 626, 627, 628, 629, 630, 631, 632, 633, 634, 635, 636, 641, 642, 643, 644, 645, 646, 647, 648, 649, 650, 651, 652, 653, 654, 655, 656, and a synchronization component 610, 611, $S_k$, which are modulated onto a plurality, N, of subcarriers. In an alternate embodiment, the synchronization component 610, 611 may be excluded. More particularly, the subcarriers occupied by the various components of transmit signals 600, may be decomposed into several non-overlapping parts: 1) data-bearing subcarriers 612, 613, which may be denoted by a set of indices $K_d$; pilot subcarriers (e.g., subcarriers 614, 615), which may be denoted by a set of indices $K_p$; and null edge subcarriers 616, 617, which may be denoted by the set of indices $K_n$. In an embodiment, $X_{k \notin K_d} = 0$, so that the data components of the transmit signals 600, 601 only contain energy in data-bearing subcarriers 612, 613. In other words, null edge subcarriers 616, 617 may be constrained to zero, in an embodiment, which may limit the amount of spectral regrowth that may encroach on neighboring channels. Each of pilot signals 621-636 of transmit signal 600 and pilot signals 641-656 of transmit signal 601 may be defined as part of an SPS (e.g., SPSs 332, 333, FIG. 3) along with the synchronization components 610, 611, in an embodiment. In an alternate embodiment, pilot signals 621-636, 641-656 may be separate from the synchronization signals.

In contrast with the transmit signal 500 illustrated in FIG. 5, the transmit signals 600, 601 of FIG. 6 include pilot signals 621-636, 641-656 that are unevenly-spaced and that may have unequal power. As defined earlier, this means that, within frequency band 606, the number of non-pilot subcarriers between at least one pair of adjacent pilot signals 621-636, 641-656 is not the same as the number of non-pilot subcarriers between at least one other pair of adjacent pilot signals in the same plurality of pilot signals 621-636, 641-656, although the number of non-pilot subcarriers may be the same for two or more different pairs of adjacent pilot signals 621-636, 641-656. For example, the number of non-pilot subcarriers 660 between adjacent pilot signals 621, 622 is not the same as the number of non-pilot subcarriers 662 between adjacent pilot signals 628, 629. In an embodiment, the pilot subcarrier spacing may be less than the number of null edge subcarriers (e.g., $N/|K_p|>|K_n|$) for each pair of adjacent pilot signals 621-636, 641-656.

In addition, in an embodiment, the pilot signals 621-636, 641-656 may have unequal power. As also defined earlier, this means that, within frequency band 606, the power contained within one or more of the pilot signals 621-636, 641-656 in each plurality of pilot signals 621-636, 641-656 may be substantially different from the power contained within one or more other pilot signals 621-636, 641-656 in the same plurality of power signals 621-636, 641-656, although two or more pilot signals 621-636, 641-656 may have substantially equal power. For example, the power 670 contained within pilot signal 635 is substantially greater than (e.g., about 1.2 dB) the power 672 contained within pilot signal 636.

In an embodiment, such as that illustrated in FIG. 6, frequency band 606 includes two hundred and fifty-six total subcarriers (e.g., N=256), which includes one hundred and seventy-six data and/or synchronization subcarriers 612 or 613, sixteen pilot subcarriers 614 or 615, and sixty-four null edge subcarriers 616 or 617 (e.g., 32 null edge subcarriers in the lower-frequency guard band and 32 null edge subcarriers in the upper-frequency guard band). However, these numbers of subcarriers are used for example purposes only, and more or fewer total subcarriers (e.g., 512, 1024 or some other total number of subcarriers), data and/or synchronization subcarriers 612, 613, pilot subcarriers 614, 615, and/or null edge subcarriers 616, 617 may be utilized, in other embodiments.

In the embodiment illustrated in FIG. 6, pilot signals 621-636, 641-656 have variable pilot signal parameters. More specifically, the pilot signal spacing (e.g., a first type of pilot signal parameter) is different for at least two different pairs of adjacent pilot signals, and the pilot power (e.g., a second type of pilot signal parameter) is different for at least two pilot signals. In other embodiments (not illustrated), pilot signals may have uneven spacing or unequal power, but not both.

Embodiments of methods for determining variable pilot signal parameters will be discussed later, in conjunction with FIG. 10. It may be noted at this point, however, that the pilot signals 621-636 within the first wireless signal 600 are positioned at subcarriers that are different from the subcarriers at which the pilot signals 641-656 within the second wireless signal 601 are positioned, according to an embodiment. According to a particular embodiment, the pilot signals 621-636 within the first wireless signal 600 are positioned at subcarriers that are orthogonal in frequency with the subcarriers at which the pilot signals 641-656 within the second wireless signal 601 are positioned. According to yet another embodiment, each pilot signal 621-636 within the first wireless signal 600 is located in a pilot signal subcarrier position that is directly adjacent to a pilot signal subcarrier position of a pilot signal 641-656 within the second wireless signal 601.

According to yet another embodiment, each pilot signal 621-636 within the first wireless signal 600 is located in a pilot signal subcarrier position that is offset by at least two subcarrier positions from a pilot signal subcarrier position of a pilot signal 641-656 within the second wireless signal 601.

Figure 7:
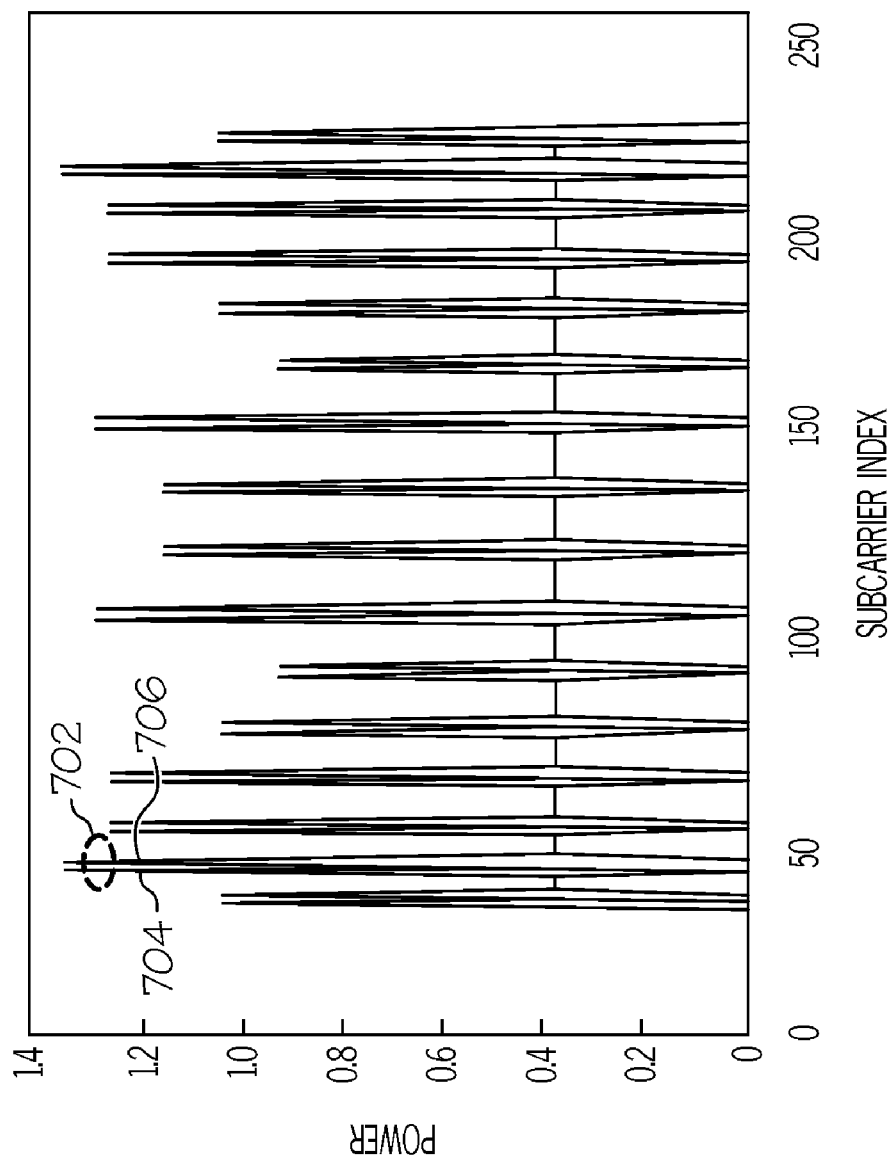
FIG. 7 is an example of a combined frequency-domain representation of the signals of FIGS. 6A and 6B, in accordance with an example embodiment.

FIG. 7 is an example of a combined frequency-domain representation of the signals 600, 601 of FIG. 6, in accordance with an example embodiment. The combined signals may be detected, for example, on the channel after transmission by the co-located antennas of signals 600, 601. Each pair (e.g., pair 702) of illustrated pilot signals includes a pilot signal 704 from a first wireless signal (e.g., pilot signal 622 of signal 600) and a pilot signal 706 from a second wireless signal (e.g., pilot signal 642 of signal 601). FIG. 7 illustrates that the pilot signals 621-636 within the first wireless signal 600 are positioned at subcarriers that are offset from the subcarriers at which the pilot signals 641-656 within the second wireless signal 601 are positioned by at least one subcarrier index, according to an embodiment. In other words, for co-located antennas, the minimum spacing between corresponding but offset subcarriers is one or more subcarriers, according to an embodiment. In a particular embodiment, pilot signals 621-636 within the first wireless signal 600 are located in pilot signal subcarrier positions that are directly adjacent to pilot signal subcarrier positions of pilot signals 641-656 of the second wireless signal 601 (e.g., the minimum spacing is one subcarrier position). In other embodiments, one or more of the pilot signals 621-636 within the first wireless signal 600 may be positioned at subcarriers that are offset from the subcarriers at which the pilot signals 641-656 within the second wireless signal 601 are positioned by more than one subcarrier index (e.g., two or more subcarrier indices). As used herein, the term "corresponding but offset," as it relates to pilot signals in different wireless signals means that the pilot signals in the different wireless signals are in the same position in the sequence of pilot signals (e.g., the first, second or third pilot signal in the sequence), although they are at subcarriers that are offset from each other (e.g., the pair 702 of pilot signals 704, 706 include corresponding but offset pilot signals from two different wireless signals). For example, pilot signals 621, 641 are positioned at corresponding but offset subcarrier positions, pilot signals 622, 642 are positioned at a corresponding but offset subcarrier positions, and so on.

According to an embodiment, pilot signals 621-636, 641-656 positioned at corresponding but offset subcarrier positions in the first and second wireless signals 600, 601 (e.g., pilot signals 622, 642) each have substantially equal power, although this is not necessarily so. Referring again to FIG. 6, and as an example, the power 672 contained within pilot signal 636 is substantially equal to the power 674 contained within pilot signal 656. This is also indicated in FIG. 7, which illustrates that corresponding but offset pilot signals 704, 706 have substantially equal power. In an alternate embodiment, the power of pilot signals (e.g., pilot signals 636, 656 or 704, 706) at corresponding but offset subcarrier positions may be unequal. For example, in an alternate embodiment, pilot signals 621-636, 641-656 positioned at corresponding but offset subcarrier positions in the first and second wireless signals 600, 601 (e.g., pilot signals 622, 642) each may have substantially unequal power, such that, when received, the pilot signals may have substantially equal power into the receiver.

Referring again to FIG. 3 and also to FIG. 6, in the frequency domain, each of transmit signals 600, 601, $Y_k$, may be represented according to the equation:

$$Y_k = X_k\sqrt{1-\rho} + S_k\sqrt{\rho}, \qquad \text{(Equation 10)}$$

where $X_k$ represents an input data symbol 320 or 321, $S_k$ represents an SPS 332 or 333, $\sqrt{1-\rho}$ represents a first scaling factor 322 or 323, and $\sqrt{\rho}$ represents a second scaling factor 330 or 331. As mentioned previously, because the first and second scaling factors 322 or 323, 330 or 331 have an inverse relationship, the value of the embedding factor, $\rho$, dictates how much relative signal power is allocated to the data components (not illustrated), $X_k$, of the transmit signals 600, 601 as opposed to the SPS components 610, 611, $S_k$, of the transmit signals 600, 601.

In an embodiment, the embedding factor, $\rho$, has a fixed value, and accordingly the first scaling factor 322 or 323 and the second scaling factor 330 or 331 also have fixed values. In another embodiment, the transmit system 300 may adjust the value of the embedding factors dynamically. When an embedding factor is increased, the relative power of the SPS component 610 or 611 with respect to the data component also will increase. This may be desirable, for example, when the channel is relatively harsh, and increased PAR reductions are desired. However, a tradeoff to increasing the embedding factor (and thus increasing PAR reductions) may be that, as a harsh channel improves (e.g., becomes less harsh), the receiver may have more than enough channel SNR to demodulate, although the received signal SNR may be limited by the distortion induced by the power amplifier 316 or 317. In an embodiment, the receiver may feed information back to the transmit system 300, which indicates the receiver demodulation performance, and thus the transmit system 300 may adjust the values of D and/or $\rho$. Embedding factor increases may enable transmit system 300 further to reduce PAR and to minimize the probability of distortion to the transmitted signal that may be induced by the non-linear power amplifiers 316 and/or 317. Alternatively, when the embedding factor is decreased, the relative power of the SPS component 610 and/or 611 with respect to the data-bearing component also will decrease. Decreasing the embedding factor may be desirable, for example, when the power amplifier 316 and/or 317 is not inducing significant distortion onto the transmitted signal, and when the demodulation performance of the receiver (e.g., as indicated through feedback from the receiver) is not significantly limited by power amplifier induced distortions and/or by channel multi-path induced distortion, provided that sufficient synchronization performance may still be achieved. However, decreasing the embedding factor may result in smaller PAR reductions. In still another embodiment, the value of the embedding factor may be set to 0, and/or data/scaling factor combiner 302 and/or 303 and SPS/scaling factor combiner 306 and/or 307 may be disabled. In that case, transmit signals 600 and/or 601 will include only a data component, as the power of any SPS component 610 and/or 611 effectively will have been reduced to zero. In such an embodiment, a preamble (not illustrated) may be transmitted along with the data in order to facilitate synchronization with the signal at the receiver.

As discussed above, each pilot signal 621-628 within the first wireless signal 600 may be located in a pilot signal subcarrier position that is directly adjacent to a pilot signal subcarrier position of a pilot signal 631-638 within the second wireless signal 601, or that is offset by two or more subcarriers. In a system in which distributed antennas (e.g., antennas 418, 419, FIG. 4) are used to transmit the wireless signals, inadequate synchronization between the frequency references associated with each antenna may result in inter-carrier interference between corresponding but offset pilot signals when those pilot signals are adjacent one another in frequency or when they are offset by an insufficient number of subcarriers. However, embodiments configured for systems in which distributed antennas are implemented may compensate for such inadequate synchronization by increasing the offset between corresponding but offset pilot signals transmitted by the multiple, distributed antennas, as will be described below.

FIGS. 8A and 8B (collectively referred to as FIG. 8) are examples of frequency-domain representations of wireless signals 800, 801 transmitted by two distributed antennas of a multiple antenna transmit system, where each of the signals 800, 801 include unevenly-spaced, unequal power pilots, in accordance with an example embodiment. As will be explained in more detail below, wireless signals 800, 801 are structured for transmission by distributed antennas (e.g., antennas 418, 419, FIG. 4), in accordance with an example embodiment. Within frequency band 806, the transmit signals 800, 801 each may include a data component $X_k$ (not illustrated, and which may represent a preamble symbol or a user data symbol), pilot signals 821, 822, 823, 824, 825, 826, 827, 828, 829, 830, 831, 832, 833, 834, 835, 836, and a synchronization component 810, 811, $S_k$, which are modulated onto a plurality, N, of subcarriers. In an alternate embodiment, the synchronization component 810, 811 may be excluded.

The wireless signals 800, 801 depicted in FIG. 8 are similar to the wireless signals 600, 601 depicted in FIG. 6, in that pilot signals 821-836 are unevenly-spaced and may have unequal power, and pilot signals 841-856 also are unevenly-spaced and may have unequal power. In addition, the pilot signals 821-836 within the first wireless signal 800 are positioned at subcarriers that are different from the subcarriers at which the pilot signals 841-856 within the second wireless signal 801 are positioned, according to an embodiment (e.g., the pilot signals 821-836 may be positioned at subcarriers that are orthogonal in frequency to the subcarriers at which pilot signals 841-856 are positioned). In addition, pilot signals 821-836, 841-856 positioned at corresponding but offset subcarrier positions in the first and second wireless signals 800, 801 each may have substantially equal power, although this is not necessarily so.

However, wireless signals 600, 601 and 800, 801 differ in that pilot signals 821-836 within the first wireless signal 800 are not located in pilot signal subcarrier positions that are directly adjacent to pilot signal subcarrier positions of pilot signals 841-856 of the second wireless signal 801. Instead, the pilot signals 821-836 within the first wireless signal 800 are positioned at subcarriers that are offset from the subcarriers at which the pilot signals 841-856 within the second wireless signal 801 are positioned by at least two subcarrier indices, according to an embodiment. In other words, for distributed antennas, the minimum spacing between corresponding but offset subcarriers is two or more subcarriers, according to an embodiment. According to another embodiment, for distributed antennas, the minimum spacing between corresponding but offset subcarriers is three or more subcarriers.

FIG. 9 is an example of a combined frequency-domain representation of the signals 800, 801 of FIG. 8, in accordance with an example embodiment. The combined signals may be detected, for example, on the channel after transmission of signals 800, 801 by distributed antennas (e.g., antennas 418, 419, FIG. 4). For purposes of clarity, the illustration depicts the signals 800, 801 as they may appear if the distributed antennas were perfectly synchronized, although this may not be the case in actuality. Each pair (e.g., pair 902) of illustrated pilot signals includes a pilot signal 904 from a first wireless signal (e.g., pilot signal 822 of signal 800) and a pilot signal 906 from a second wireless signal (e.g., pilot signal 842 of signal 801). FIG. 8 illustrates that the pilot signals 821-836 within the first wireless signal 800 are positioned at subcarriers that are offset from the subcarriers at which the pilot signals 841-856 within the second wireless signal 801 are positioned by at least two or at least three subcarrier indices, according to various embodiments. In other embodiments, one or more of the pilot signals 821-836 within the first wireless signal 800 may be positioned at subcarriers that are offset from the subcarriers at which the pilot signals 841-856 within the second wireless signal 801 are positioned by more than three subcarrier indices. By increasing the minimum spacing between pilot signals 821-836, 841-856, as compared with the co-located antenna case, the potential for inter-carrier interference between corresponding but offset pilot signals may be reduced or avoided. By reducing the inter-carrier interference, the mean square error (MSE) may be reduced, when estimating the carrier frequency offset at the receiver.

According to an embodiment, pilot signals 821-836, 841-856 positioned at corresponding but offset subcarrier positions in the first and second wireless signals 800, 801 (e.g., pilot signals 822, 842) each have substantially equal power, although this is not necessarily so. In an alternate embodiment, the power of pilot signals (e.g., pilot signals 836, 856) at corresponding but offset subcarrier positions may be unequal.

According to an embodiment, when synchronization information is included with the pilot signals 821-836, 841-856 (e.g., as part of an SPS or separately), the synchronization information is included at subcarrier indices that are different from the subcarrier indices of any of the pilot signals 821-836, 841-856. In addition, the subcarrier indices at which the synchronization information is included are offset from the pilot signal subcarriers by at least two subcarrier indices.

Embodiments of methods for determining pilot parameters for pilot signals (e.g., pilot signals 621-636, 641-656, FIG. 6, and pilot signals 821-836, 841-856, FIG. 8) will now be described. Pilot signals having variable pilot signal parameters and sets of SPS that include such pilot signals may enable significant PAR reductions to be achieved, and may have improved synchronization and channel estimation properties, when compared with traditional methods. As will be pointed out below, pilot signals for co-located antennas may be determined using particular constraints, and pilot signals for distributed antennas may be determined using additional or different constraints, according to various embodiments.

In an embodiment, each SPS includes synchronization information and a plurality of pilot signals, and the SPS is embedded within a wireless signal prior to transmission, as discussed previously. In an alternate embodiment, a wireless signal may include synchronization information and pilot signals that are distinct from each other. Either way, embodiments include generating and communicating a wireless signals for multiple antennas, where each wireless signal includes a plurality of pilot signals that have variable pilot signal parameters (e.g., pilot spacing and/or pilot power). Such embodiments may be incorporated into currently-existing and/or emerging standards and/or protocols in which PSAM currently is employed with evenly-spaced, equal power pilots.

Embodiments include methods for determining pilot signal parameters (e.g., pilot signal positions and pilot signal power) for pilot signals transmitted by multiple antennas of a multiple transmit antenna system. As discussed previously, traditional techniques include generating and communicating wireless signals with evenly-spaced, equal-power pilot signals (e.g., pilot signals 521-528, FIG. 5). However, embodiments include generating and communicating wireless signals with unevenly-spaced and/or unequal power pilot signals (e.g., pilot signals 621-636, 641-656, FIG. 6, or pilot signals 821-836, 841-856, FIG. 8).

Figure 10:
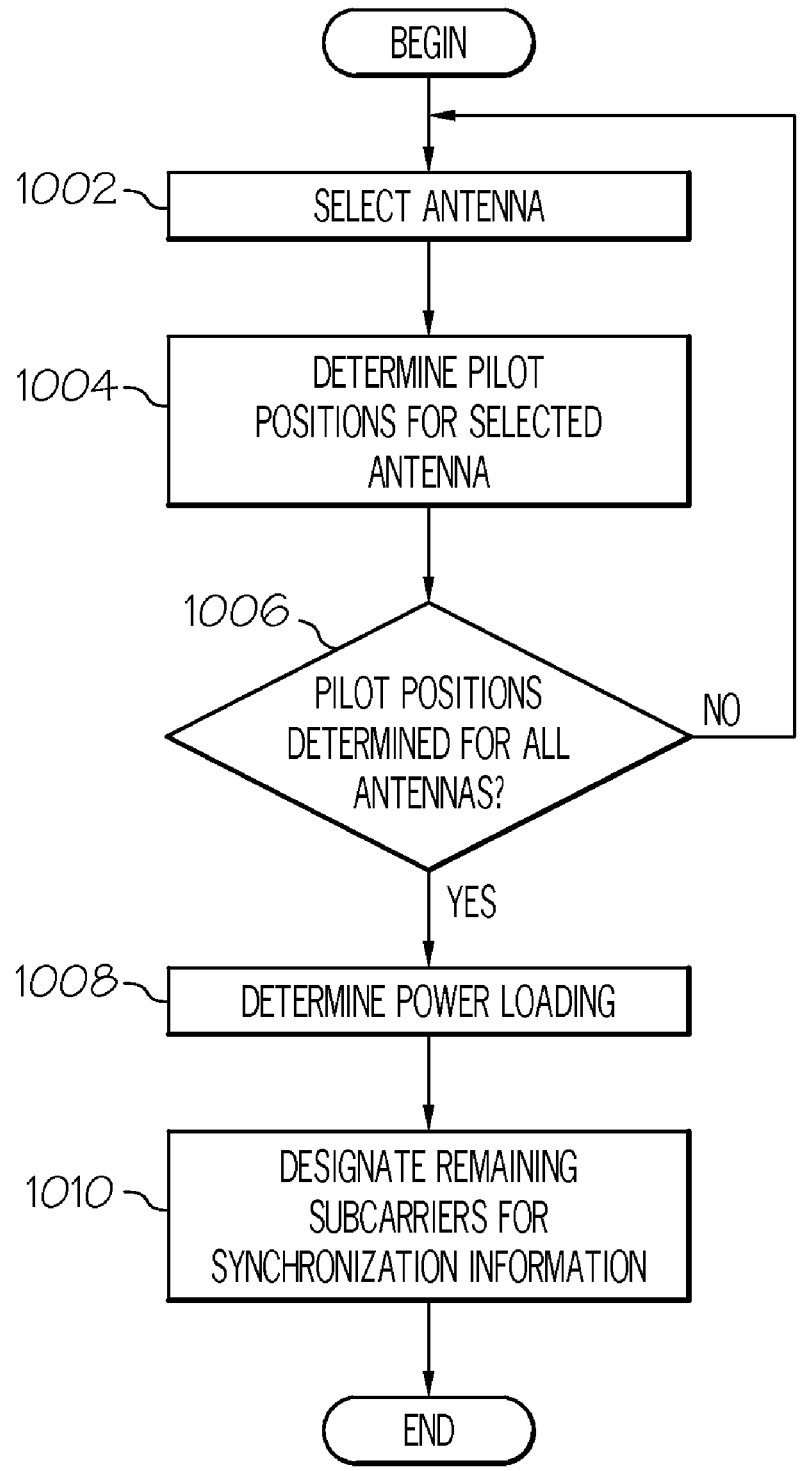
FIG. 10 is a flowchart of a method for determining pilot signal parameters for multiple wireless signals transmitted by a multiple transmit antenna system, according to an example embodiment.

FIG. 10 is a flowchart of a method for determining pilot signal parameters for multiple wireless signals transmitted by a multiple transmit antenna system, according to an example embodiment. As will be discussed in more detail later, the pilot signals may be utilized for fine CFO and SFO estimation and channel estimation at the receiver. According to an embodiment, a method for determining pilot signal parameters uses a parametric pilot optimization process to improve symbol estimation from the least-squares (LS) channel estimates. For example purposes, it may be assumed that the applicable frequency band includes two hundred and fifty-six total subcarriers (e.g., N=256), which includes one hundred and seventy-six data and/or synchronization subcarriers, sixteen pilot subcarriers (e.g., $N_p$=16), and sixty-four null edge subcarriers (e.g., $N_{null}$=64). The number of in-band subcarriers may be denoted as $N_i$−N−$N_{null}$. It is to be understood that other embodiments may include more or fewer total subcarriers (e.g., 512, 1024 or some other total number of subcarriers), data and/or synchronization subcarriers, pilot subcarriers, and/or null edge subcarriers.

According to an embodiment, the null edge subcarriers are positioned so that they create a lower-frequency guard band and an upper-frequency guard band. More particularly, approximately half (e.g., 32) of the total number of null edge subcarriers may be designated to occupy the lowest consecutive subcarriers in the frequency band, and the other half of the total number of null edge subcarriers may be designated to occupy the highest consecutive subcarriers in the frequency band. In other embodiments, a single guard band may be implemented (e.g., occupying the lowest or highest subcarriers) or the lower-frequency and upper-frequency guard bands may include different numbers of subcarriers (e.g., they may be asymmetrical).

Given that the null edge subcarrier locations are known, the method may begin, in block 1002 by selecting an antenna of the multiple transmit antenna system for which pilot signal parameters have not yet been determined. As discussed previously, the number of antennas may be any practical number equal to or greater than two, in various embodiments.

In block 1004, the pilot positions for the selected antenna are determined. According to an embodiment, the pilot positions for each antenna may be denoted as:

$$K_{p1}, K_{p2}, \text{ where } |K_{p1}|=|K_{p2}|, \quad \text{(Equation 11)}$$

and candidate $K_{pi}$ indexes for each antenna can be formulated as:

$$K_{pi}=\{int(f^{-1} \circ g_i(\tau))|\tau \in \{0, 1, 2, \ldots, |K_{pi}|-1\}, \quad \text{(Equation 12)}$$

until the minimizing set is found for each transmit antenna. The domain of $f$ is restricted to $[1, N]$, where $f$ is a one-to-one mapping such that $K_{pi}=f^{-1}(S)$, and S is a circularly shifted version of $K_{pi}$. According to an embodiment, the pilot sequence is parameterized with a function p(x). The input of the function is the pilot index, consisting of integers from 0 to $N_p-1$, and the output of the function is the pilot position, consisting of integers from 0 to N−1. Function p(x), which maps the pilot indices to the subcarrier for each pilot, may be decomposed into three parts such that p(x)=$f$(g(h(x))). According to an embodiment, $f$(x) and h(x) may be defined such that $f$(x)=round(x+$N_i$/2+$N_{null}$/2+½) and h(x)=x−($N_i$−1)/2. This shifts the input and output of g(x) so that it is centered on the intersection of the x and y axes. According to an embodiment, the remaining function, g(x), is parameterized as a polynomial.

One or more constraints may be imposed on the polynomial, according to various embodiments. For example, a first constraint may be that the resulting pilot profile is symmetric, in an embodiment. This means that $g(x)=g(-x)$, or that $g(x)$ is an odd function. A second constraint may be that the function $g(x)$ maps pilots only onto subcarriers that are in the band. Accordingly, $p(0) \geq N_{null}/2+1$ and $p(N_p-1) \leq N-N_{null}/2$. As will be explained in more detail below, parameter $\delta$ is used to specify how far away from the band edge the pilots are constrained to be. According to various embodiments, parameter $\delta$ may have a value in a range from 0 to $(N_t-N_p)/2$. By including parameter $\delta$ the previously described second constraint may be reflected in $g(x)$ as $g((N_p-1)/2)=(N_t-1)/2-\delta$ and $g(-(N_p-1)/2)=-(N_t-1)/2-\delta$. Due to the symmetry caused by the first constraint, these two constraints are equivalent. A third constraint may be that the function should return the pilots in order and no pilot should be duplicated. This means that $g(x)$ should be a monotonically increasing function within the band. Accordingly, $g'(x)>0$ for $-(N_p-1)/2+1 \leq x \leq (N_p-1)/2$. In various alternate embodiments, one or more of the previously described constraints may not be imposed on the polynomial, and/or one or more additional or different constraints may be imposed on the polynomial. For example, but not by way of limitation, the resulting pilot profile may be asymmetric, the function may map one or more pilots onto subcarriers that are not in the band, the function may return the pilots out of order, and/or one or more pilots may be duplicated in various alternate embodiments.

According to various embodiments, a cubic (e.g., $3^{rd}$ order) or higher order (e.g., $4^{th}$, $5^{th}$ or higher order) polynomial parameterization function is used to parameterize the pilot subcarrier positions. Examples of cubic and $5^{th}$ order polynomials are given below, although it is to be understood that these examples are provided for the purpose of example and not of limitation. It is to be further understood that, in other embodiments, a $4^{th}$ order or higher than a $5^{th}$ order polynomial parameterization function may be implemented.

Derivation of a cubic polynomial parameterization will first be discussed in conjunction with Equations 13-20. In an embodiment in which a cubic polynomial parameterization function is implemented, the function may initially be defined according to:

$$g_i(\tau) = \alpha_{3i}\tau^3 + a_{2i}\tau^2 + \alpha_{1i}\tau + \alpha_{0i}. \quad \text{(Equation 13)}$$

Based on the first constraint, described above, the even terms may be dropped from $g_i(\tau)$ in Equation 13. After removing the even terms, for the cubic polynomial embodiment:

$$g_i(\tau) = \alpha_{3i}\tau^3 + \alpha_{1i}\tau, \text{ and}$$

$$g_i'(\tau) = 3\alpha_{3i}\tau^2 + \alpha_{1i}, \quad \text{(Equations 14)}$$

Given that the number of non-null subcarriers for the ith antenna is denoted as $N_i$, the second constraint, described above, may be defined, in an embodiment, as:

$$g_i'\left(\frac{N_p-1}{2}\right) = \frac{N_i-1}{2} - \delta \quad \text{(Equation 15)}$$

$$g_i'\left(-\frac{N_p-1}{2}\right) = -\frac{N_i-1}{2} + \delta, \quad \text{(Equation 16)}$$

where $\delta_i$ represents the distance the edge pilots are from the signal band edges. For example, $\delta_i \in (0,1]$ would mean the edge pilots are placed at the in-band edge, while $\delta_i \in (1,2]$ would place the edge pilots one subcarrier from the in-band edge. Further, the third constraint, described above, may be defined, in an embodiment, as:

$$g_i'(0) > 0. \quad \text{(Equation 17)}$$

Using the constraint equations in Equations 15 through 17 and a further constraint that the edge pilots should not be spaced further from the in-band edge than an average pilot spacing, one of the two variables of Equation 14 may be eliminated, and a domain for the remaining variable may be defined so that:

$$a_1 = \frac{(N_i - 1 - 2\delta_i)}{N_p - 1} - a_3\left(\frac{N_p-1}{2}\right)^2 \quad \text{(Equation 18)}$$

$$-\frac{(N_i - 1 - 2\delta_i)}{4\left(\frac{N_p-1}{2}\right)^3} \leq a_3 \leq \frac{(N_i - 1 - 2\delta_i)}{2\left(\frac{N_p-1}{2}\right)^3} \quad \text{(Equation 19)}$$

$$0 < \delta_i \leq \frac{N_i}{N_p}. \quad \text{(Equation 20)}$$

From Equation 14, when $\alpha_3=0$, $g(\tau)$ of Equation 14 becomes a first order polynomial, and the pilot spacing becomes even. From Equation 14, it may be inferred that $g''(\tau)=6\alpha_3\tau$. Therefore, when $\alpha_3<0$, pilot spacing increases as $\tau$ goes from $$-\frac{(N_p-1)}{2} \text{ to } \frac{(N_p-1)}{2},$$

meaning that adjacent pilots at the edges of the in-band region are more closely spaced than adjacent pilots in the middle of the in-band region. Conversely, when $\alpha_3>0$, adjacent pilots at the edges of the in-band region have a larger spacing than adjacent pilots near the middle of the in-band region.

Derivation of a $5^{th}$ order parameterization will now be discussed in conjunction with Equations 21-30. In an embodiment in which a $5^{th}$ order polynomial parameterization function is implemented, the function may initially be defined according to:

$$g_i(\tau) = \alpha_{5i}\tau^5 + \alpha_{4i}\tau^4 + \alpha_{3i}\tau^3 + a_{2i}\tau^2 + \alpha_{1i}\tau + \alpha_{0i}. \quad \text{(Equation 21)}$$

Based on the first constraint, described above, the even terms may be dropped from $g_i(\tau)$ in Equation 21. After removing the even terms, for the $5^{th}$ order polynomial:

$$g_i(\tau) = \alpha_{5i}\tau^5 + \alpha_{3i}\tau^3 + \alpha_{1i}\tau, \text{ and}$$

$$g_i'(\tau) = 5\alpha_{5i}\tau^4 + 3\alpha_{3i}\tau^2 + \alpha_{1i}. \quad \text{(Equations 22)}$$

The second constraint, described above, may be used to solve for $\alpha_{5i}$ in Equations 22 as follows:

$$a_5 = \frac{N_i - 1 - 2\delta}{2\left(\frac{N_p-1}{2}\right)^5} - \frac{a_1}{\left(\frac{N_p-1}{2}\right)^4} - \frac{a_3}{\left(\frac{N_p-1}{2}\right)^2} \quad \text{(Equation 23)}$$

Finally, the third constraint may be used to find bounds for $a_{3i}$ in Equations 22. To find the minimums and maximums, the derivative of $g_i'(\tau)$ may be defined as:

$$g''(\tau) = 6\alpha_3\tau + 20\alpha_5\tau^3. \quad \text{(Equation 24)}$$

One root exists at $\tau=0$, and two more exist at:

$$\tau = \pm\sqrt{\frac{-6a_3}{20a_5}}. \qquad \text{(Equation 25)}$$

Depending on the values of $\alpha_3$ and $\alpha_5$, these could be minimums or maximums. Using the first root, the first constraint $g'(0)=\alpha_1$ implies that $\alpha_1>0$. The second constraint may only apply if the second root is within the region of interest. Accordingly, a determination should be made whether:

$$\sqrt{\frac{-6a_3}{20a_5}} < (N_p-1)/2. \qquad \text{(Equation 26)}$$

This will be the case when:

$$\frac{-6a_3}{\left(\frac{N_p-1}{2}\right)^2} < 20a_5 \qquad \text{(Equations 27)}$$

$$\frac{-6a_3}{\left(\frac{N_p-1}{2}\right)^2} < 20\left(\frac{N_i-1-2\delta}{2\left(\frac{N_p-1}{2}\right)^5} - \frac{a_1}{\left(\frac{N_p-1}{2}\right)^4} - \frac{a_3}{\left(\frac{N_p-1}{2}\right)^2}\right)$$

$$a_1 < \frac{N_i-1-2\delta}{N_p-1} - \frac{7}{10}a_3\left(\frac{N_p-1}{2}\right)^2.$$

When an assumption is also made that $\alpha_5<0$, one bound may be obtained such that:

$$a_1 > \frac{N_i-1-2\delta}{N_p-1} - a_3\left(\frac{N_p-1}{2}\right)^2 \qquad \text{(Equation 28)}$$

Combining Equation 28 with:

$$\alpha_1 < -2\alpha_3/4(N_p-1)^2/2^2 + 5/4(N_i-1-2\delta)/(N_p-1) \qquad \text{(Equation 29)}$$

yields:

$$a_3 > -2\frac{N_i-1-2\delta}{(N_p-1)^3}. \qquad \text{(Equation 30)}$$

The cubic or higher order polynomial parameterization procedures discussed above may result in the generation of a plausible set of pilot indices, $\{k_1, k_2, \ldots, k|K_p|\}$. When $|K_p|=L$, then the following may be written:

$$z = \text{diag}\left\{\frac{\sigma_w^2}{\varepsilon_p} Q_d Q_p^{-1} D_{|x_p|^{-2}} Q_p^{H-1} Q_p^H\right\}. \qquad \text{(Equation 31)}$$

When $|K_p|>L$, Equation 31 may be rewritten using pseudo-inverses as:

$$z = \text{diag}\left\{\frac{\sigma_w^2}{\varepsilon_p} Q_d Q_p^+ D_{|x_p|^{-2}} Q_p^{H+} Q_p^H\right\}, \qquad \text{(Equation 32)}$$

as long as the power in the power in the pilot subcarriers is constant. However, since the pilot power in each pilot subcarrier may not be the same as all other pilot subcarriers, according to an embodiment, the following approximation is appropriate to use:

$$z \approx \text{diag}\left\{\frac{\sigma_w^2}{\varepsilon_p} Q_d Q_p^+ D_{|x_p|^{-2}} Q_p^{H+} Q_p^H\right\} = \underbrace{\frac{\sigma_w^2}{\varepsilon_p} |Q_d Q_p^+|^2 |x_p|^{-2}}_{r}, \qquad \text{(Equation 33)}$$

where $|Q_d Q_p^{-1}|^2$ is the element-wise magnitude square of the matrix $Q_d Q_p^{-1}$. From Equation 33, the channel estimate MSE, z, is linear in $|x_p|^{-2}$, which is the element-wise exponentiation of the vector. Accordingly, the $l^\infty$ norm of e is convex in $|x_p|^{-2}$. Thus, $|x_p|^{-2}$ and, equivalently $|x_p|$ can be found using:

$$\underset{|x_p|^{-2}}{\text{argmin}} \|z\|_\infty \qquad \text{(Equation 34)}$$

subject to $$\|x_p\|_2^2 = |K_p|$$

$$K_p = \{k_1, k_2, \ldots, k|K_p|\}.$$

Finally, using $|x_p|^* = (|x_p|^{-2*})^{-1/2}$, where $|x_p|^{-2*}$ is the solution from Equation 34, we have:

$$\underset{E[|x_d|^2],\varepsilon_p}{\text{argmin}} \|e\|_\infty \qquad \text{(Equation 35)}$$

subject to $$\varepsilon_p + \varepsilon_d = \varepsilon_s,$$

$$|x_p| = |x_p|^*$$

$$E[\|x_d\|_2^2] = |K_d|$$

$$K_p = \{k_1, k_2, \ldots, k_{|K_p|}\}$$

$$x_n = 0_{|K_n| \times 1},$$

which may not be convex or easily solvable using standard optimization procedures.

In order to simplify Equation 35, the optimizing values $\epsilon^*_p$ and $\epsilon^*_d$ may be determined before determining how much power to allocate to individual subcarriers. The joint optimization of $\epsilon_p$ and $\epsilon_d$ may not be convex, and may be difficult to solve generally. In an embodiment, a method for determining $\epsilon^*_p$ and $\epsilon^*_d$ without knowledge of $E[|x_d|^2]$ is performed. Once $\epsilon^*_p$ and $\epsilon^*_d$ are solved, the optimizing value of $E[|x_d|^2]$ may be determined.

At this point, $E[|x_d|^2]$ is not known, and therefore it is difficult to formulate the problem in terms of a minimization of $\|e\|_\infty$. However, it is known that $E[\|x_d\|_2^2]=|K_d|$. To justify the use of $E[\|x_d\|_2^2]$, which is known, instead of $|K_d|E[|x_d|^2]$, which is unknown, in the optimization of the data and pilot power, an assumption is made, in an embodiment, that $|K_d|\|e\|_\infty$ and $\|e\|_1$ are interchangeable in the current context.

For properly chosen pilots, the range of channel estimate MSEs, e, should be relatively small. Over a small range of values, any infinitely differentiable function can be approximated with an affine function. In this case, the function of interest may be the function $f_s(\cdot)$, that relates the SER, $p_s$, to the symbol estimate MSEs, $[e]_k$ (e.g., $p_s = \Sigma_k f_s([e]_k)$). Using Jensen's inequality, a lower bound can be found to be $p_s \geq f_s(\Sigma_k[e]_k)$, and since the SER function is monotonic, an upper bound can be found to be $p_s \leq f_s(|K_d| \|e\|_\infty)$. With the knowledge that the elements of e may be relatively constant, an assumption may be made that the bounds are close so that $p_s \approx f(\Sigma_k[e]_k)$. Written out, the following may be expressed:

$$\sum_k [e]_k = \frac{\sigma_w^2}{\varepsilon_p} \|r^*\|_1 + \frac{\sigma_w^2}{\varepsilon_d} E[\|x_d\|_2^2], \quad \text{(Equation 36)}$$

where r is defined in Equation 33 and r* is the optimizing value of r where $|x_p|=|x_p|^*$. A goal is to minimize Equation 36 which, assuming the approximation holds, minimizes the SER.

Using simple calculus and the constraints $E[\|x_d|_2^2]=|K_d|$ and $\varepsilon_p+\varepsilon_d=\varepsilon_s$, the pilot power may be found to be:

$$\varepsilon_p^* = \frac{\varepsilon_s(\|r^*\|_1 - \sqrt{|K_d|\|r^*\|_1})}{\|r^*\|_1 - |K_d|}, \quad \text{(Equation 37)}$$

and the data power is $\varepsilon_d^* = \varepsilon_s - \varepsilon_p^*$. With $\varepsilon_p^*$, Equation 35 may be further simplified by eliminating the optimization variable $\varepsilon_p$. That is, the problem can be reduced to:

$$\underset{E[|x_d|^2]}{\operatorname{argmin}} \|e\|_\infty \quad \text{(Equation 38)}$$

subject to $$\varepsilon_p^* + \varepsilon_d^*, |x_p|^*$$
$$E[\|x_d\|_2^2] = |K_d|$$
$$K_p = \{k_1, k_2, \ldots, k_{|K_p|}\}$$
$$x_n = 0_{|K_n| \times 1},$$

which may be straightforward to solve using Lagrange multipliers, in an embodiment.

With all of the independent optimization problems discussed above having been put forward, and as mentioned above, an overall method of determining pilot signal positions may be implemented as a grid search over the domain of ($\delta$, $\alpha_3$), where the domain of ($\delta$, $\alpha_3$) is defined above in Equations 19, 20 and 30.

In block 1006, a determination is made whether pilot signal positions have been determined for all antennas within the multiple transmit antenna system. If not, then the procedure iterates as shown, and another antenna is selected in block 1002. According to an embodiment, once $K_{pi}$ is found starting with antenna i, then the process of determining pilot signal positions for antenna i+1 is constrained by the condition that $K_{pi}$ are excluded as candidates for pilot positions for antenna i+1. When the system includes more than two antennas, the process of determining pilot signal positions for each additional antenna is further constrained to exclude, as candidate pilot positions, the positions determined for any other antenna. The iterative process of determining pilot positions continues until $K_{pi}$ are determined for all antennas. According to an embodiment, the composite pilot sequence from all antennas can be positioned in any non-null subcarriers, and are placed symmetrically about the center of the signal band. Without loss of generality, the pilots are placed sequentially from left to right, giving $g_i(\tau)$ a positive slope.

In an embodiment in which the antennas are co-located, the candidate $K_{pi}$ locations are found for each antenna by adding a constraint that a number of subcarrier locations that are adjacent to a candidate pilot location determined for a first antenna are not candidate locations for any other antenna (the "number of non-candidate adjacent subcarriers"). According to an embodiment, the number of non-candidate adjacent subcarriers equals 1, meaning that the minimum spacing between corresponding but offset pilot signals is two subcarriers (i.e., one non-candidate subcarrier is positioned between a pilot subcarrier for a first antenna and a corresponding but offset pilot subcarrier for a second antenna). Thus, for example, when a first pilot signal of the pilot sequence for the i=1 antenna begins immediately after the null subcarriers on the negative frequency band edge, represented as $K_{p1}$, then the subcarrier $K_{p1}+1$ is nulled, and is not a candidate during the search for available pilot locations for the i=1 antenna. For the i=2 antenna, both the $K_{p2}+1$ and the $K_{p2}-1$ locations are constrained as unavailable for the i=2 antenna. In other embodiments, the number of non-candidate adjacent subcarriers is zero (e.g., directly adjacent subcarriers may be candidates) or a number greater than one.

In an embodiment in which distributed antennas are implemented, this approach is taken an additional step by adding additional constraints when determining which adjacent subcarriers are unavailable as candidates for pilot signals. The justification for this approach is to increase the minimum spacing between corresponding but offset pilot signals of the multiple antennas in order to reduce inter-carrier interference susceptibility due to the different carrier frequency offsets associated with each respective antenna, each of which may induce an independent carrier frequency offset onto the signal $x_p$ as defined in Equation 1, above. According to an embodiment, the non-candidate subcarriers also are designated as being unavailable for synchronization information (e.g., synchronization information that may be added in block 1010, described below). According to an embodiment, the number of non-candidate adjacent subcarriers may be inversely related to the number of transmit antennas, and directly related to the total number of available subcarriers in the search space. In system that includes distributed antennas, the number of non-candidate adjacent subcarrier is in a range of three to eight, according to an embodiment. In other embodiments, the number of non-candidate adjacent subcarriers may be less than three or greater than eight.

In block 1008, power loading for each antenna is determined. According to an embodiment, the power loading for each antenna of a two antenna system may be denoted as:

$$P_{p1}, P_{p2}, \quad \text{(Equation 39)}$$

where $$\sum_{i=1}^{K_{p1}} P_{p1}[i] = \sum_{i=1}^{K_{p2}} P_{p2}[i].$$

When $K_{sp1}$, $K_{sp2}$ represents all possible subcarrier positions, excluding $K_{n1}=K_{n2}$, then the ith transmit antenna power may be denoted as:

$$P_{spi} = \begin{cases} P_{pi} & \text{for } K_{pi} \\ P_S & \text{for } K_{si} \\ 0 & \text{for } K_{pj}, j \neq i. \end{cases} \quad \text{(Equation 40)}$$

If $\hat{K}_{pi}$ represents the ith antenna candidate set of pilot sub-carrier positions, the pilot powers may be found, according to an embodiment, by solving:

$$\arg\min_u \|Au\|_\infty, \text{ subject to } \sum_{k=1}^{|K_{pi}|} \frac{1}{[u]_k} = E_p, \quad \text{(Equation 41)}$$

$$\hat{K}_{pi} = K_{pi}, [u]_k > 0 \forall k,$$

where $E_p$ is the power allocated to the pilots, A is the element-wise magnitude square of the matrix $Q_{si}Q_{pi}^+$, where $Q_{pi}=[Q]K_{pi}, \{1, 2, \ldots, L\}$, $Q_{si}=[Q]K_{si}, \{1, 2, \ldots, L\}$, and $$Q_{k,n} = N^{-1/2} \exp(-j2\pi(n-1)(k-1)/N), 1 \leq k,n \leq N. \quad \text{(Equation 42)}$$

The LS channel estimator is $\hat{H}_i = Q_{si}Q_{pi}^+ Y_{ki}^P [X_{ki}^P]^{-1}$ ($CFO_i = 0$), where $Y_{ki}^P$ and $X_{ki}^P$ are the received and transmitted pilot signals, respectively, at discrete frequency k for antenna i. The LS estimator data subcarrier MSE of the channel estimate may be approximated by:

$$z_i \approx \text{diag}\left\{ \frac{\sigma_w^2}{E_p} Q_{si} Q_{pi}^+ D_{|x_p^i|^{-2}} Q_{pi}^{H+} Q_{si}^H \right\}, \quad \text{(Equation 43)}$$

where $x_p^i (=X_{ki}^P)$ are the ith antenna modulated pilot values, $D_u$ is a diagonal matrix with diagonal elements from vector u, and $Q^+$ and $Q^H$ denote the pseudo inverse and Hermitian transpose of Q, respectively. According to an embodiment, the transmitter pilot optimization does not require or utilize channel knowledge.

Once the pilot parameters are determined for each antenna, some or all of the remaining, in-band subcarriers may be designated for coarse synchronization information, in block 1010 (denoted as $K_{s1}, K_{s2}$). According to an embodiment, the coarse synchronization information exhibits a flat power profile in the frequency domain, and has an equal total power $P_s$ on each $K_{s1}, K_{s2}$, for each transmit antenna. The method may then end.

Figure 11:
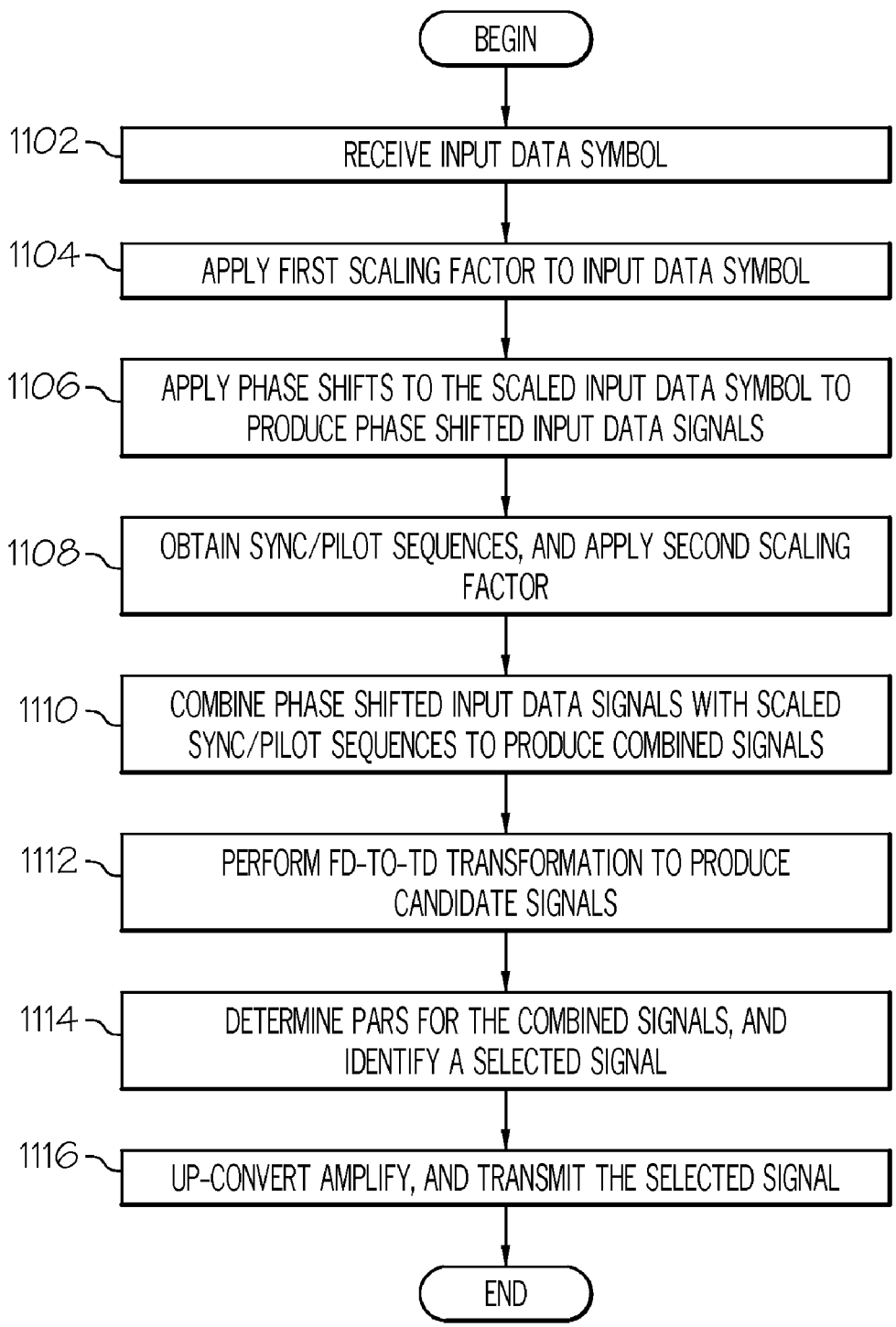
FIG. 11 is a flowchart of a method for generating and transmitting wireless signals that include unevenly spaced pilot signals, in accordance with an example embodiment.

FIG. 11 is a flowchart of a method for generating and transmitting wireless signals that include unevenly spaced (and potentially unequal power) pilot signals, in accordance with an example embodiment. Embodiments of the method are only briefly discussed in conjunction with FIG. 11, as various details and alternate embodiments were discussed in more detail above. Referring also to FIG. 3, the method may begin, in block 1102, when each of a plurality of transmitters (e.g., RF signal generators 370, 371, FIG. 3 or 470, 471, FIG. 4) receives (e.g., by data/scaling factor combiner 302) an input data symbol (e.g., input data symbol 320). In block 1104, a first scaling factor (e.g., first scaling factor 322) may be applied to the input data symbol, in order to produce a scaled input data symbol (e.g., scaled input data symbol 324). As discussed previously, the first scaling factor may have a value of $\sqrt{1-\rho}$, where $\rho$ is an embedding factor having an absolute value between 0 and 1. In other embodiments, the first scaling factor may have a different value. In block 1106, various different phase shifts (e.g., phase shifts 326) are applied (e.g., by phase shifters 304) to the scaled input data symbol, in order to produce a plurality of phase shifted input data signals (e.g., phase shifted input data signals 328).

In block 1108, a plurality of pilot signal sequences, which may be included within SPS (e.g., SPS 332) are obtained, and a second scaling factor (e.g., second scaling factor 330) is applied to the plurality of pilot signal sequences or SPS in order to produce a plurality of scaled pilot signal sequences or SPS (e.g., scaled SPS 334). As discussed previously, the second scaling factor may have a value of $\sqrt{\rho}$, in an embodiment, although the second scaling factor may have a different value, in other embodiments. Preferably, but not essentially, the second scaling factor has an inverse mathematical relationship with the first scaling factor (e.g., by varying the value of the embedding factor, as the second scaling factor value increases, the first scaling factor value decreases, and vice versa). According to an embodiment, the plurality of pilot signal sequences or SPS used by a first transmitter include pilot signals that are at different carrier frequencies from the pilot signals within pilot signal sequences or SPS used by any of the other transmitters.

In block 1110, each one of the plurality of phase shifted input data signals is combined (e.g., by data/SPS combiners 308) with one of the scaled pilot signal sequences or SPS in order to produce a plurality of combined signals (e.g., combined signals 340). In block 1112, a frequency domain-to-time domain transformation is performed (e.g., by FD-to-TD transformers 310) on each of the combined signals, in order to produce a plurality of candidate signals (e.g., candidate signals 342).

In block 1114, peak-to-average ratios (PARs) are determined (e.g., by signal selector 312) for some or all of the candidate signals, and based on the peak-to-average ratios, a selected signal (e.g., selected signal 346) is identified from the candidate signals. As discussed previously, the selected signal may be identified as the candidate signal with the lowest PAR, in an embodiment. In block 1116, the selected signal is cyclically-extended (e.g., by CE block 390), up-converted (e.g., by up-converter 314), amplified (e.g., by power amplifier 316), and transmitted over the channel (e.g., channel 106, FIG. 1) by each transmitter simultaneously. As discussed previously, transmission may be performed using co-located or distributed antennas, in various embodiments. Although not illustrated or discussed herein, those of skill in the art would realize that various other processes for conditioning, filtering, and/or processing the various signals prior to transmission also may be performed at various stages within the process of generating and transmitting the selected signal. Upon transmitting the selected signal, the method may then end.

The multiple transmitted signals combine over the channel, and may be received by a receiver of the system. In various embodiments, the receiver may be a multiple antenna receiver (e.g., in a MIMO system) or a single antenna receiver (e.g., in a MISO system). In the multiple antenna receiver case, the receiver antennas may be co-located or distributed. In the case of co-located and/or distributed MIMO receivers, the receiver(s) synchronization offsets and channel estimates may be determined independently or jointly.

Figure 12:
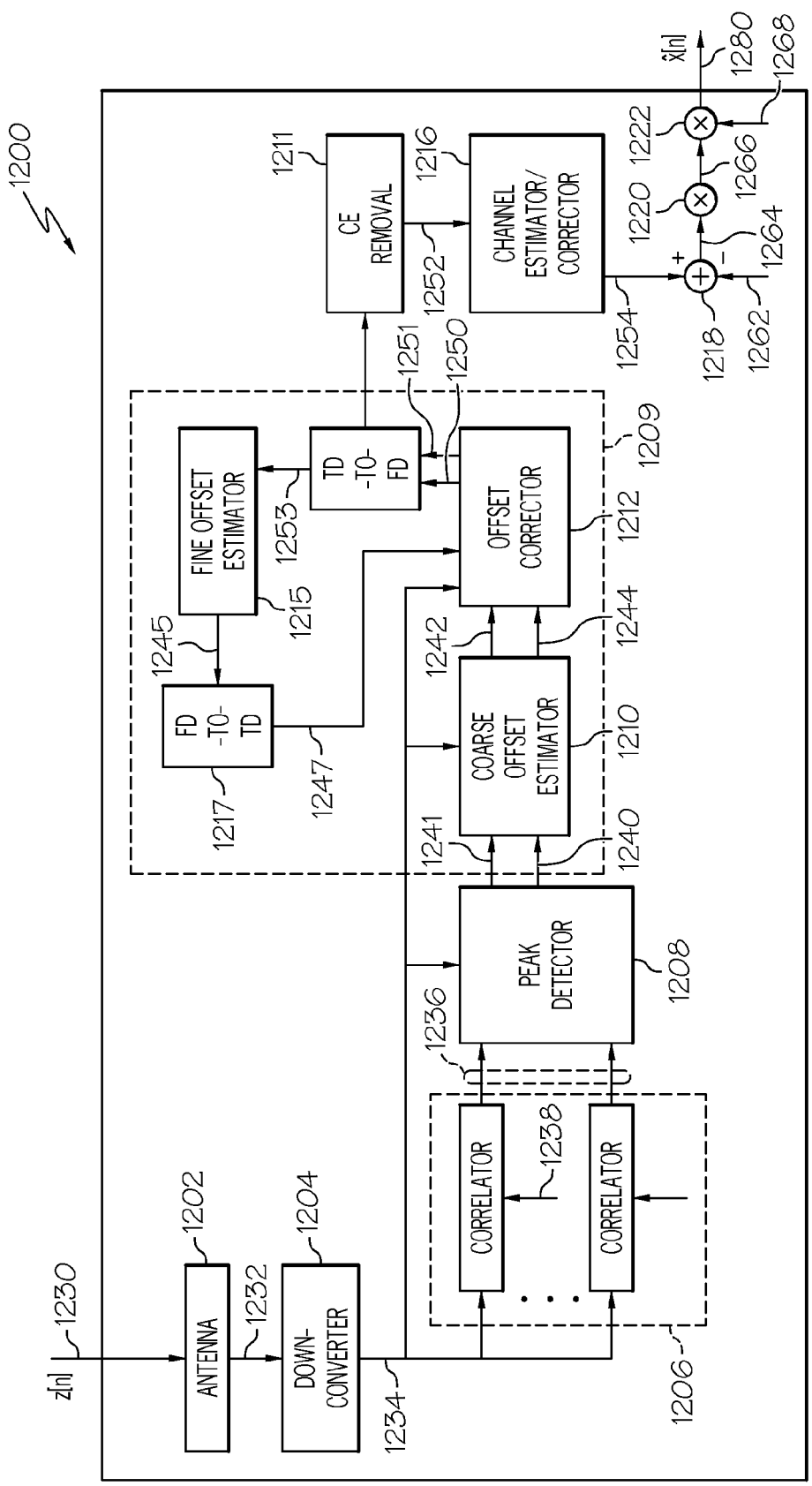
FIG. 12 is a simplified block diagram of a single-antenna receiver, in accordance with an example embodiment.

FIG. 12 is a simplified block diagram of a single-antenna receiver 1200, in accordance with an example embodiment. Receiver 1200 includes an antenna 1202, a down-converter 1204, a plurality of correlators 1206, a peak detector 1208, offset estimator/corrector 1209, a CE removal block 1211, a channel estimator/corrector 1216, an SPS removal element 1218, scaling element 1220, and a phase shift element 1222 operatively coupled together as illustrated in FIG. 12, in an embodiment. As will be described in detail below, receiver 1200 includes a conjugate correlation receiver, which is adapted to perform a blind phase sequence detection method, in which the receiver 1200 may exclude the traditional processes of performing time or frequency synchronization, and in which the receiver 1200 may not have a priori knowledge of the channel characteristics.

Antenna 1202 is adapted to receive a wireless RF signal 1230, z[n], from the channel, and to produce an analog RF signal 1232. As discussed in detail above, the wireless RF signal 1230 represents a channel-affected version of a selected signal that may include a data signal combined with a sequence of pilot signals (e.g., separately or combined with an SPS). Down-converter 1204 is adapted to perform an analog-to-digital conversion and a frequency down-conversion process on the analog RF signal 1232, in order to produce an IF or baseband received signal 1234. Essentially, the received signal 1234 represents a channel-affected version of a selected signal (e.g., selected signal 346, FIG. 3) that was transmitted by a transmitter (e.g., transmit system 300, FIG. 3) over a channel. The received signal 1234 may be represented by the following equation:

$$z^{(\tilde{d})}[n] = (f_{PA}(y^{(\tilde{d})}[n-n_0])*h[\tau])e^{-j2\pi\epsilon/N} + \eta[n], \quad \text{(Equation 44)}$$

where $f_{PA}(\bullet)$ represents the power amplifier input-to-output characteristic, which may be assumed to be time-invariant (although the input-to-output characteristic may be time-variant, in other embodiments), $h[\tau]$ represents a multi-path fading component of the channel, $y^{(\tilde{d})}[n-n_0]$ represents the transmitted signal, $y^{(\tilde{d})}[n]$, subjected to a TO component, $e^{-j2\pi\epsilon/N}$ represents a CFO component, $\eta[n]$ represents an additive noise component, $*$ is the convolution operator, and $\tilde{d}$ is the SLM index. It is to be noted that any carrier phase shift present between the transmitter and receiver is assumed to be included in the phase of the channel at the receiver.

As will be described in detail below, receiver 1200 is adapted to determine estimated channel perturbations (e.g., multi-path fading, TO, CFO, SFO, and/or other signal perturbations) reflected within the received signal 1234, to apply corrections to the received signal 1234 based on the estimated channel perturbations, and to produce an output data symbol 1280 based on the corrected received signal, where the output data symbol 1280 represents an estimate of the input data symbol (e.g., input data symbol 320, FIG. 3) that was processed and transmitted by the transmitter.

In an embodiment, estimated channel perturbations are determined by the plurality of correlators 1206, the peak detector 1208, the offset estimator/corrector 1209, and the channel estimator/corrector 1216. The plurality of correlators 1206 includes computational apparatus adapted to receive the received signal 1234, to obtain a plurality of candidate synchronization sequences 1238, and to produce a plurality of conjugate correlation (CC) outputs 1236, $r^{(d)}[u]$. More particularly, each correlator 1206 is adapted to correlate the received signal 1234 with a different candidate synchronization sequence 1238, $s^{(d)}[n]$.

In an embodiment, the candidate synchronization sequences 1238 include time-domain versions of the same synchronization/pilot sequences (e.g., SPS 332, FIG. 3) as were combined by the transmitter (e.g., transmit system 300, FIG. 3) with the phase shifted input data (e.g., phase shifted input data 328, FIG. 3). As mentioned previously, both the transmitter (e.g., transmit system 300) and the receiver 1200 each may have knowledge of the candidate SPS by each having access to substantively identical tables of SPS, although the transmitter's SPS table may include SPS represented in the frequency domain, and the receiver's SPS table may include the same SPS represented in the time domain, in an embodiment.

The plurality of conjugate correlation outputs 1236 may be represented by the equation:

$$r^{(d)}[u] = CC\{s^{(d)}[n], z^{(\tilde{d})}[n-u]\}, \quad \text{(Equation 45)}$$

where the conjugate correlation between two length-N sequences may be defined as:

$$CC\{a[n], b[n]\} = \quad \text{(Equation 46)}$$
$$\left(\sum_{n=0}^{(N/2)-1} a^*[n]b[n-u]\right) \cdot \left(\sum_{n=N/2}^{N-1} a^*[n]b[n-u]\right)^*,$$

where $(\bullet)^*$ is the conjugate operation.

In an embodiment, the number of conjugate correlation outputs 1236 produced equals the candidate number quantity D, although the number of conjugate correlation outputs 1236 may be unequal to D, in other embodiments.

In an embodiment, the received signal 1234 may be divided into a plurality of subcode sequences in order to reduce the number of operations associated with performing the correlation process. In such an embodiment, each conjugate correlation output 1236 may be produced by generating a sub-correlation for each subcode sequence, and summing together the sub-correlations to form a summed result having a single correlation peak.

Correlators 1206 provide the plurality of conjugate correlation outputs 1236 to peak detector 1208. In an embodiment, correlators 1206 may not provide (or peak detector 1208 may not evaluate) those of the plurality of conjugate correlation outputs 1236 that have correlation peaks below a threshold. Peak detector 1208 includes computational apparatus adapted to determine an estimate of the SLM index 1240, $\hat{\tilde{d}}$, based on the conjugate correlation outputs 1236. As indicated previously, an SLM index identifies an SPS from a plurality of SPSs and the associated transmit antenna from which the SLM index was applied. In an embodiment, the SLM index estimate 1240 is determined according to the equation:

$$\hat{\tilde{d}} = \underset{d}{\operatorname{argmax}} |r^{(d)}[u]|. \quad \text{(Equation 47)}$$

Accordingly, the SLM index estimate 1240 corresponds to the conjugate correlation output 1236 that represents a highest correlation peak. Unlike traditional methods, embodiments include blind phase sequence detection criterion (e.g., no side information representing the SLM index is transmitted) in order to determine the SLM index estimate 1240, and the SLM index estimate 1240 is determined based on the conjugate correlations between the received signal 1234 and the candidate synchronization sequences 1238. Correct detection of $\tilde{d}$ may depend on the magnitude of the peaks of $|r^{(d)}[u]|$ for $d \neq \tilde{d}$, also referred to herein as "spurious correlation peaks." When the spurious correlation peaks all are less than the peak in $|r^{(\tilde{d})}[u]|$, $\tilde{d}$ may be correctly detected (e.g., $\hat{\tilde{d}} = \tilde{d}$). In an embodiment, and as will be described in more detail later, the candidate SPS 1238 are designed so that the spurious correlation peaks are low. In a particular embodiment, the candidate SPS 1238 are designed so that:

$$[\max CC\{s^{(d)}[n], s^{(d)}[n-u]\}] < th_{self}, \quad \text{(Equation 48)}$$

where $th_{self}$ is a threshold that provides adequate system performance. Peak detector 1208 provides the SLM index estimate 1240, $\hat{\tilde{d}}$, to offset estimator/corrector 1209 (or more particularly to coarse offset estimator 1210), along with the $\hat{\tilde{d}}$th conjugate correlation output 1241 (although this may be obtained from elsewhere, as well).

Offset estimator/corrector 1209 includes a coarse offset estimator 1210, an offset corrector 1212, a time domain-to-frequency domain (TD-to-FD) transformer 1214, a fine offset estimator 1215, and a frequency domain-to-time domain (FD-to-TD) transformer 1217, in an embodiment. Coarse offset estimator 1210 includes computational apparatus adapted to determine a plurality of channel perturbations, including coarse timing offset estimates 1242 and coarse carrier frequency offset estimates 1244.

In an embodiment, coarse offset estimator 1210 is adapted to determine a coarse timing offset estimate 1242, $\hat{n}_0$, according to the equation:

$$\hat{n}_0 = \underset{u}{\mathrm{argmax}} |r^{(\hat{\tilde{d}})}[u]|. \quad \text{(Equation 49)}$$

Accordingly, the coarse timing offset estimate 1242 is determined based on the maximum of the $\hat{\tilde{d}}$th conjugate correlation output. Assuming that $\hat{\tilde{d}} = \tilde{d}$, the coarse timing offset estimate should be determined (or "detected") correctly as long as $|r^{(\tilde{d})}[n_0]| < r^{(\tilde{d})}[n]$ for $n \neq n_0$.

In an embodiment, coarse offset estimator 1210 also is adapted to determine a coarse estimate of the carrier frequency offset (CFO) 1244, $\hat{\epsilon}$, according to the equation:

$$\hat{\epsilon} = \mathrm{angle}(r^{(\hat{\tilde{d}})}[\hat{n}_0]). \quad \text{(Equation 50)}$$

Essentially, a coarse CFO estimate 1244 is determined as the phase of the conjugate correlation output 1236 that was determined by peak detector 1208 to have the highest correlation peak.

In an embodiment, the coarse offset estimator 1210 provides the estimated channel perturbations (e.g., coarse timing offset estimates 1242 and coarse CFO estimates 1244) to offset corrector 1212. Offset corrector 1212 includes computational apparatus adapted to receive the received signal 1234 and the estimated channel perturbations, and to effectively compensate for those estimated channel perturbations in the received signal 1234 by aligning the received signal 1234 on a symbol boundary using the coarse timing offset estimate 1242 and the coarse CFO estimate 1244, which may include removing the cyclic extension from the received signal 1234. In an embodiment, offset corrector 1212 produces a coarsely-corrected signal 1250.

Once the coarse timing and carrier frequency offsets are removed, the coarsely-corrected signal 1250 may be transformed to the frequency domain by TD-to-FD transformer 1214, which includes computational apparatus adapted to perform a time domain-to-frequency domain transformation on the corrected signal 1250, in order to produce a frequency-domain, coarsely-corrected signal 1253. The time domain-to-frequency domain transformation may include a Fourier transform (FT) or, more particularly, a fast Fourier transform (FFT), in various embodiments, although other types of time domain-to-frequency domain transformations may be performed in other embodiments.

In an embodiment, fine offset estimation may then be performed using fine offset estimator 1215. In an embodiment, fine offset estimator 1215 determines a fine CFO and SFO estimate, which will be applied to the coarsely-corrected signal 1250 by offset corrector 1212. In an embodiment, fine offset estimator 1215 determines a fine CFO estimate, $\epsilon_i$, and a fine SFO estimate, $\alpha_i$, using the pilot signals (e.g., pilot signals 621-636, 641-656, FIG. 6 or 821-836, 841-856, FIG. 8) within the frequency-domain, coarsely-corrected signal 1253. According to a more particular embodiment, pilot signals (or SPS) within consecutive transmitted symbols in the preamble are used to estimate CFO and SFO. In an embodiment, this includes estimating the phase of each pilot signal, and determining the phase change in any particular pilot signal from OFDM symbol to OFDM symbol. Thus, the fine CFO estimate may be determined using the common subcarrier phase difference between OFDM symbols, which may then be averaged across all pilot subcarriers to minimize estimation variance.

According to an embodiment, the CFO is estimated by measuring the phase change from one symbol to another symbol along each pilot subcarrier, k. The received time domain version of the preamble part of a transmitted signal may be represented as $y_p$, which can be separated into two parts such that $y_p = [y_{p1} y_{p2}]^T$. The frequency domain pilot part of the $y_{p1}$ and $y_{p2}$ signals for the ith transmit antenna (ignoring receiver noise, and assuming channel order M<cyclic prefix length, and the CFO inter-carrier interference is part of the channel frequency response, $H_i$) can be approximated as:

$$Y_{ki1}^P = X_{ki1}^P H_{ki1}^P e^{-j2\pi\epsilon'_1/N} \text{ and } Y_{ki2}^P = X_{ki2}^P H_{ki2}^P e^{-j2\pi\epsilon'_2/N}, \quad \text{(Equation 51)}$$

respectively. When the phases $\phi_{ki1}$ and $\phi_{ki2}$, are computed as $\angle Y_{ki1}^P$ and $\angle Y_{ki2}^P$, respectively, the phases on the negative frequency half and positive frequency half can be represented, respectively, as $\phi_{ki1n}$, $\phi_{ki2n}$ and $\phi_{ki1p}$, $\phi_{ki2p}$. In an embodiment, the CFO may be estimated according to:

$$\varepsilon_i = \frac{1}{2\pi(1+g)} \sum_{k=0}^{|K_{pi}-1|} ((\phi_{ki1n} + \phi_{ki1p}) - (\phi_{ki2n} + \phi_{ki2p})) \cdot v_{ki}, \quad \text{(Equation 52)}$$

and the SFO may be estimated according to:

$$\alpha_i = \frac{1}{2\pi(1+g)|K_{sp}|} \sum_{k=0}^{|K_{pi}-1|} ((\phi_{ki1n} - \phi_{ki1p}) - (\phi_{ki2n} - \phi_{ki2p})) \cdot v_{ki}, \quad \text{(Equation 53)}$$

where $v_{ki}$ is a weighting vector of size $|K_{pi}|$ based on the received pilot power. When $P_{ki1} = Y_{ki1}^P \cdot (Y_{ki1}^P)^*$, then $v_k$ can be written as:

$$v_{ki} = \frac{(P_{ki1} + P_{ki2})/2}{\sum_{k=0}^{|K_{pi}-1|} (P_{ki1} + P_{ki2})/2}. \quad \text{(Equation 54)}$$

The analytic closed form solution for MSE of the weighted CFO and SFO estimators, using the parametric optimized pilots, can be determined analytically to be:

$$MSE_{\varepsilon_i} = \left(\frac{1}{2\pi(1+g)\beta_i}\right)^2 \frac{1}{|K_{pi}|(1/\sigma_n^2 + \sigma_{ici}^2)}\sum_{k=1}^{|K_{pi}|}\frac{1}{E_{pi}(k)}, \quad \text{(Equation 55)}$$

and $$MSE_{\alpha_i} = \quad \text{(Equation 56)}$$
$$\left(\frac{4}{2\pi(1+g)\beta_i|K_{spi}|}\right)^2 \frac{1}{|K_{pi}|(1/(\sigma_n^2 + \sigma_{ici}^2))} \times \sum_{k=1}^{|K_{pi}|}\frac{1}{E_{pi}(k)},$$

where g is the guard interval percentage of the OFDM symbol duration, $\beta_i$ is the pilot boosting factor, and $\sigma_n^2$ and $\sigma_{ici}^2$ are the noise variance and interference variance due to inter-carrier interference from CFO and SFO, respectively.

Fine offset estimator 1215 may provide the fine CFO and SFO estimates to offset corrector 1212 via a feedback path (not illustrated). In addition, fine offset estimator 1215 provides a feedback version 1245 of the frequency-domain, coarsely-corrected signal to offset corrector 1212 via FD-to-TD transformer 1217, which transforms the feedback version 1245 of the coarsely-corrected signal into the time domain to produce a time-domain, fed back, coarsely-corrected signal 1247. In an alternate embodiment, the coarsely-corrected signal 1250 is retained in memory, and is not fed back to offset corrector 1212. Either way, offset corrector 1212 applies the fine CFO and SFO estimates to the coarsely-corrected signal (either signal 1250 or 1247) to re-produce the finely-corrected signal 1251. In an alternate embodiment, fine CFO and SFO correction may be performed in the frequency domain after fine offset estimator 1215, rather than performing the fine CFO and SFO correction in the time domain by offset corrector 1212.

In a further embodiment, fine offset estimator 1215 also may determine a fine timing offset estimate and/or a carrier phase offset estimate. For example, fine offset estimator 1215 may determine a fine timing offset estimate based on the phase slope between pilot subcarriers common to each OFDM symbol, which also can be averaged over all symbols. Fine offset estimator 1215 may determine a carrier phase offset estimate from the mean value of the phase slope in each OFDM symbol, in an embodiment.

When a fine timing and/or carrier phase offset are estimated, fine offset estimator 1215 provides the fine timing and/or carrier phase offsets to channel estimator/corrector 1216, in an embodiment, for correction of the fine timing and/or carrier phase offset in the frequency domain. In an alternate embodiment, fine offset estimator 1215 may provide the fine timing and/or carrier phase offsets, if estimated, to offset corrector 1212 for correction in the time domain. This process may be implemented in both co-located and/or distributed multiple antenna receivers, according to various embodiments.

The finely-corrected signal 1251 is transformed to the frequency domain by TD-to-FD transformer 1214, the cyclic extension is removed by CE removal block 1211, and the resulting corrected signal 1252 is provided to channel estimator/corrector 1216. In an alternate embodiment, cyclic extension removal may be performed earlier in the receive lineup and/or may be performed in conjunction with some other functional block (e.g., offset corrector 1212 or some other functional block). Either way, channel estimator/corrector 1216 receives the corrected signal 1252, determines a channel estimate, and based on the channel estimate, proceeds to equalize the channel effects in the corrected signal 1252 to produce an equalized combined signal 1254. Channel estimator/corrector 1216 is adapted to determine a channel estimate, $\hat{H}_k$, based on the corrected signal 1252. In an embodiment, the channel estimate is determined by generating a first quantity according to the equation:

$$W_k^{(d)} = IDFT\{z^{(d)}[n+\hat{n}_0]\}e^{j2\pi\hat{\epsilon}/N}, \quad \text{(Equation 57)}$$

which yields $W_k^{(d)} = Y_k^{(d)} H_k + \eta_k + \delta_k + \iota_k$, where $\delta_1$, is the distortion noise caused by the power amplifier (e.g., power amplifier 316, FIG. 3), $\iota_k$ is the inter-carrier interference, $H_k$ and $\eta_k$ are the IDFTs of h[n] and q[n], respectively. From $W_k^{(d)}$, channel estimator/corrector 1216 may estimate the channel in the pilot subcarriers (e.g., pilot subcarriers 621-636, 641-656, FIG. 6 or 821-836, 841-856, FIG. 8) according to the equation:

$$\hat{H}_k = \frac{W_k^{(d)}}{S_k^{(d)}\sqrt{\rho}}, \quad \text{(Equation 58)}$$
$$k \in K_p.$$

In an embodiment, channel estimator/corrector 1216 may interpolate the pilot subcarrier channel estimates to the data-bearing subcarriers (e.g., data-bearing subcarriers 606, 806, FIG. 6, 8), $k \in K_d$ so that $\hat{H}_k$ is defined for $k \in K_d \cup K_p$.

In an alternate embodiment, assumptions may be made that all of the synchronization works perfectly (e.g., $\hat{\tilde{d}} = \tilde{d}$, $\hat{n}_0 = n_0$, and $\hat{\epsilon} = \epsilon$) and that no distortion noise is introduced by the transmitter power amplifier (e.g., power amplifier 316, FIG. 3). With those assumptions, the first quantity represented in Equation 58, above, may be simplified to:

$$W_k^{(d)} = Y_k^{(d)} H_k + \eta_k, \quad \text{(Equation 59)}$$

where $\eta_k \approx CN(0,\sigma_\eta^2)$. Using these assumptions and the first order approximation that $E[|\eta_k|^2 |\hat{X}_k|^2 H_k] \approx \sigma^2$ for $k \in K_d$, the symbol estimate mean square error (MSE) may be determined according to the equation:

$$E[|\hat{X}_k - X_k|^2 | H_k] \approx \quad \text{(Equation 60)}$$
$$\frac{\sigma^2}{|H_k|^2} \cdot \left(\frac{(1-\beta)|K_p|}{\beta(1-\rho)|K_d|} + \frac{|K_p|}{\beta\rho|K_d|} + \frac{1}{1-\rho}\right).$$

As Equation 60 indicates, the MSE is dependent on the ratio of pilot to data subcarriers $|K_p|/|K_d|$. Also, minimizing the pilot subcarrier power may be achieved by setting $\beta=1$ when perfect synchronization is assumed. However, in an embodiment, $\beta$ is selected such that $\beta<1$, in order to achieve desired synchronization performance.

Channel estimator/corrector 1216 may then generate an equalized combined signal 1254 by equalizing the channel effects based on the channel estimate. After the various offset and channel corrections, the equalized combined signal 1254 may be represented as:

$$z^{(d)}[n] = ((f_{PA}(y^{(d)}[n-n_0])*h[\tau])e^{-j2\pi\epsilon/N} + \eta[n])e^{j2\pi\hat{\epsilon}/N}. \quad \text{(Equation 61)}$$

SPS removal element 1218 includes computational apparatus adapted to receive the equalized combined signal 1254, and to remove the scaled SPS 1262 corresponding to the SLM index estimate 1240 from the equalized combined signal 1254 (e.g., to combine $-\sqrt{\rho}s_k^{(d)}$ with the equalized combined signal 1254) in order to produce an estimated, phase shifted data signal 1264. In an embodiment, the scaled SPS 1262 may be obtained by retrieving the SPS $s_k^{(d)}$ corresponding to the SLM index estimate 1240 from a table of SPS, which is accessible to or stored in receiver 1200, and by applying the scaling factor $\sqrt{\rho}$ to the retrieved SPS. The SPS table includes one or more pre-generated sets of SPS, where each SPS in a set may be referenced by an SLM index. Each SPS in the receiver's SPS table is represented in the frequency domain, in an embodiment. In an embodiment, each SPS includes synchronization information and pilots, and those pilots may have variable pilot signal parameters (e.g., variable pilot spacing and/or pilot power). In an alternate embodiment, the synchronization information and pilots may be separately represented.

Scaling element 1220 is adapted to apply a scaling factor to the estimated, phase shifted data signal 1264, in order to produce a scaled, phase shifted data signal 1266, which has a peak amplitude approximately equal to that of the original input data, X[n]. Phase shift element 1222 includes computational apparatus adapted to phase shift the scaled, phase shifted data signal 1266 by a phase shift value 1268 corresponding to the SLM index estimate 1240 (e.g., to shift the scaled, phase shifted data signal 1266 by $e^{-j\phi^{(\hat{d})}}$). The remaining signal is demodulated in order to produce the output data symbol 1280, $\hat{X}_k[n]$. When the SLM index estimate 1240 represents a correctly-detected SLM index (e.g., an SLM index corresponding to the selected signal 346, FIG. 3, identified at the transmit system 300), then blind phase sequence detection has been robustly performed by receiver 1200, and the output data symbol 1280 reflects an accurate estimate of the input data symbol (e.g., input data symbol 320, FIG. 3).

As discussed in detail above, both a transmitter (e.g., transmit system 300, FIG. 3) and a receiver (e.g., receiver 1200, FIG. 12) have access to at least one set of pre-generated SPS. Wireless signals that include pilot signals with variable pilot signal parameters and/or SPS generated according to an embodiment may have excellent synchronization properties. As discussed previously, synchronization includes estimating the SLM index, $\hat{d}$, for the transmitted signal, estimating a coarse timing offset, $n_0$, and estimating a coarse CFO, $\hat{\epsilon}$. An estimation of which phase sequence index, $\hat{d}$, was transmitted may be made via criterion specified in Equation 47, above. From Equation 47, it is apparent that correct estimation of $\hat{d}$ depends on the peaks of $|r^{(d)}[u]|$ for d≠$\hat{d}$ (i.e., spurious correlation peaks). When the spurious correlation peaks all are less than the peak in $|r^{(d)}[u]|$, $\hat{d}$ will be correctly detected. Accordingly, in an embodiment, variable pilot signal parameters are determined and sets of SPS are generated so that spurious correlation peaks are low, when compared with the peak in $|r^{(d)}[u]|$.

Assuming that $x^{(d)}[n]$ is independent of $s^{(d)}[n]$, the peaks in $|r^{(d)}[u]|$ when d≠$\hat{d}$ are dictated by the peaks of the conjugate correlation CC{$s^d[n],s^q[n]$} for d≠q. In an embodiment, a set of SPS is generated so that $\max_{u,d\ne q}CC\{s^d[n],s^q[n-u]\}$ is minimized using an optimization procedure. In an alternate embodiment, a set of SPS may be generated more simply according to the following equation:

$$\left[\max_{u,d\ne q}CC\{s^{(d)}[n], s^{(q)}[n-u]\}\right] < th_{cross}, \quad \text{(Equation 62)}$$

where $th_{cross}$ is a predetermined threshold. More particularly, in an embodiment, $th_{cross}$ is a threshold that is determined to provide adequate system performance by considering an optimal or near-optimal balance between the synchronization detection performance (e.g., a probability of missing a synchronization signal and a probability of falsely detecting a synchronization signal when none is present), the estimation quality (e.g., mean square error (MSE) or other quality estimation quantities) of the timing, frequency, and phase estimation performance for synchronization, the channel estimation performance (e.g., MSE or other channel estimation quantities), and the receiver demodulator bit error rate (BER) performance. In an embodiment, $th_{cross}$<0.1, although $th_{cross}$ may be equal to or less than 0.1, in other embodiments. Alternatively, $th_{cross}$ may be greater than 0.1, in still other embodiments.

As discussed previously, once $\hat{d}$ is detected, a coarse timing offset estimate (e.g., coarse timing offset estimate 1242), $\hat{n}_0$, may be determined according to Equation 49, above. As Equation 49 indicates, the coarse timing offset estimate is determined based on the maximum of the $\hat{d}$th conjugate correlation output. Although the channel estimator (e.g., channel estimator/corrector 1216, FIG. 12) may compensate for differences $|n_0-\hat{n}_0|\le L_{cp}-L_h+1$, where $L_h$ is the length of the channel and $L_{cp}$ is the length of the cyclic prefix, the SPS are generated, in an embodiment, to minimize this difference. According to Equation 49, above, $n_0$ is determined based on the maximum of the $\hat{d}$th conjugate correlation output, and it may be assumed that $\hat{d}=\tilde{d}$, $n_0$ may be detected correctly as long as $|r^{(\tilde{d})}[n_0]|>r^{(\tilde{d})}[n]$ for all n≠$n_0$. In an embodiment, a set of SPS is generated so that $\max_{d,u\ne n_0}CC\{s^{(d)}[n],s^{(d)}[n-u]\}$ is minimized. In an alternate embodiment, a set of SPS may be generated more simply according to the equation:

$$\left[\max_{d,u\ne n_0}CC\{s^{(d)}[n], s^{(d)}[n-u]\}\right] < th_{self}, \quad \text{(Equation 63)}$$

where $th_{self}$ is a predetermined threshold (e.g., a threshold that is determined to provide adequate system performance). In an embodiment, $th_{self}$<0.1, although $th_{self}$ may be equal to or less than 0.1, in other embodiments. Alternatively, $th_{self}$ may be greater than 0.1, in still other embodiments. This process may be performed for any number of transmitter and receiver antennas, according to various embodiments.

Figure 13:
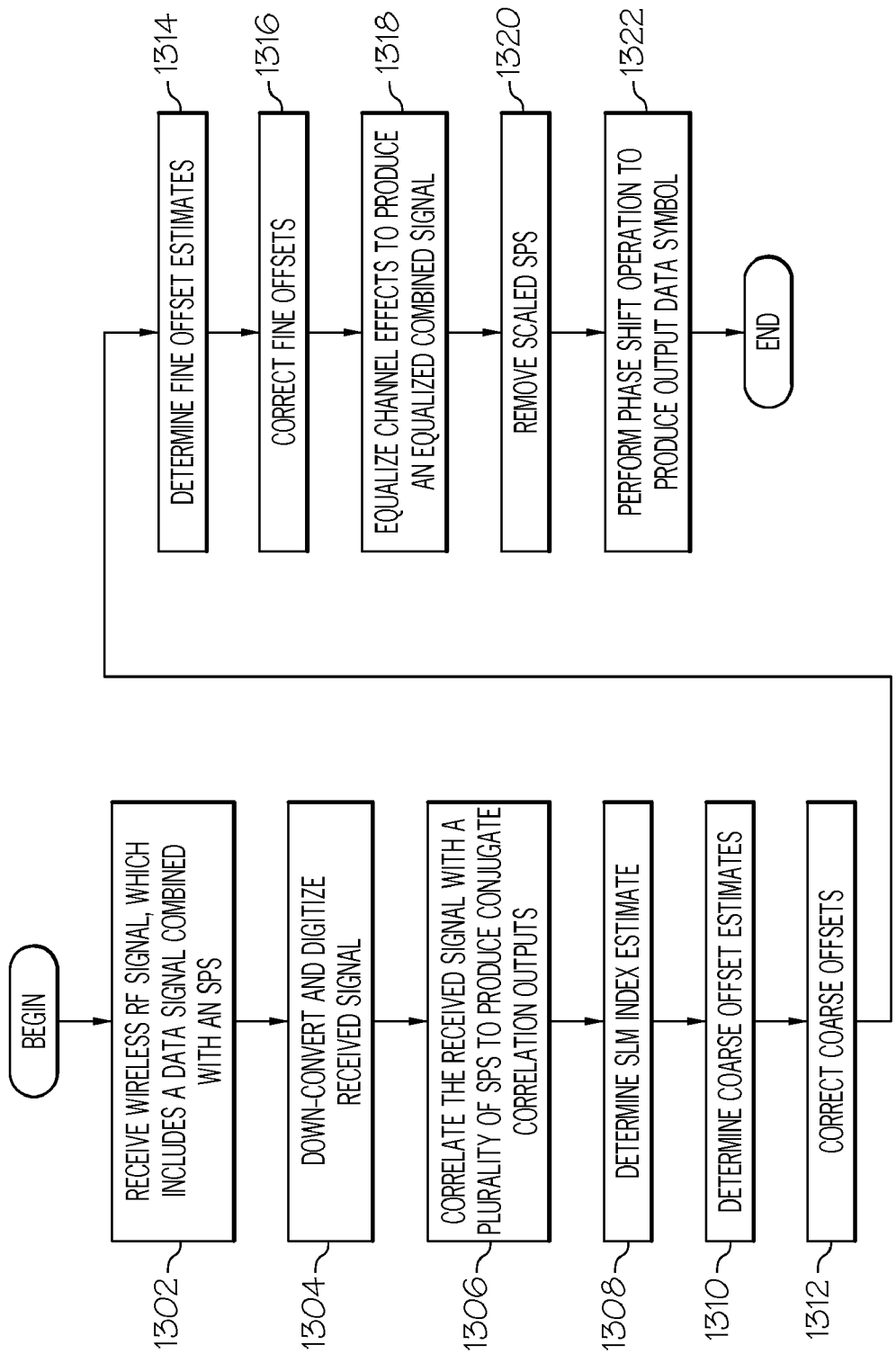
FIG. 13 is a flowchart of a method for receiving and processing wireless signals that include embedded pilot signals, in accordance with an example embodiment.

FIG. 13 is a flowchart of a method for receiving and processing wireless signals that include embedded pilot signal sequences or SPS, in accordance with an example embodiment. Embodiments of the method are only briefly discussed in conjunction with FIG. 13, as various details and alternate embodiments were discussed in more detail above. Referring also to FIG. 12, the method may begin, in block 1302, when a receiver (e.g., receiver 1200) receives (e.g., via antenna 1202) a wireless RF signal (e.g., RF signal 1230) from the channel. The received RF signal includes a channel-affected version of a data signal combined with an SPS, as discussed in conjunction with the description of embodiments of the transmitter (e.g., transmit system 300, FIG. 3), and embodiments of the method for generating and transmitting the wireless RF signal (e.g., FIG. 11). In block 1304, the received RF signal is down-converted and digitized (e.g., by down-converter 1232), in order to produce an IF or baseband received signal (e.g., received signal 1234).

In block 1306, the received signal is correlated (e.g., by correlators 1206) with a plurality of SPS (e.g., SPS 1238) to produce a plurality of conjugate correlation outputs (e.g., conjugate correlation outputs 1236). In block 1308, an SLM index estimate (e.g., SLM index estimate 1240) is determined (e.g., by peak detector 1208), based on the conjugate correlation outputs. This process may determine a unique $n_0$ for each transmitter antenna, according to an embodiment.

In block 1310, coarse offset estimates (e.g., coarse TO and coarse CFO) may be determined (e.g., by coarse offset estimator 1210) based on the conjugate correlation output corresponding to the SLM index estimate. In block 1312, corrections are made (e.g., by offset corrector 1212) for the coarse timing and carrier frequency offsets in the received signal, in order to produce a coarsely-corrected signal (e.g., coarsely-corrected signal 1250). In block 1314, fine estimated offsets (e.g., fine CFO/SFO, fine TO, and/or phase offset) may be determined (e.g., by fine offset estimator 1215) based on the coarsely-corrected signal, and in block 1316, additional corrections may be made (e.g., by offset corrector 1212 in the time domain or by a frequency-domain offset corrector), in order to produce a finely-corrected signal (e.g., finely-corrected signal 1251). A cyclic extension may be removed from the finely-corrected signal (e.g., by CE removal block 1211 or some other functional block).

In block 1318, channel effects are estimated (e.g., by channel estimator/corrector 1216) from a frequency-domain version of the finely-corrected signal. The finely-corrected signal is then equalized based on the estimated channel effects, in order to produce an equalized combined signal (e.g., equalized combined signal 1254).

In block 1320, a scaled SPS (e.g., scaled SPS 1262) corresponding to the SLM index estimate is removed (e.g., by SPS removal element 1218) from the equalized combined signal, in order to produce an estimated, phase shifted data signal (e.g., estimated, phase shifted data signal 1264), which may be scaled (e.g., by scaling element 1220). A phase shift operation is performed (e.g., by phase shift element 1222), in block 1322, which includes phase shifting the scaled, phase shifted data signal by a phase shift value corresponding to the SLM index estimate. This operation results in the production of an output data symbol (e.g., output data symbol 1280), which reflects an estimate of the input data symbol (e.g., input data symbol 320, FIG. 3). The method may then end.

Embodiments of methods and apparatus for determining pilot signals having variable pilot signal parameters for embedding in wireless signals transmitted by multiple antennas of a multiple transmit antenna system have now been described. The foregoing detailed description is merely exemplary in nature and is not intended to limit the inventive subject matter or the application and uses of the inventive subject matter to the described embodiments. Furthermore, there is no intention to be bound by any theory presented in the preceding background or detailed description.

Those of skill in the art will recognize, based on the description herein, that various other apparatus and processes may be included in embodiments of the systems and methods described herein for conditioning, filtering, amplifying, and/or otherwise processing the various signals. In addition, the sequence of the text in any of the claims does not imply that process steps must be performed in a temporal or logical order according to such sequence unless it is specifically defined by the language of the claim. The process steps may be interchanged in any order, and/or may be performed in parallel, without departing from the scope of the inventive subject matter. In addition, it is to be understood that information within the various different messages, which are described above as being exchanged between the system elements, may be combined together into single messages, and/or the information within a particular message may be separated into multiple messages. Further, messages may be sent by system elements in sequences that are different from the sequences described above. Furthermore, words such as "connected" or "coupled to" used in describing a relationship between different elements do not imply that a direct physical connection must be made between these elements. For example, two elements may be connected to each other physically, electronically, logically, or in any other manner, through one or more additional elements, without departing from the scope of the inventive subject matter.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled technicians may implement the described functionality in varying ways for each particular application, but such implementation decisions should not be interpreted as causing a departure from the scope of the inventive subject matter.

The various illustrative logical blocks and modules described in connection with the embodiments disclosed herein may be implemented or performed with various types of computational apparatus, including but not limited to, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in one or more software modules executed by a processor, or in a combination of the two. A software module may reside in random access memory, flash memory, read only memory (ROM), erasable programmable ROM (EPROM), electrical EPROM, registers, hard disk, a removable disk, a compact disc ROM (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

An embodiment includes a method for wirelessly communicating signals across a frequency range that includes one or more sets of consecutive null subcarriers and a set of in-band subcarriers that is adjacent to the one or more sets of consecutive null subcarriers. The method includes the steps of generating a plurality of wireless signal for transmission, and simultaneously radiating each of the wireless signals over a wireless communication channel using a different one of a plurality of antennas. Each of the plurality of wireless signals includes a plurality of pilot signals, and the pilot signals within each of the plurality of wireless signals are represented in a plurality of in-band subcarriers that are unevenly spaced across the in-band subcarriers. Pilot signals of each of the plurality of wireless signals are positioned at subcarriers that are orthogonal in frequency with subcarriers at which pilot signals of all other ones of the plurality of wireless signals are positioned. According to a further embodiment, subcarrier indices for the plurality of pilot signals are determined using a third order or higher order polynomial parameterization of pilot subcarriers in conjunction with a convex optimization algorithm to produce pilot signals having near-optimal channel estimate mean square error (MSE) performance.

Another embodiment includes a method for wirelessly communicating signals that includes the steps of generating first and second wireless signals for transmission, radiating the first wireless signal over a wireless communication channel using a first antenna, and simultaneously with radiating the first wireless signal, radiating the second wireless signal over the wireless communication channel using a second antenna. The first wireless signal includes a plurality of first pilot signals, and the first pilot signals are represented in a plurality of first in-band subcarriers that are unevenly spaced across the in-band subcarriers. The second wireless signal includes a plurality of second pilot signals, and the second pilot signals are represented in a plurality of second in-band subcarriers that are unevenly spaced across the in-band subcarriers, and the second in-band subcarriers are at different subcarrier positions from the first in-band subcarriers.

Yet another embodiment includes a method that includes the step of receiving a received signal from a wireless communication channel, where the received signal represents channel-affected versions of a plurality of wireless signals that were transmitted by a multiple-antenna transmitter, and each of the wireless signals includes a plurality of pilot signals represented within a plurality of pilot subcarriers. The plurality of pilot signals are unevenly spaced with respect to adjacent pilots, and pilot signals of each of the plurality of wireless signals are orthogonal in frequency with pilot signals of all other ones of the plurality of wireless signals. The method also includes producing a corrected signal by applying corrections to the received signal based on estimated channel perturbations within the received signal, which estimated channel perturbations are determined based on the plurality of pilot signals, and producing an output data symbol from the corrected signal.

Yet another embodiment includes a system that includes one or more radio frequency (RF) signal generators configured to generate a plurality of wireless signal for transmission, and a plurality of antennas, operably coupled with the one or more RF signal generators. Each of the plurality of wireless signals includes a plurality of pilot signals, and the pilot signals within each of the plurality of wireless signals are represented in a plurality of in-band subcarriers that are unevenly spaced across the in-band subcarriers. Pilot signals of each of the plurality of wireless signals are orthogonal in frequency with pilot signals of all other ones of the plurality of wireless signals. The plurality of antennas is configured simultaneously to radiate each of the wireless signals over a wireless communication channel. According to an embodiment, the system also includes a receiver adapted to receive a received signal from the wireless communication channel, where the received signal represents a channel-affected version of the wireless signals that were radiated by the plurality of antennas. The receiver is also adapted to produce a corrected signal by applying corrections to the received signal based on estimated channel perturbations within the received signal, which estimated channel perturbations are determined based on the plurality of pilot signals, and to produce an output data symbol from the corrected signal.

While various exemplary embodiments have been presented in the foregoing detailed description, it should be appreciated that a vast number of variations exist. It should also be appreciated that the exemplary embodiments are only examples, and are not intended to limit the scope, applicability or configuration of the inventive subject matter in any way. Rather, the foregoing detailed description will provide those skilled in the art with a convenient road map for implementing various embodiments of the inventive subject matter, it being understood that various changes may be made in the function and arrangement of elements described in an exemplary embodiment without departing from the scope of the inventive subject matter as set forth in the appended claims and their legal equivalents.

What is claimed is:

1. A method for wirelessly communicating signals across a frequency range that includes one or more sets of consecutive null subcarriers and a set of in-band subcarriers that is adjacent to the one or more sets of consecutive null subcarriers, the method comprising the steps of:
generating a plurality of wireless signal for transmission, wherein each of the plurality of wireless signals includes a plurality of pilot signals, and the pilot signals within each of the plurality of wireless signals are represented in a plurality of in-band subcarriers that are unevenly spaced across the in-band subcarriers, and pilot signals of each of the plurality of wireless signals are positioned at subcarriers that are orthogonal in frequency with subcarriers at which pilot signals of all other ones of the plurality of wireless signals are positioned; and
simultaneously radiating each of the wireless signals over a wireless communication channel using a different one of a plurality of antennas.

2. The method of claim 1, wherein the plurality of antennas are co-located, and pilot signals of each of the plurality of wireless signals are located in adjacent subcarrier positions with respect to pilot signals of at least one other one of the plurality of wireless signals.

3. The method of claim 1, wherein the plurality of antennas are distributed, and pilot signals of each of the plurality of wireless signals are located in subcarrier positions that are offset with respect to subcarrier positions of all other ones of the plurality of wireless signals by at least two subcarrier positions.

4. The method of claim 1, wherein pilot signals positioned at corresponding but offset subcarrier positions in each of the plurality of wireless signals each have substantially equal power.

5. The method of claim 1, wherein at least two pilot signals of each plurality of pilot signals are transmitted at unequal power levels.

6. The method of claim 1, wherein subcarrier indices for the plurality of pilot signals are determined using a third order or higher order polynomial parameterization of pilot subcarriers.

7. The method of claim 6, wherein the polynomial parameterization is a cubic polynomial parameterization.

8. The method of claim 6, wherein the polynomial parameterization is a fifth order polynomial parameterization.

9. The method of claim 1, wherein the wireless signals include preamble symbols.

10. The method of claim 1, wherein the wireless signals include data symbols.

11. The method of claim 1, wherein the pilot signals of each of the plurality of wireless signals form a portion of a synchronization/pilot sequence.

12. The method of claim 11, wherein multiple synchronization/pilot sequence are inserted single carrier or spread spectrum signals periodically or aperiodically in time.

13. The method of claim 1, wherein generating a wireless signal of the plurality of wireless signals comprises:
 combining a plurality of phase shifted input data signals with a plurality of synchronization/pilot sequences to produce a plurality of combined signals, wherein each synchronization/pilot sequence of the plurality of synchronization/pilot sequences includes the plurality of pilot signals;
 performing frequency domain-to-time domain transformations of the combined signals to produce a plurality of candidate signals;
 determining peak-to-average ratios for at least some of the plurality of candidate signals;
 identifying a selected signal from the plurality of candidate signals based on the peak-to-average ratios; and
 further processing the selected signal to generate the wireless signal.

14. The method of claim 1, wherein the wireless signals are orthogonal frequency division multiplexed (OFDM) signals.

15. The method of claim 1, wherein the wireless signals are orthogonal frequency division multiple access (OFDMA) signals.

16. The method of claim 1, wherein the wireless signals are wideband code division multiple access (W-CDMA) signals.

17. A method for wirelessly communicating signals across a frequency range that includes one or more sets of consecutive null subcarriers and a set of in-band subcarriers that is adjacent to the one or more sets of consecutive null subcarriers, the method comprising the steps of:
 generating a first wireless signal for transmission, wherein the first wireless signal includes a plurality of first pilot signals, and the first pilot signals are represented in a plurality of first in-band subcarriers that are unevenly spaced across the in-band subcarriers;
 generating a second wireless signal for transmission, wherein the second wireless signal includes a plurality of second pilot signals, and the second pilot signals are represented in a plurality of second in-band subcarriers that are unevenly spaced across the in-band subcarriers, and wherein the second in-band subcarriers are at different subcarrier positions from the first in-band subcarriers;
 radiating the first wireless signal over a wireless communication channel using a first antenna; and
 simultaneously with radiating the first wireless signal, radiating the second wireless signal over the wireless communication channel using a second antenna.

18. The method of claim 17, wherein the first antenna and the second antenna are co-located, and each first pilot signal is located in a first pilot signal subcarrier position that is directly adjacent to a second pilot signal subcarrier position.

19. The method of claim 17, wherein the first antenna and the second antenna are distributed, and each first pilot signal is located in a first pilot signal subcarrier position that is offset from each second pilot signal subcarrier position by at least two subcarrier positions.

20. The method of claim 17, wherein a first pilot signal and a second pilot signal that are positioned at corresponding but offset subcarrier positions in the first and second wireless signals each have substantially equal power.

21. The method of claim 17, wherein a first pilot signal and a second pilot signal that are positioned at corresponding but offset subcarrier positions in the first and second wireless signals each have substantially unequal power.

22. The method of claim 17, further comprising:
 generating one or more additional wireless signals, wherein each of the one or more additional wireless signals includes a plurality of additional pilot signals represented within a plurality of additional pilot subcarriers that are unevenly spaced across the in-band subcarriers, and wherein the additional pilot subcarriers are at different subcarrier positions from the first in-band subcarriers and the second in-band subcarriers; and
 simultaneously with radiating the first and second wireless signals, radiating the one or more additional wireless signals over the wireless communication channel using one or more additional antennas.

23. A method comprising the steps of:
 receiving a received signal from a wireless communication channel, wherein the received signal represents channel-affected versions of a plurality of wireless signals that were transmitted by a multiple-antenna transmitter, and wherein each of the wireless signals includes a plurality of pilot signals represented within a plurality of pilot subcarriers, wherein the plurality of pilot signals are unevenly spaced with respect to adjacent pilots, and pilot signals of each of the plurality of wireless signals are orthogonal in frequency with pilot signals of all other ones of the plurality of wireless signals;
 producing a corrected signal by applying corrections to the received signal based on estimated channel perturbations within the received signal, which estimated channel perturbations are determined based on the plurality of pilot signals; and
 producing an output data symbol from the corrected signal.

24. The method of claim 23, wherein the wireless signals that were transmitted by the transmitter represent signals selected by the transmitter from a plurality of candidate signals, and the received signal includes a combination of a phase shifted input data signal with a synchronization/pilot sequence, wherein the plurality of pilot signals form a portion of the synchronization/pilot sequence, and wherein the method further comprises:
 determining an estimate of a selective mapping (SLM) index, which identifies the synchronization/pilot sequence from a plurality of synchronization/pilot sequences; and
 wherein producing the corrected signal is performed by applying the corrections to the received signal based the estimated channel perturbations within the received signal, wherein the estimated channel perturbations are determined based on the estimate of the SLM index and the plurality of pilot signals.

25. The method of claim 24, wherein the SLM index also identifies the associated transmit antenna from which the SLM index was applied.

26. A system comprising:
 one or more radio frequency (RF) signal generators configured to generate a plurality of wireless signal for transmission, wherein each of the plurality of wireless signals includes a plurality of pilot signals, and the pilot signals within each of the plurality of wireless signals are represented in a plurality of in-band subcarriers that are unevenly spaced across the in-band subcarriers, and pilot signals of each of the plurality of wireless signals are orthogonal in frequency with pilot signals of all other ones of the plurality of wireless signals; and
- a plurality of antennas, operably coupled with the one or more RF signal generators, and configured simultaneously to radiate each of the wireless signals over a wireless communication channel.

27. The system of claim 26, wherein the plurality of antennas include a plurality of co-located antennas.

28. The system of claim 26, wherein the plurality of antennas include a plurality of distributed antennas.

29. The system of claim 26, wherein the transmitter is a wireless communication device selected from a group that includes a cellular telephone, a radio, an unmanned autonomous vehicle, a one-way pager, a two-way pager, a personal data assistant, a computer, a base station, a wireless transmitter, and a wireless transceiver.

30. The system of claim 26, further comprising:
- a receiver adapted to receive a received signal from the wireless communication channel, wherein the received signal represents a channel-affected version of the wireless signals that were radiated by the plurality of antennas, to produce a corrected signal by applying corrections to the received signal based on estimated channel perturbations within the received signal, which estimated channel perturbations are determined based on the plurality of pilot signals, and to produce an output data symbol from the corrected signal.

31. The system of claim 30, wherein the receiver is a wireless communication device selected from a group that includes a cellular telephone, a radio, an unmanned autonomous vehicle, a one-way pager, a two-way pager, a personal data assistant, a computer, a base station, a wireless transmitter, and a wireless transceiver.

32. The system of claim 26, wherein the system is a multi-carrier communication system selected from a group that includes a multi-carrier based, ultra-wideband system, an orthogonal frequency division multiplexing (OFDM) system, an orthogonal frequency division multiple access (OFDMA) system, a multi-carrier code division multiple access (MC-CDMA) system, a wideband code division multiple access (W-CDMA) system, a wireless local area network (WLAN), a digital video broadcast (DVB) system, a digital audio broadcast (DAB) system, a broadband radio access network (BRAN), a WiMAX (Worldwide Interoperability for Microwave Access) system, a multiple-input multiple output (MIMO) system, and a multiple-input single-output (MISO) system.

* * * * *